(12) United States Patent
Huang et al.

(10) Patent No.: US 12,229,858 B2
(45) Date of Patent: Feb. 18, 2025

(54) DISPLAY METHOD AND ELECTRONIC DEVICE

(71) Applicant: Honor Device Co., Ltd., Shenzhen (CN)

(72) Inventors: Liwei Huang, Shenzhen (CN); Jie Ren, Shenzhen (CN); Kai Qian, Shenzhen (CN); Xia Wu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/905,731

(22) PCT Filed: Mar. 17, 2022

(86) PCT No.: PCT/CN2022/081451
§ 371 (c)(1),
(2) Date: Sep. 6, 2022

(87) PCT Pub. No.: WO2022/237316
PCT Pub. Date: Nov. 17, 2022

(65) Prior Publication Data
US 2024/0203011 A1    Jun. 20, 2024

(30) Foreign Application Priority Data

May 12, 2021   (CN) .......................... 202110519367.4

(51) Int. Cl.
*G06T 13/00*   (2011.01)
*G06F 3/14*    (2006.01)
*G06T 3/40*    (2024.01)

(52) U.S. Cl.
CPC ............. *G06T 13/00* (2013.01); *G06F 3/14* (2013.01); *G06T 3/40* (2013.01); *G06T 2200/24* (2013.01); *G06T 2210/22* (2013.01)

(58) Field of Classification Search
CPC ....... G06T 13/00; G06T 3/40; G06T 2200/24; G06T 2210/22; G06T 13/80; G06F 3/14;
(Continued)

(56) References Cited

U.S. PATENT DOCUMENTS 6,002,401 A * 12/1999 Baker .................. G06F 3/0481
345/473
6,600,491 B1 * 7/2003 Szeliski ................. G06T 13/80
348/700

(Continued)

FOREIGN PATENT DOCUMENTS

CN   105373291 A   3/2016
CN   108319414 A   7/2018
(Continued)

OTHER PUBLICATIONS

Yu Cancan; "The Function and Design Strategy of Functional Animation for the Aged Smart Watch: Taking OW80 Smart Watch as an Example"; Art & Design; Dec. 21, 2018;2pages(with English abstract).

*Primary Examiner* — Jitesh Patel
(74) *Attorney, Agent, or Firm* — Slater Matsil, LLP

(57) ABSTRACT

This application provides a display method and an electronic device. When the electronic device switches from a screen-off mode to a lock-screen mode, the electronic device may perform gradual expansion from a last image frame displayed in a screen-off interface, and in a gradual expansion process, successively play a transition animation during switching from the screen-off interface to a lock-screen interface.

20 Claims, 54 Drawing Sheets

(58) Field of Classification Search
CPC .. G06F 3/0481; G06F 3/04845; G06F 3/1407; G09G 2340/045; G09G 2354/00
See application file for complete search history.

(56) References Cited

U.S. PATENT DOCUMENTS

| | | |
|---|---|---|
| 10,788,978 B2 | 9/2020 | Ting et al. |
| 2010/0045879 A1 | 2/2010 | Chen |
| 2011/0052154 A1* | 3/2011 | Weber .................. H04N 5/91 |
| | | 386/280 |
| 2013/0055119 A1 | 2/2013 | Anh |
| 2013/0071095 A1* | 3/2013 | Chauvier ............ G11B 27/005 |
| | | 386/343 |
| 2014/0362399 A1* | 12/2014 | Sugimoto .......... H04N 1/00501 |
| | | 358/1.15 |
| 2016/0259499 A1 | 9/2016 | Kocienda et al. |
| 2017/0046024 A1 | 2/2017 | Dascola et al. |
| 2017/0286913 A1 | 10/2017 | Liu et al. |
| 2018/0034879 A1* | 2/2018 | Chegini ................ H04L 65/403 |
| 2019/0220647 A1 | 7/2019 | Han et al. |
| 2019/0235722 A1 | 8/2019 | Wang et al. |
| 2020/0059675 A1 | 2/2020 | Yoshikawa et al. |

FOREIGN PATENT DOCUMENTS

| | | |
|---|---|---|
| CN | 111145321 A | 5/2020 |
| CN | 111857911 A | 10/2020 |
| CN | 114461120 A | 5/2022 |
| EP | 3200145 A1 | 8/2017 |
| EP | 3380918 A2 | 10/2018 |
| WO | 2017097143 A1 | 6/2017 |

\* cited by examiner

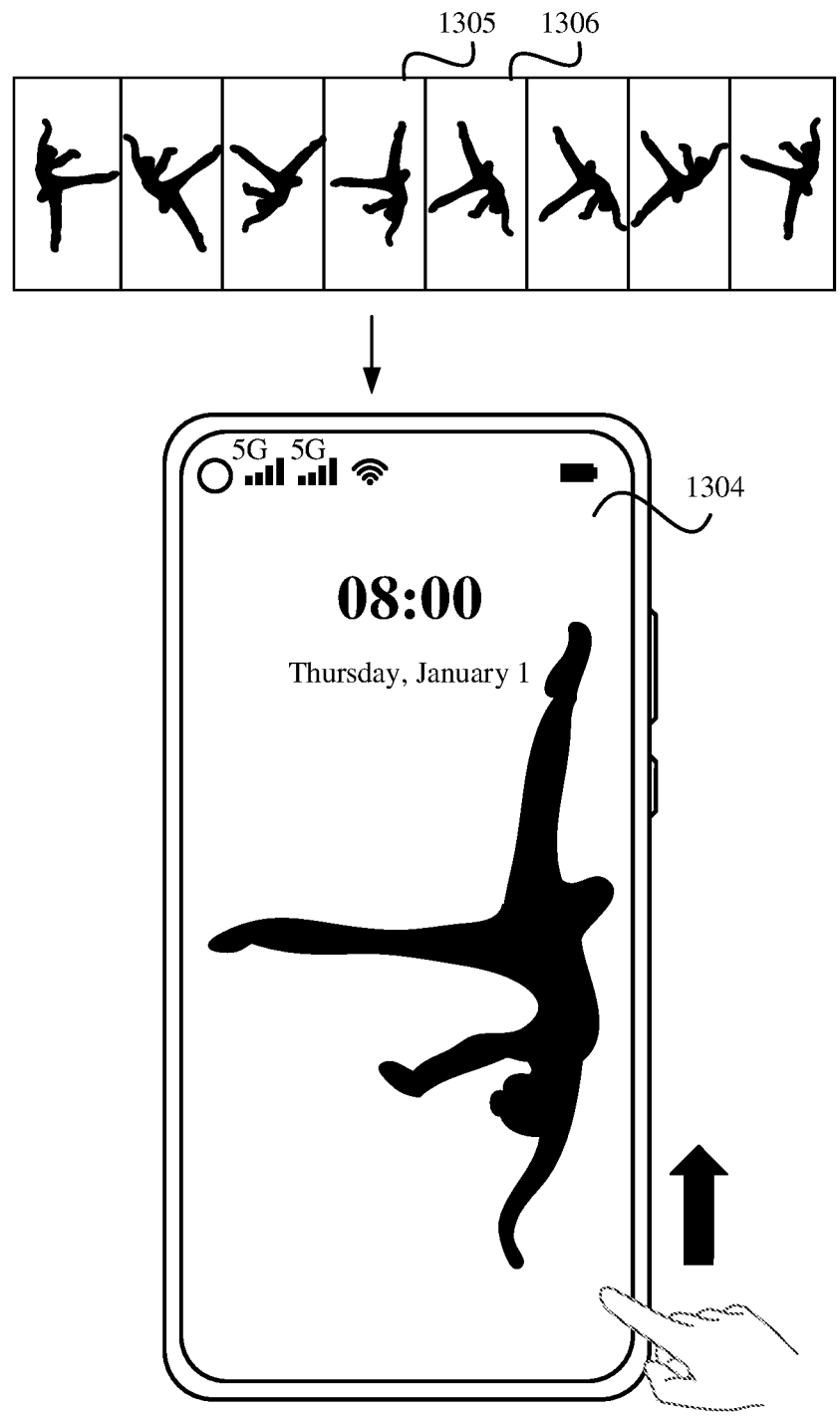
FIG. 13b(1)

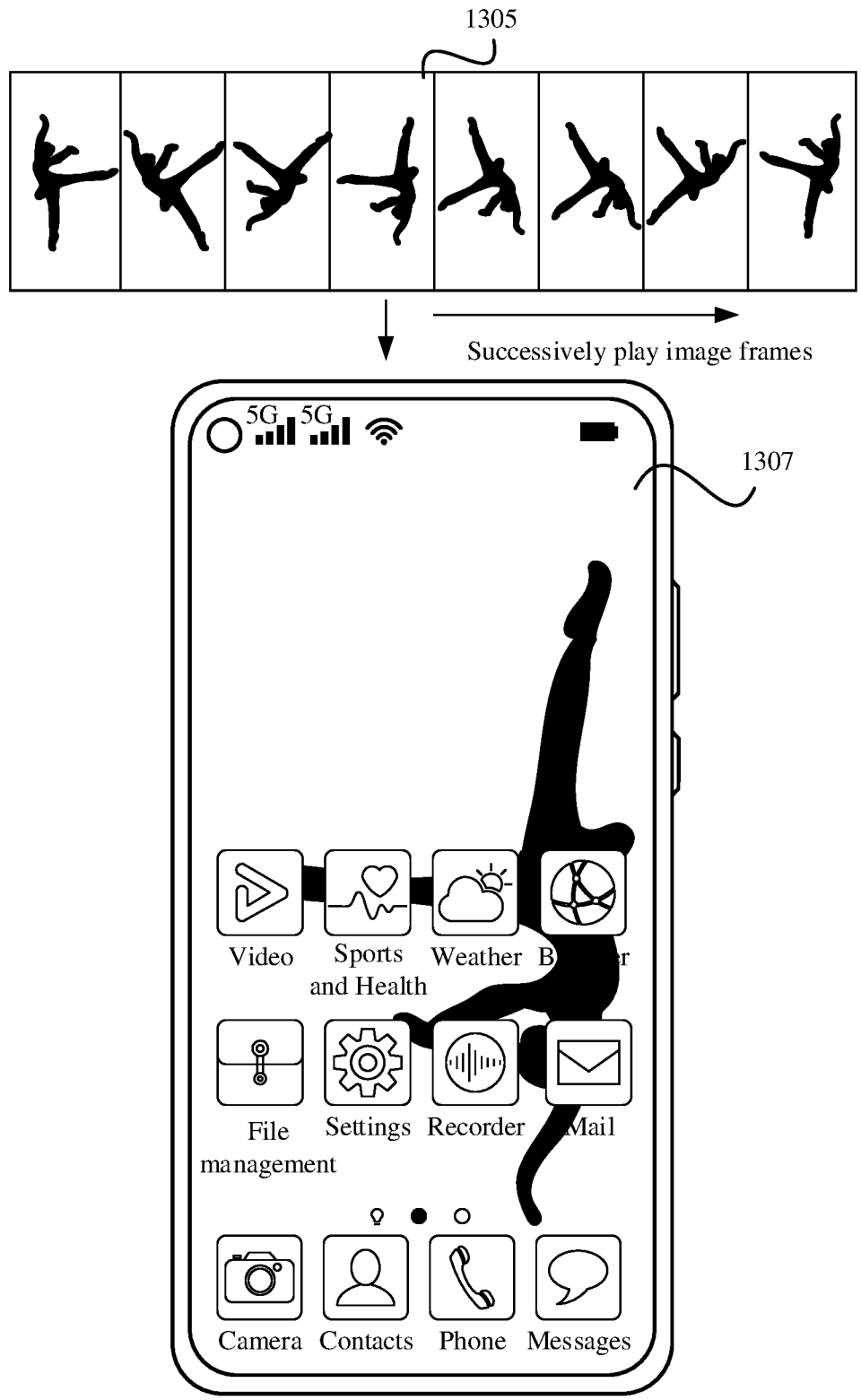
FIG. 13b(2)

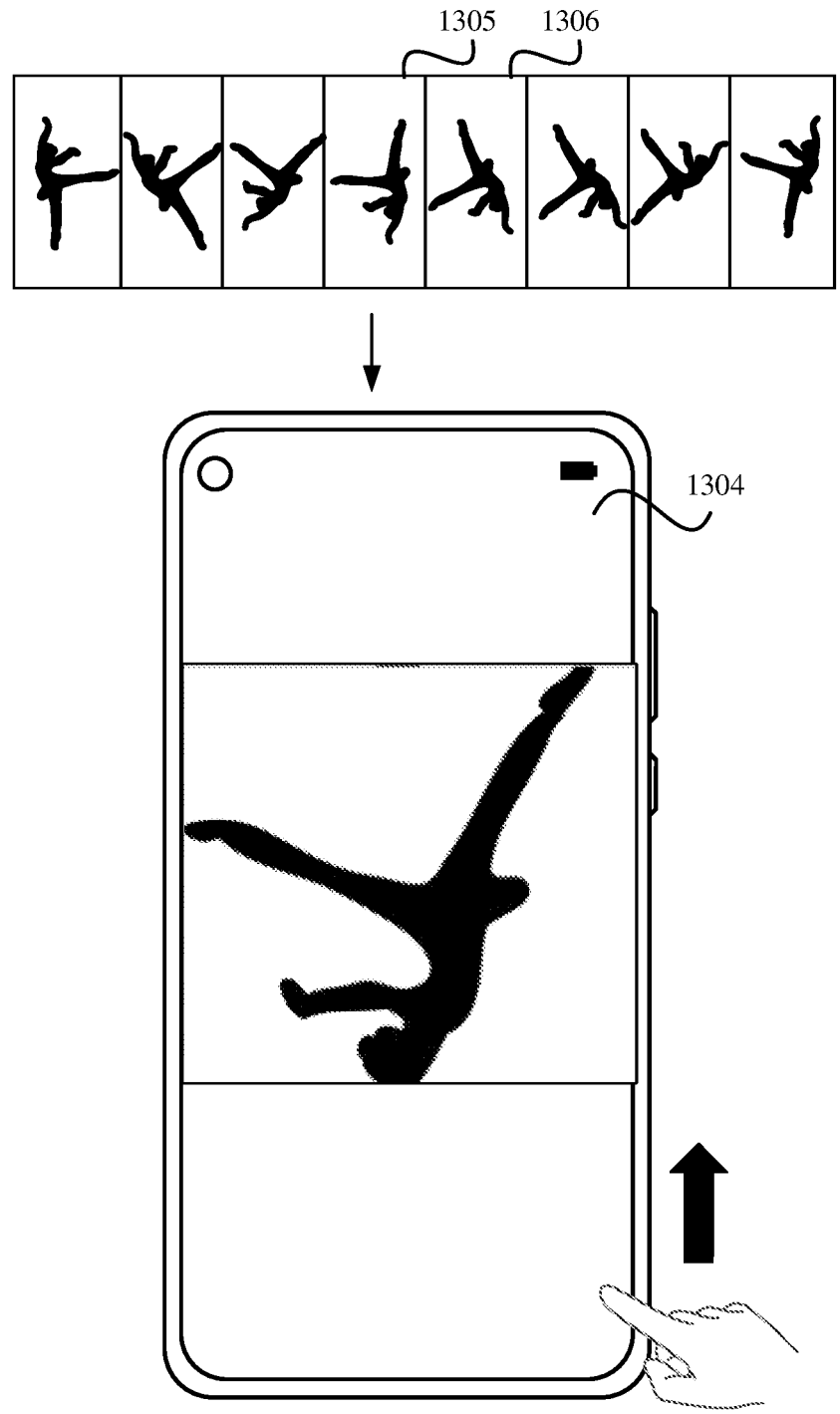
FIG. 13c(1)

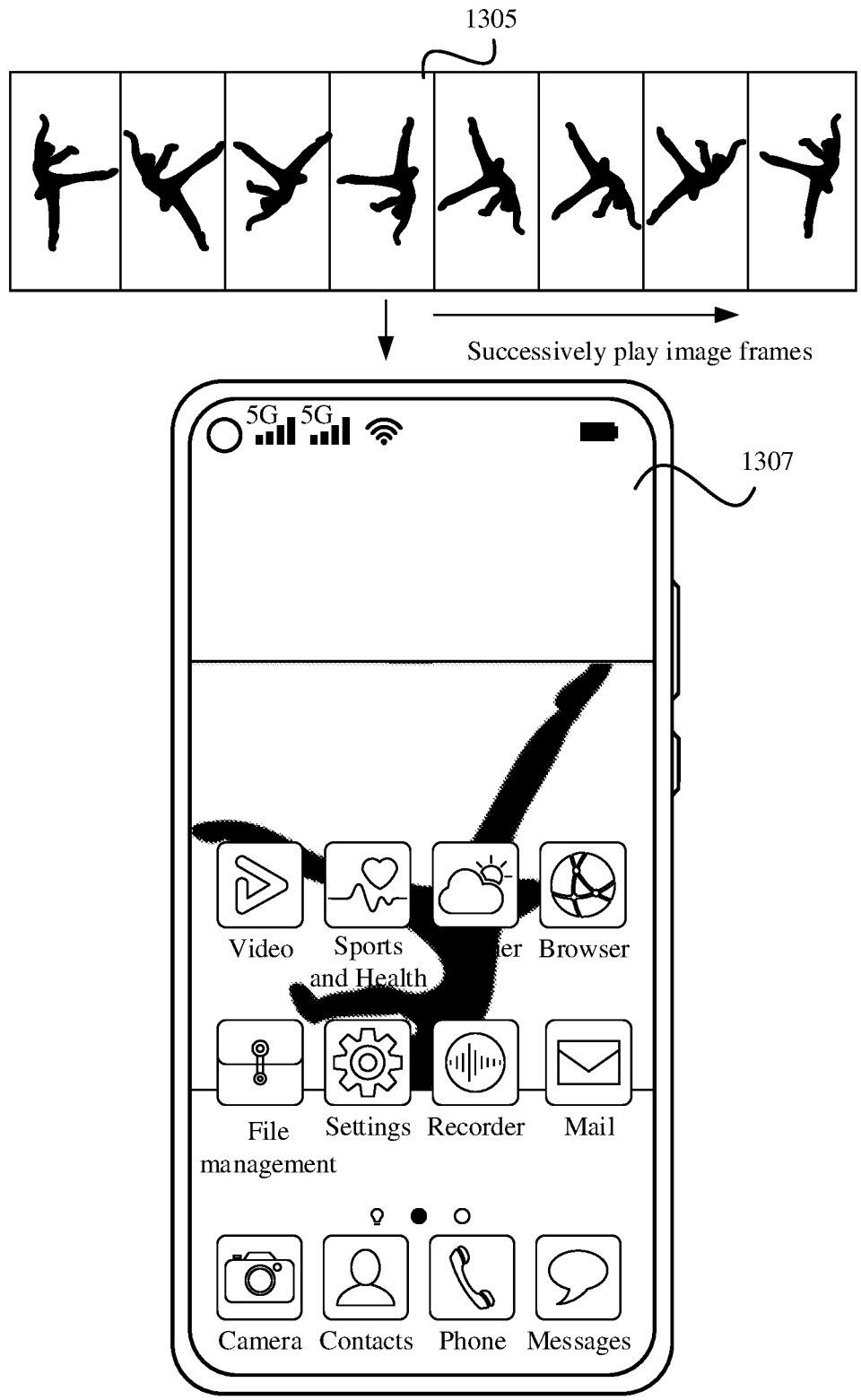
FIG. 13c(2)

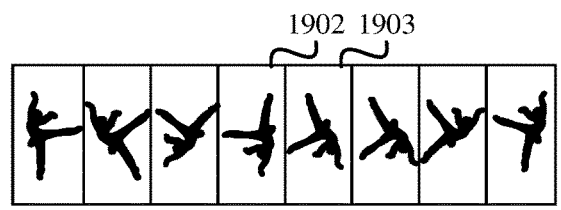
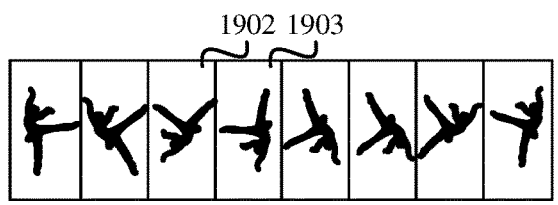
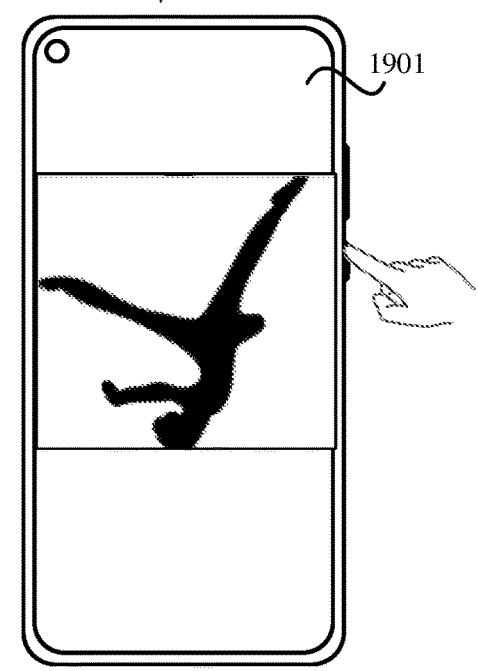
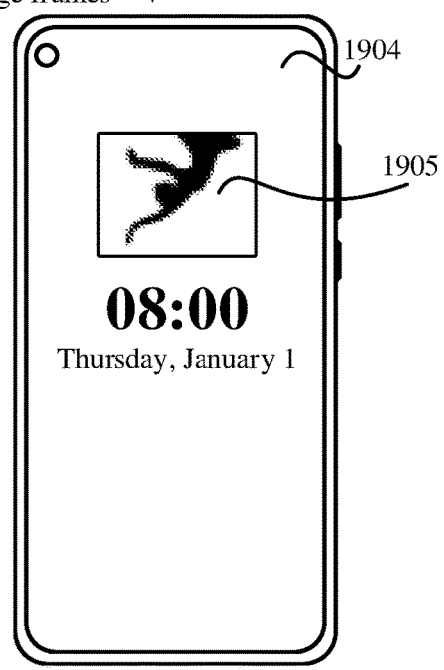
FIG. 19(1)    FIG. 19(2)
FIG. 19

DISPLAY METHOD AND ELECTRONIC DEVICE

CROSS-REFERENCE TO RELATED APPLICATIONS

This application is a national stage of International Application No. PCT/CN2022/081451 filed on Mar. 17, 2022, which claims priority to Chinese Patent Application No. 202110519367.4, filed with China National Intellectual Property Administration on May 12, 2021. The disclosures of the aforementioned application is hereby incorporated by reference in its entirety.

TECHNICAL FIELD

This application relates to the field of terminal devices, and in particular, to a display method and an electronic device.

BACKGROUND

A one-shot transition dynamic effect may also be referred to as a transition animation, and may be understood as an animation effect displayed during switching between different modes of a terminal. Because of such an effect, visual experience of a user using a mobile phone is improved. However, a use scenario of the transition animation is limited currently.

SUMMARY

To resolve the foregoing technical problem, this application provides a display method and an electronic device. In the method, an electronic device may provide a display manner of a transition animation during switching from a screen-off interface to a lock-screen interface, to enrich application scenarios of the transition animation of the electronic device and improve user experience.

According to a first aspect, this application provides an electronic device. The electronic device includes a memory and a processor. The processor is coupled to the memory. The memory stores program instructions. When the program instructions are executed by the processor, the electronic device is enabled to perform the following steps: when a first interface is displayed on a display of the electronic device, playing each image frame of a first transition animation in a first display box of the first interface, and freezing at a last image frame of the first transition animation, where a center of the first display box deviates from a screen center of the display of the electronic device; switching from the first interface on the display of the electronic device to a second interface in response to a received first user operation, where the second interface includes a second display box, a size of the second display box is the same as a size of the first display box, and a position of the second display box on the display is the same as a position of the first display box on the display; and enlarging the second display box gradually, and moving the second display box toward the screen center of the display of the electronic device, where each image frame of a second transition animation is played in the second display box in a process in which the second display box is gradually enlarged and moved toward the screen center of the display of the electronic device, and a first image frame of the second transition animation is the same as the last image frame of the first transition animation. In this way, when switching from a screen-off mode to a lock-screen mode, the electronic device may display a transition animation in the lock-screen mode in a gradual expansion manner from a same position at which a transition animation is displayed in the screen-off mode. The first image frame of the transition animation in the lock-screen mode is the last frame of the transition animation in the screen-off mode. To be specific, from a user's perspective, the transition animation in the lock-screen mode that is seen by a user is coherent to the last image frame frozen in the screen-off mode. In this way, fluency of switching from the screen-off mode to the lock-screen mode is effectively improved in a transition animation manner, to improve user experience.

For example, before entering the lock-screen mode, the electronic device may first display a black screen, and then display a lock-screen interface in the lock-screen mode.

For example, when the electronic device is in the screen-off mode, text information such as a time and a date may further be included on the display.

For example, after the electronic device enters the lock-screen mode, the text information in the screen-off mode disappears.

For example, in a process in which the second display box of the electronic device plays the transition animation in the lock-screen mode, the text information such as the time and the date may be displayed in the second display box of the electronic device.

For example, if a start position of the second display box is the screen center, the second display box may be kept in a fixed position and gradually enlarged.

For example, optionally, the first user operation is that the user presses a power button.

For example, if the first user operation is fingerprint-based unlocking, facial unlocking, or the like, the electronic device may switch from the screen-off mode to a home screen mode. The electronic device may play a transition animation in the home screen mode in a display manner that is the same as that of the transition animation in the lock-screen mode.

According to the first aspect, the first transition animation includes N image frames, N is an integer greater than 1, and when the program instructions are executed by the processor, the electronic device is enabled to perform the following steps: cropping each of the N image frames based on a specified first size; adjusting a size of each cropped image frame based on a specified second size; and successively playing, in the first display box, each image frame obtained after the cropping and size adjustment, and freezing at a last image frame that is in the first transition animation and that is obtained after the cropping and size adjustment, where the size of the first display box is the same as the second size. In this way, the transition animation played in the screen-off mode in this application is actually an image obtained through cropping and size adjustment on an original image frame, so that power consumption in the screen-off mode can be reduced, and a display effect in the screen-off mode can be enriched.

According to the first aspect or any implementation of the first aspect, the second transition animation includes M image frames, M is an integer greater than 1, and when the program instructions are executed by the processor, the electronic device is enabled to perform the following steps: adjusting a first image frame in the M image frames based on the second size; and superimposing an adjusted first image frame under the second display box, where an image in an overlapping part between the second display box and the adjusted first image frame is the same as an image of the last image frame obtained after the cropping and size adjustment. In this way, the first image frame of the transition animation in the lock-screen mode is adjusted based on the second size, and is placed in a specified position on the display, so that the overlapping part between the second display box and the first image frame can be the same as the image of the last image frame displayed in the screen-off mode. To be specific, from the user's perspective, the transition animation in the lock-screen mode that is seen by the user is expanded from the last image in the screen-off mode. This effectively improves coherence of a transition animation from the screen-off mode to the lock-screen mode, and improves user experience.

According to the first aspect or any implementation of the first aspect, when the program instructions are executed by the processor, the electronic device is enabled to perform the following steps: enlarging the adjusted first image frame gradually and moving the adjusted first image frame toward the center of the display in a process in which the second display box is gradually enlarged and moved toward the screen center of the display of the electronic device, where an image displayed in the second display box changes with the overlapping part between the second display box and the adjusted first image frame. In this way, the image frame overlapping the second display box may be gradually enlarged and moved toward the screen center. Correspondingly, in a process in which a size and a position of the second display box gradually change, and a size and a position of the image frame overlapping the second display box gradually change, the overlapping part between the second display box and the image frame also gradually changes, so that the image displayed in the second display box correspondingly changes.

According to the first aspect or any implementation of the first aspect, when the program instructions are executed by the processor, the electronic device is enabled to perform the following steps: when playing of the adjusted first image frame is completed, enlarging the adjusted first image frame to a third size, and moving the adjusted first image frame to a first position on the display; switching from the adjusted first image frame superimposed with the second display box to a next image frame based on a sequence of the M image frames, where a size of the next image frame is the third size, and the next image frame is in the first position on the display; and enlarging the next image frame gradually, and moving the next image frame toward the screen center of the display, where the image displayed in the second display box changes with an overlapping part between the second display box and the next image frame. In this way, the electronic device may successively switch, based on the sequence of the M image frames, between image frames overlapping the second display box. In addition, in a process of successively switching between the image frames, the image frames are still gradually enlarged and moved toward the screen center.

For example, in a process in which the image frames are successively switched and gradually enlarged and moved, if a center of the image frame overlaps the screen center, but at least one border of the image frame falls inside a border of the screen, a position of the image frame is kept unchanged, switching is continued, and the image frame is gradually enlarged.

According to the first aspect or any implementation of the first aspect, when the program instructions are executed by the processor, the electronic device is enabled to perform the following steps: when a center of the second display box overlaps the center of the display, and at least one border of the second display box falls inside a border of the display, stopping moving the second display box, and continuing to enlarge the second display box, until all borders of the second display box overlap or fall outside borders of the display.

For example, a moving speed of the second display box may be different from a moving speed of the image frame.

For example, a moving track of the second display box may be different from a moving track of the image frame.

For example, an enlargement rate of the second display box may be different from an enlargement rate of the image frame.

According to the first aspect or any implementation of the first aspect, a shape of the first display box is a rectangle, a circle, a triangle, an oval, or an irregular shape.

According to the first aspect or any implementation of the first aspect, a shape of the second display box is a rectangle, a circle, a triangle, an oval, or an irregular shape.

According to the first aspect or any implementation of the first aspect, the first interface is a screen-off interface, and the second interface is a lock-screen interface.

According to the first aspect or any implementation of the first aspect, the first interface is a screen-off interface, and the second interface is a home screen.

According to a second aspect, this application provides a display method. The method includes: when a first interface is displayed on a display of an electronic device, playing each image frame of a first transition animation in a first display box of the first interface, and freezing at a last image frame of the first transition animation, where a center of the first display box deviates from a screen center of the display of the electronic device; switching, by the electronic device, from the first interface on the display of the electronic device to a second interface in response to a received first user operation, where the second interface includes a second display box, a size of the second display box is the same as a size of the first display box, and a position of the second display box on the display is the same as a position of the first display box on the display; and enlarging, by the electronic device, the second display box gradually, and moving the second display box toward the screen center of the display of the electronic device, where each image frame of a second transition animation is played in the second display box in a process in which the second display box is gradually enlarged and moved toward the screen center of the display of the electronic device, and a first image frame of the second transition animation is the same as the last image frame of the first transition animation.

According to a second aspect, the first transition animation includes N image frames, N is an integer greater than 1, and the playing each image frame of a first transition animation in a first display box of the first interface includes: cropping each of the N image frames based on a specified first size; adjusting a size of each cropped image frame based on a specified second size; and successively playing, in the first display box, each image frame obtained after the cropping and size adjustment, and freezing at a last image frame that is in the first transition animation and that is obtained after the cropping and size adjustment, where the size of the first display box is the same as the second size.

According to the second aspect or any implementation of the second aspect, the second transition animation includes M image frames, M is an integer greater than 1, and the playing each image frame of a first transition animation in a first display box of the first interface includes: adjusting a first image frame in the M image frames based on the second size; and superimposing an adjusted first image frame under the second display box, where an image in an overlapping part between the second display box and the adjusted first image frame is the same as an image of the last image frame obtained after the cropping and size adjustment.

According to the second aspect or any implementation of the second aspect, the enlarging, by the electronic device, the second display box gradually, and moving the second display box toward the screen center of the display of the electronic device includes: enlarging the adjusted first image frame gradually and moving the adjusted first image frame toward the center of the display in a process in which the second display box is gradually enlarged and moved toward the screen center of the display of the electronic device, where an image displayed in the second display box changes with the overlapping part between the second display box and the adjusted first image frame.

According to the second aspect or any implementation of the second aspect, the enlarging, by the electronic device, the second display box gradually, and moving the second display box toward the screen center of the display of the electronic device includes: when playing of the adjusted first image frame is completed, enlarging the adjusted first image frame to a third size, and moving the adjusted first image frame to a first position on the display; switching from the adjusted first image frame superimposed with the second display box to a next image frame based on a sequence of the M image frames, where a size of the next image frame is the third size, and the next image frame is in the first position on the display; and enlarging the next image frame gradually, and moving the next image frame toward the screen center of the display, where the image displayed in the second display box changes with an overlapping part between the second display box and the next image frame.

According to the second aspect or any implementation of the second aspect, the enlarging, by the electronic device, the second display box gradually, and moving the second display box toward the screen center of the display of the electronic device includes: when a center of the second display box overlaps the center of the display, and at least one border of the second display box falls inside a border of the display, stopping moving the second display box, and continuing to enlarge the second display box, until all borders of the second display box overlap or fall outside borders of the display.

According to the second aspect or any implementation of the second aspect, a shape of the first display box is a rectangle, a circle, a triangle, an oval, or an irregular shape.

According to the second aspect or any implementation of the second aspect, a shape of the second display box is a rectangle, a circle, a triangle, an oval, or an irregular shape.

According to the second aspect or any implementation of the second aspect, the first interface is a screen-off interface, and the second interface is a lock-screen interface.

According to the second aspect or any implementation of the second aspect, the first interface is a screen-off interface, and the second interface is a home screen.

The second aspect and any implementation of the second aspect are respectively corresponding to the first aspect and any implementation of the first aspect. For technical effects corresponding to the second aspect and any implementation of the second aspect, refer to the technical effects corresponding to the first aspect and any implementation of the first aspect. Details are not described herein again.

According to a third aspect, this application provides a computer-readable medium, configured to store a computer program. The computer program includes instructions used to perform the method in the second aspect or any possible implementation of the second aspect.

According to a fourth aspect, this application provides a computer program. The computer program includes instructions used to perform the method in the second aspect or any possible implementation of the second aspect.

According to a fifth aspect, this application provides a chip. The chip includes a processing circuit and a transceiver pin. The transceiver pin and the processing circuit communicate with each other by using an internal connection path, and the processing circuit performs the method in any one of the second aspect or the possible implementations of the second aspect, to control a receiving pin to receive a signal, and control a sending pin to send a signal.

BRIEF DESCRIPTION OF THE DRAWINGS

FIG. 13a to FIG. 13d show an example of a display manner of a transition animation from a screen-off mode to a lock-screen mode and from the lock-screen mode to a home screen mode;

FIG. 19 shows an example of a display manner of a transition animation from a lock-screen mode to a screen-off mode.

DETAILED DESCRIPTION OF ILLUSTRATIVE EMBODIMENTS

The following clearly and completely describes the technical solutions in embodiments of this application with reference to the accompanying drawings in embodiments of this application. It is clear that the described embodiments are some rather than all of embodiments of this application. Based on embodiments of this application, all other embodiments obtained by a person of ordinary skill in the art without creative efforts fall within the protection scope of this application.

The term "and/or" in this specification is merely an association relationship of associated objects, and indicates that three relationships may exist. For example, A and/or B may indicate the following three cases: Only A exists, both A and B exist, and only B exists.

The terms "first" and "second" in the specification and claims of embodiments of this application are used to distinguish between different objects, but are not used to describe a specific sequence of objects. For example, a first target object and a second target object are used to distinguish between different target objects, but are not used to describe a specific sequence of the target objects.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

In the descriptions of embodiments of this application, unless otherwise stated, "a plurality of" means two or more. For example, a plurality of processing units refer to two or more processing units, and a plurality of systems refer to two or more systems.

Figure 1:
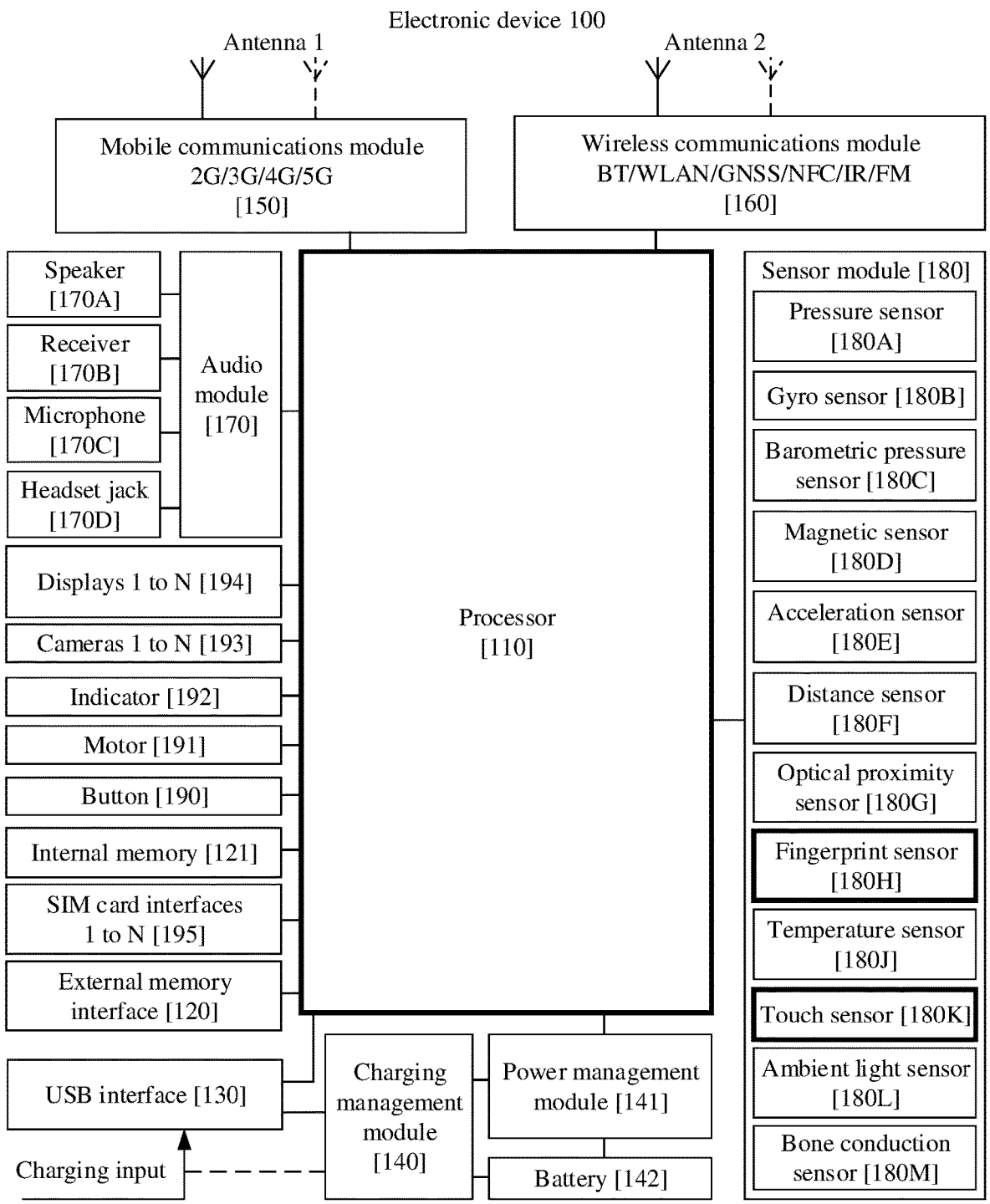
FIG. 1 is a schematic diagram of an example of a hardware structure of an electronic device.

FIG. 1 is a schematic diagram of a structure of an electronic device 100. It should be understood that the electronic device 100 shown in FIG. 1 is only an example of an electronic device, and the electronic device 100 may have more or fewer components than those shown in the figure, may combine two or more components, or may have different component configurations. The components shown in FIG. 1 may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment of this application is merely an example, and does not constitute a limitation on the structure of the electronic device 100. In other embodiments of this application, the electronic device 100 may alternatively use an interface connection manner that is different from the manner in the foregoing embodiment, or a combination of a plurality of interface connection manners.

The charging management module 140 is configured to receive charging input from a charger. The charger may be a wireless charger, or may be a wired charger. In some wired charging embodiments, the charging management module 140 may receive charging input of a wired charger through the USB interface 130. In some wireless charging embodiments, the charging management module 140 may receive wireless charging input through a wireless charging coil of the electronic device 100. When charging the battery 142, the charging management module 140 may further supply power to the electronic device through the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the external memory, the display 194, the camera 193, the wireless communications module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may also be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a solution for wireless communication, including 2G/3G/4G/5G and the like, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110 and disposed in a same device as the mobile communications module 150 or another function modules.

The wireless communications module 160 may provide a solution for wireless communication that is applied to the electronic device 100 and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components that integrate at least one communications processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The camera 193 is configured to capture a still image or a video. An optical image of an object is generated by using a lens and projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to processing the digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The external memory interface 120 may be configured to connect to an external memory card, such as a micro SD card, to extend a storage capability of the electronic device 100. The external memory card communicates with the processor 110 by using the external memory interface 120, to implement a data storage function. For example, files such as music or videos are stored in the external memory card.

The internal memory 121 may be configured to store computer executable program code, where the executable program code includes instructions. The processor 110 perform various function applications and data processing of the electronic device 100 by running the instructions stored in the internal memory 121. The internal memory 121 may include a program storage area and a data storage area. The program storage area may store an operating system, an application program required by at least one function (for example, a sound play function or an image play function), and the like. The data storage area may store data (such as audio data or a phone book) created in a use process of the electronic device 100. In addition, the internal memory 121 may include a high-speed random access memory, and may further include a non-volatile memory, such as at least one magnetic disk storage component, a flash memory component, and a universal flash storage (universal flash storage, UFS). For example, in embodiments of this application, the processor 110 may run the instructions stored in the internal memory 121 to implement display manners of transition animations from a screen-off mode to a lock-screen mode, from the lock-screen mode to a home screen mode, and from the home screen mode or the lock-screen mode to the screen-off mode in embodiments of this application.

The electronic device 100 may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules of the audio module 170 may be disposed in the processor 110.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines strength of the pressure based on the change of the capacitance. When a touch operation is performed on the display 194, the electronic device 100 detects strength of the touch operation through the pressure sensor 180A. The electronic device 100 may also calculate a position of the touch based on a detection signal of the pressure sensor 180A. In some embodiments, touch operations performed on a same touch position but has different touch operation strength may correspond to different operation instructions. For example, when a touch operation whose touch operation strength is less than a first pressure threshold is applied to a Messages icon, an instruction for viewing an SMS message is executed. When a touch operation whose touch operation strength is greater than or equal to the first pressure threshold is applied to the Messages icon, an instruction for creating an SMS message is executed.

The fingerprint sensor 180H is configured to collect a fingerprint. The electronic device 100 may implement fingerprint-based unlocking, application lock access, fingerprint-based photographing, fingerprint-based call answering, or the like based on a feature of the collected fingerprint. For example, in embodiments of this application, the fingerprint sensor 180H may collect a fingerprint when a user touches a touchscreen, and transmit the collected fingerprint to the processor 110. For example, the processor 110 may unlock the electronic device 100 based on fingerprint information entered by the fingerprint sensor 180H.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

The button 190 includes a power button, a volume button, and the like. The button 190 may be a mechanical button, or may be a touch button. The electronic device 100 may receive button input, and generate button signal input related to user settings and function control of the electronic device 100. For example, in this embodiment of this application, when the electronic device 100 is in a screen-off mode, the user presses the power button. The electronic device 100 may enter a lock-screen mode from the screen-off mode in response to a received operation of pressing the power button by the user. For example, when the electronic device is in the lock-screen mode or a home screen mode, if the electronic device 100 receives the operation of pressing the power button by the user, the electronic device 100 enters the screen-off mode from the lock-screen mode or the home screen mode.

For example, a software system of the electronic device 100 may use a layered architecture, an event-driven architecture, a microkernel architecture, a micro-service architecture, or a cloud architecture. In embodiments of this application, an Android system with a layered architecture is used as an example to describe the software structure of the electronic device 100.

Figure 2:
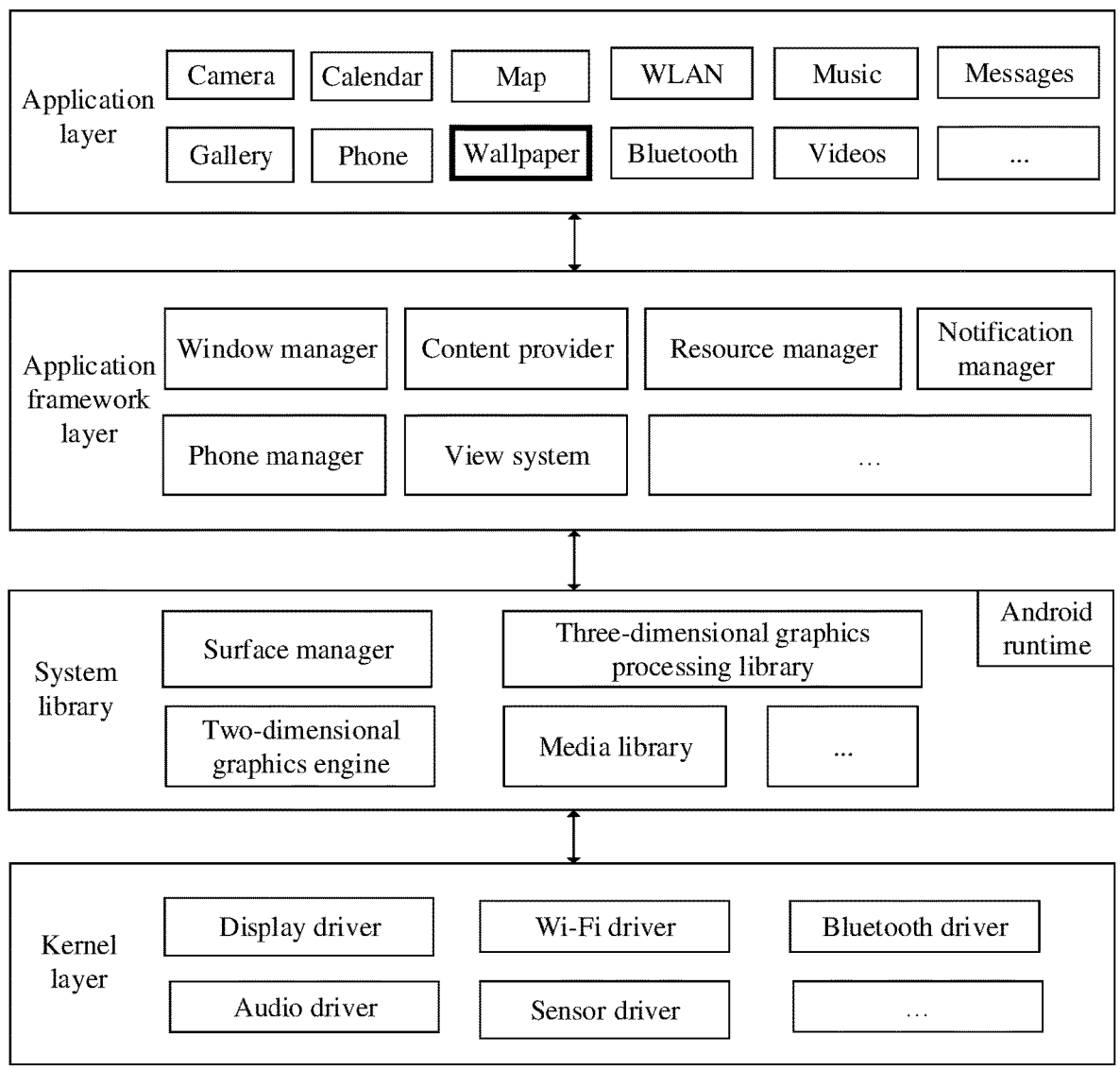
FIG. 2 is a schematic diagram of an example of a software structure of an electronic device.

FIG. 2 is a block diagram of a software structure of the electronic device 100 according to an embodiment of this application.

The layered architecture of the electronic device 100 divides software into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, Messages, and Wallpaper. For example, a wallpaper application may implement a display manner of a wallpaper or a transition animation in embodiments of this application. For example, the wallpaper application may provide a user interface, so that a user replaces a wallpaper or a video displayed in a transition animation.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The view system includes visual controls, such as a text display control, a picture display control, and the like. The view system may be configured to construct an application. A display interface may include one or more views. For example, a display interface including an SMS notification icon may include a text display view and a picture display view.

The phone manager is configured to provide a communication function of the electronic device 100, for example, call status management (including accepting and declining).

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The Android runtime includes a core library and a virtual machine. The Android runtime is responsible for scheduling and management of the Android system.

The core library includes two parts: a function that needs to be invoked by using the Java language, and a core library of Android.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that components included in the system framework layer and the system library and runtime layer shown in FIG. 2 do not constitute a specific limitation on the electronic device 100. In some other embodiments of this application, the electronic device 100 may include more or fewer components than those shown in the figure, or combine some components, or split some components, or have different component arrangements.

For example, embodiments of this application provide a display manner of a transition animation, so that the transition animation can be more fluently displayed and more coherent, to improve visual experience of a user. To help a person skilled in the art better understand the display manner of the transition animation in embodiments of this application, the following briefly describes the transition animation. FIG. 3a to FIG. 3f show an example of a display manner of a transition animation.

Figure 3A:
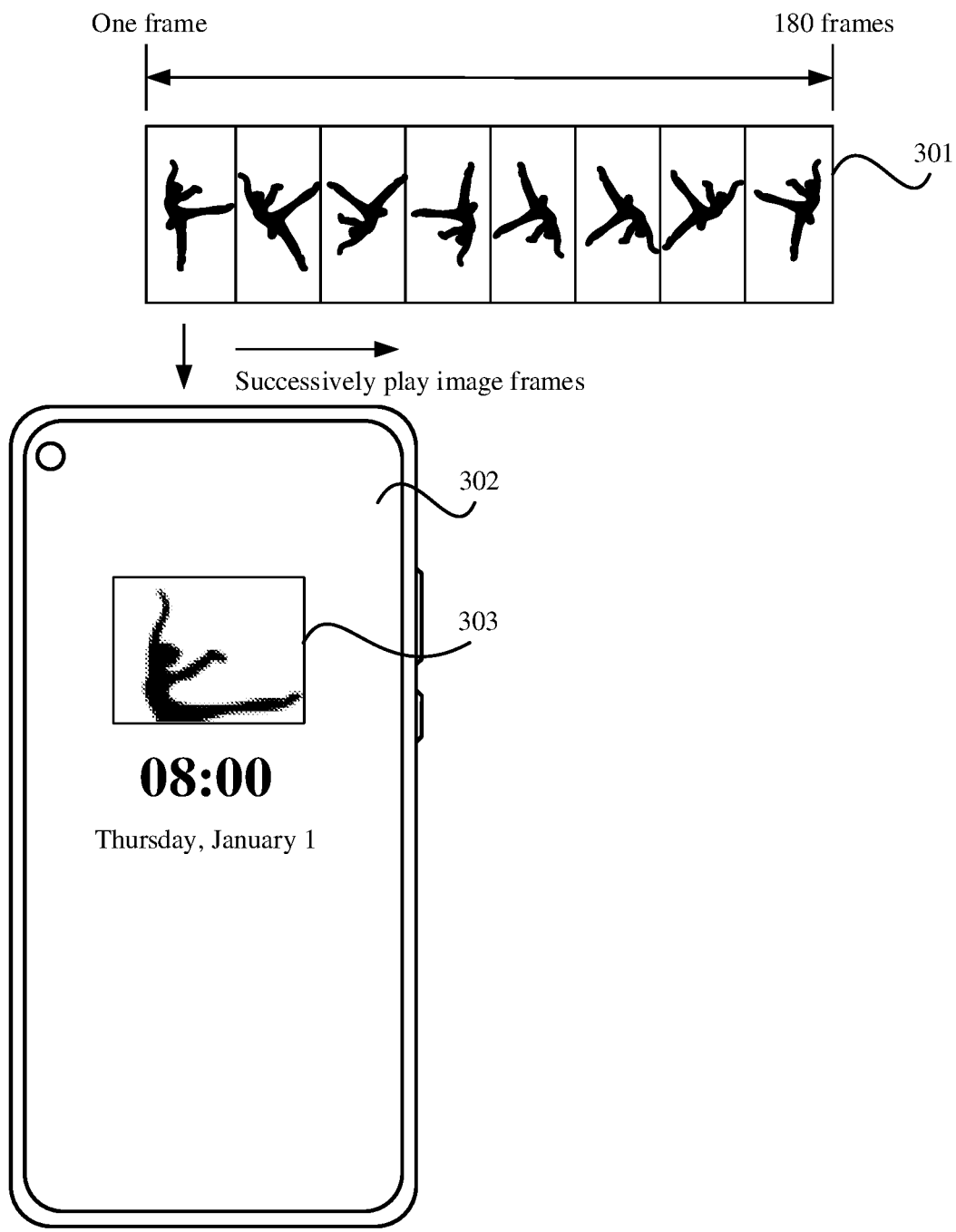
FIG. 3a to FIG. 3f show an example of a display manner of a transition animation.

Referring to FIG. 3a, for example, a video clip 301 corresponding to the transition animation (which may also be referred to as a transition dynamic effect, a transition effect, or the like) includes 180 image frames (which may also be referred to as video frames or the like). It should be noted that the transition animation in embodiments of this application may be understood as an animation effect used in a process of conversion between different modes. The modes in embodiments of this application include but are not limited to a screen-off mode, a lock-screen mode, and a home screen mode. For example, a transition animation in the screen-off mode in the following embodiments of this application is optionally an animation effect played on a display of an electronic device during switching from the home screen mode to the screen-off mode. A transition animation in the lock-screen mode is optionally an animation effect played on the display of the electronic device during switching from the screen-off mode to the lock-screen mode. A transition animation in the home screen mode is optionally an animation effect played on the display of the electronic device during switching from the lock-screen mode to the home screen mode. Optionally, the home screen mode may also be referred to as an unlocked mode. This is not limited in this application.

For example, the screen-off mode is optionally a mode that the electronic device enters after the electronic device receives a press of a user on a power button. A screen of the electronic device is turned off, and the transition animation in the screen-off mode is displayed on the display that is turned off.

For example, the lock-screen mode optionally means that the screen of the electronic device is locked. For example, in the screen-off mode, the user performs an operation such as touching or button pressing on the mobile phone, so that the electronic device enters the lock-screen mode. For example, in the lock-screen mode, the screen is locked, and the user needs to unlock the screen to enter the home screen mode. For example, the lock-screen mode may provide some functions that can be used without unlocking, such as a photographing function and a widget. In other words, in the lock-screen mode, the user may perform a corresponding operation on the electronic device. In the screen-off mode, when the user triggers the electronic device, the electronic device enters the lock-screen mode.

For example, the home screen mode is an unlocked mode of the electronic device. For example, the user may operate the electronic device in the home screen mode, to use a corresponding function provided by the electronic device. For example, the user may use a chat application, a video application, or the like.

It should be noted that mode switching in embodiments of this application includes, for example, switching from the screen-off mode to the lock-screen mode, switching from the lock-screen mode to a home screen, or switching from the home screen (or the lock-screen mode) to the screen-off mode, and is optionally interface switching. For example, switching from the screen-off mode to the lock-screen mode is optionally switching from a screen-off interface displayed on the display of the mobile phone to a lock-screen interface. Interfaces (including the screen-off interface, the lock-screen interface, and the home screen) in embodiments of this application are interfaces displayed in a full-screen manner. To be specific, when the display switches from one interface (for example, the screen-off interface) to another interface (for example, the lock-screen interface), a previous interface (namely, the screen-off interface) is not displayed, and an interface existing after switching (namely, the lock-screen interface) is displayed on the display in a full-screen manner.

Further, it should be noted that a quantity of image frames included in the transition animation in embodiments of this application is merely an example, and is not limited in this application. For example, when the mobile phone is in the lock-screen mode or the home screen mode, the user presses the power button. The mobile phone enters the screen-off mode in response to a received operation.

Still referring to FIG. 3a, for example, a screen-off interface 302 of the mobile phone includes a transition animation display box 303, a time control, and the like. The transition animation display box 303 displays a first image frame of the video clip 301.

Figure 3B:
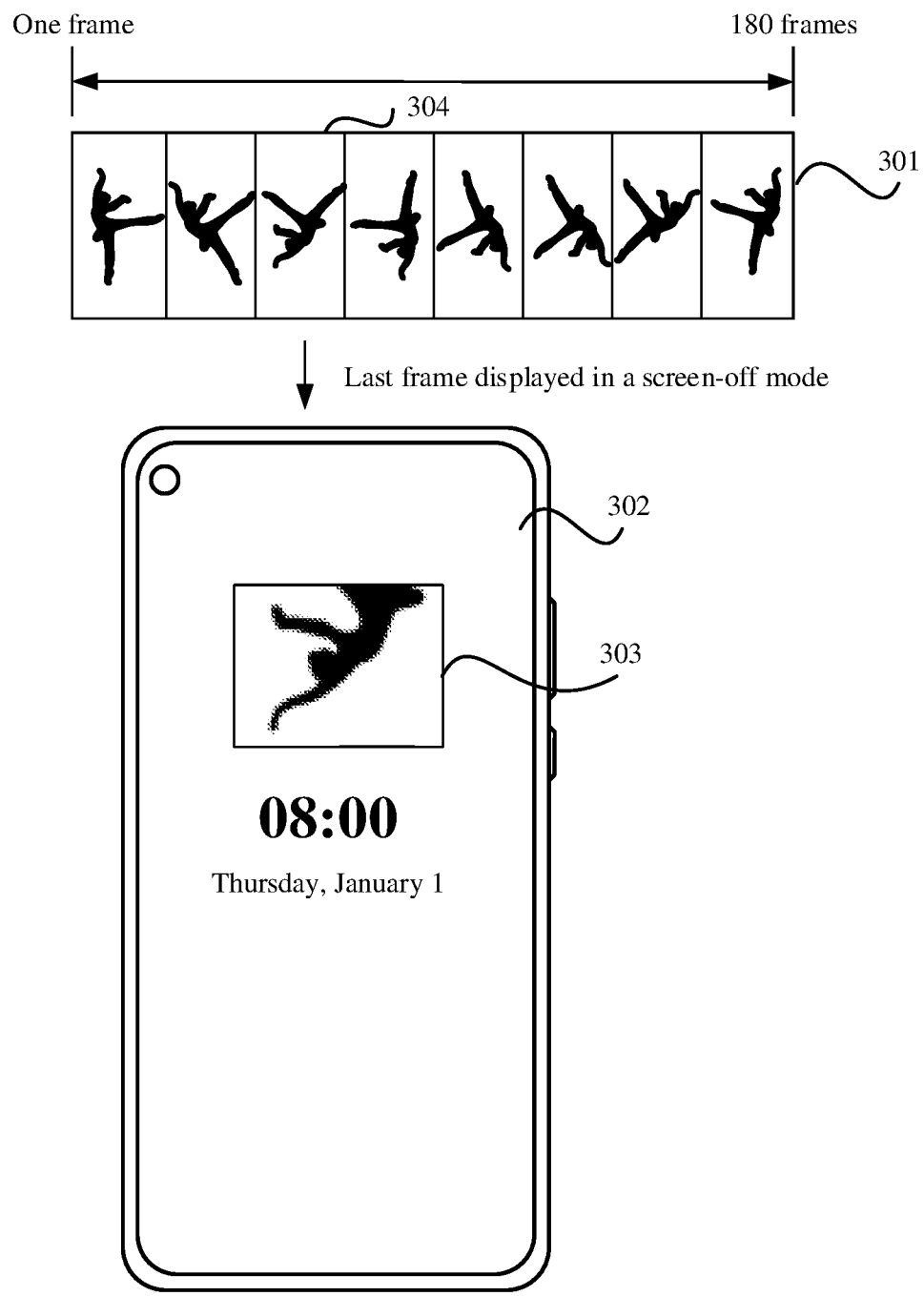

For example, the mobile phone may successively play the image frames in the video clip 301 in the transition animation display box 303. Referring to FIG. 3b, for example, a key frame in the screen-off mode is preset on the mobile phone. The key frame is optionally a last image frame played in a current mode. For example, the key frame in the screen-off mode is an image frame 304 in the video clip 301. For example, the transition animation display box 303 of the mobile phone successively plays the image frames in the video clip 301, until the image frame 304 is played. An image displayed in the transition animation display box 303 stays in the image frame 304. It may be understood that a picture in the transition animation display box 303 in the screen-off interface 302 is frozen at the image frame 304, and another control (for example, the time control) runs normally.

Figure 4:
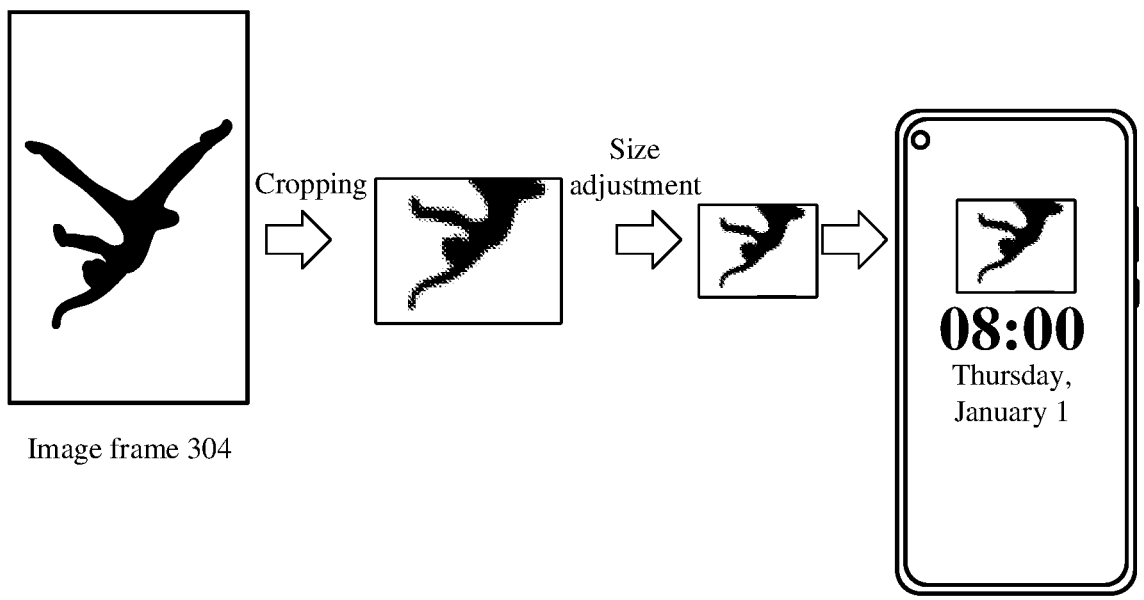
FIG. 4 is a schematic diagram of processing an image frame played in a screen-off mode.

It should be noted that the mobile phone may perform corresponding processing on an image frame in the transition animation corresponding to the screen-off mode, so that each image frame meets a size requirement of the transition animation display box 303. For example, referring to FIG. 4, the image frame 304 is used as an example, and the mobile phone performs grayscale processing on an image frame 601. The mobile phone selects one or more body parts from a grayscale-processed image frame 304 based on a specified size (for example, 1440×800, which is not limited in this application). A size of each body part is the specified size. Optionally, a plurality of body parts may partially overlap. The terminal may calculate a difference value of each single pixel in each body part. The difference value of the single pixel is a difference value between the pixel and a surrounding pixel. The mobile phone may obtain a sum of difference values of pixels in the body part, that is, a difference value of the body part. The mobile phone may crop a body part with a largest difference value in the image frame 304. In addition, a size of a cropped body part is adjusted according to a specific proportion (for example, reduced by 50%), to obtain an adjusted body part. The mobile phone adds a specific shape mask to the size-adjusted body part. For example, the specific shape mask may be a rectangular mask, a circular mask, a triangular mask, or the like. This is not limited in this application. The processed image frame is an image displayed in the transition animation display box 303. It should be noted that in this embodiment of this application, only an example in which the specific shape mask is a rectangular mask is used for description. In another embodiment, if a circular mask is used in a processing process, a shape of the transition animation display box 303 may be a circle, a triangle, or the like. This is not limited in this application.

Figure 3C:
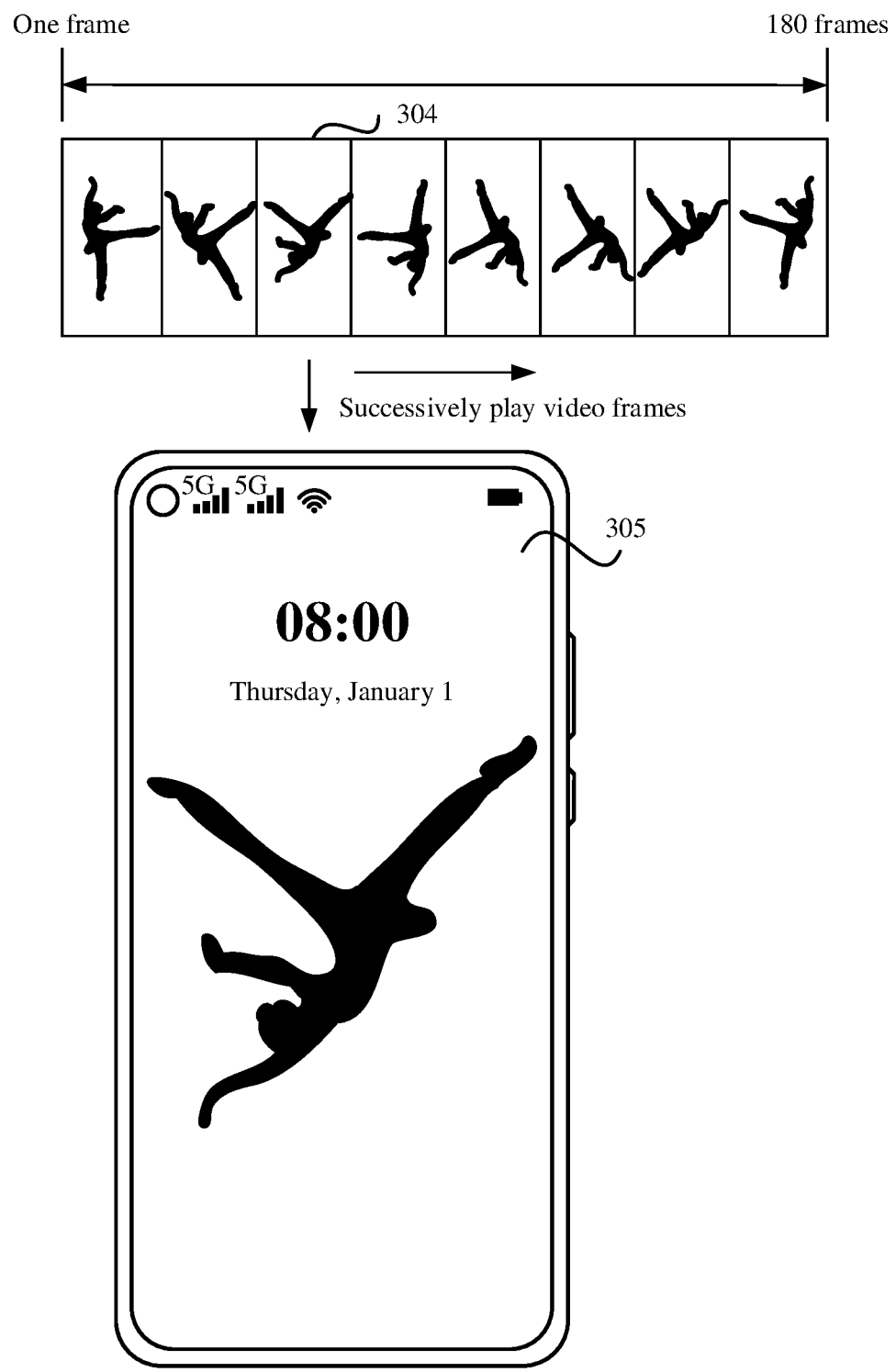

Still referring to FIG. 3b, for example, the user may enable, by touching the power button, touching the screen, or the like in the screen-off interface 302, the mobile phone to enter the lock-screen mode. Referring to FIG. 3c, for example, the mobile phone enters the lock-screen mode. In a lock-screen interface 305 of the mobile phone, image frames of the transition animation in the lock-screen mode are successively played. For example, a first image frame of the transition animation in the lock-screen mode is optionally the last image frame of the transition animation in the screen-off mode, that is, the key frame (for example, the image frame 304) in the screen-off mode.

For example, the lock-screen interface 305 may further include one or more controls, for example, a time control, a network control, and a battery level control. For example, the one or more controls shown in the lock-screen interface 305 may alternatively be displayed when any frame of the transition animation in the lock-screen mode is played. Optionally, the one or more controls may be displayed in a manner such as flying-in, fading-in, or the like. This is not limited in this application.

Figure 3D:
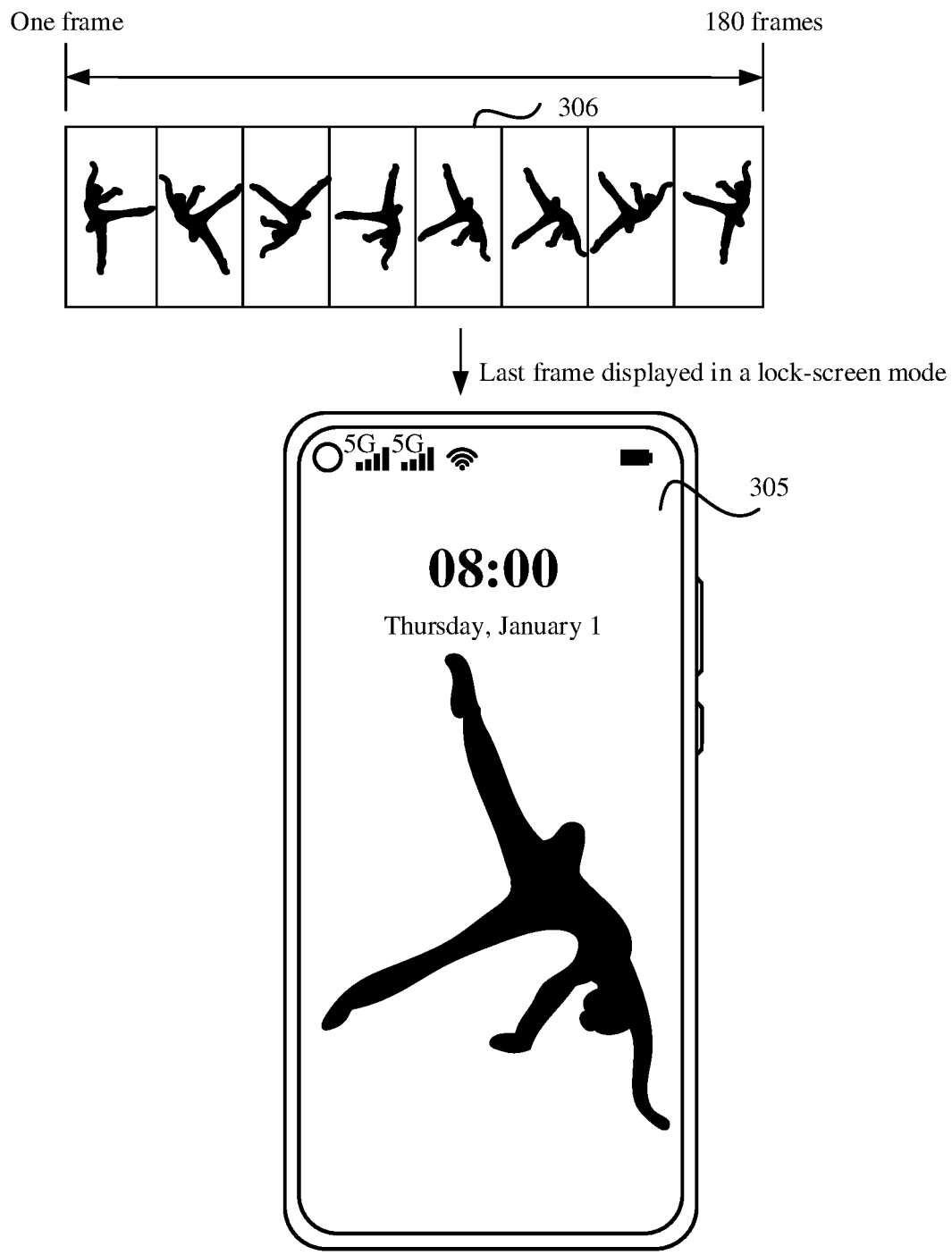

Referring to FIG. 3d, for example, similar to that in the screen-off mode, the transition animation played in the lock-screen interface 303 is played until a key frame in the lock-screen mode. For example, an image frame 306 is the key frame in the lock-screen mode. Correspondingly, the transition animation played in the lock-screen interface 303 is played until the image frame 306, and then is still. In other words, before the mobile phone is unlocked or before the mobile phone re-enters the screen-off mode, an image displayed in the lock-screen interface 305 is always the image frame 306. For example, the user may perform unlocking in a manner such as slide to unlock, fingerprint-based unlocking, or the like. The mobile phone enters the home screen mode (also referred to as an unlocked mode) in response to a received user operation.

Figure 3E:
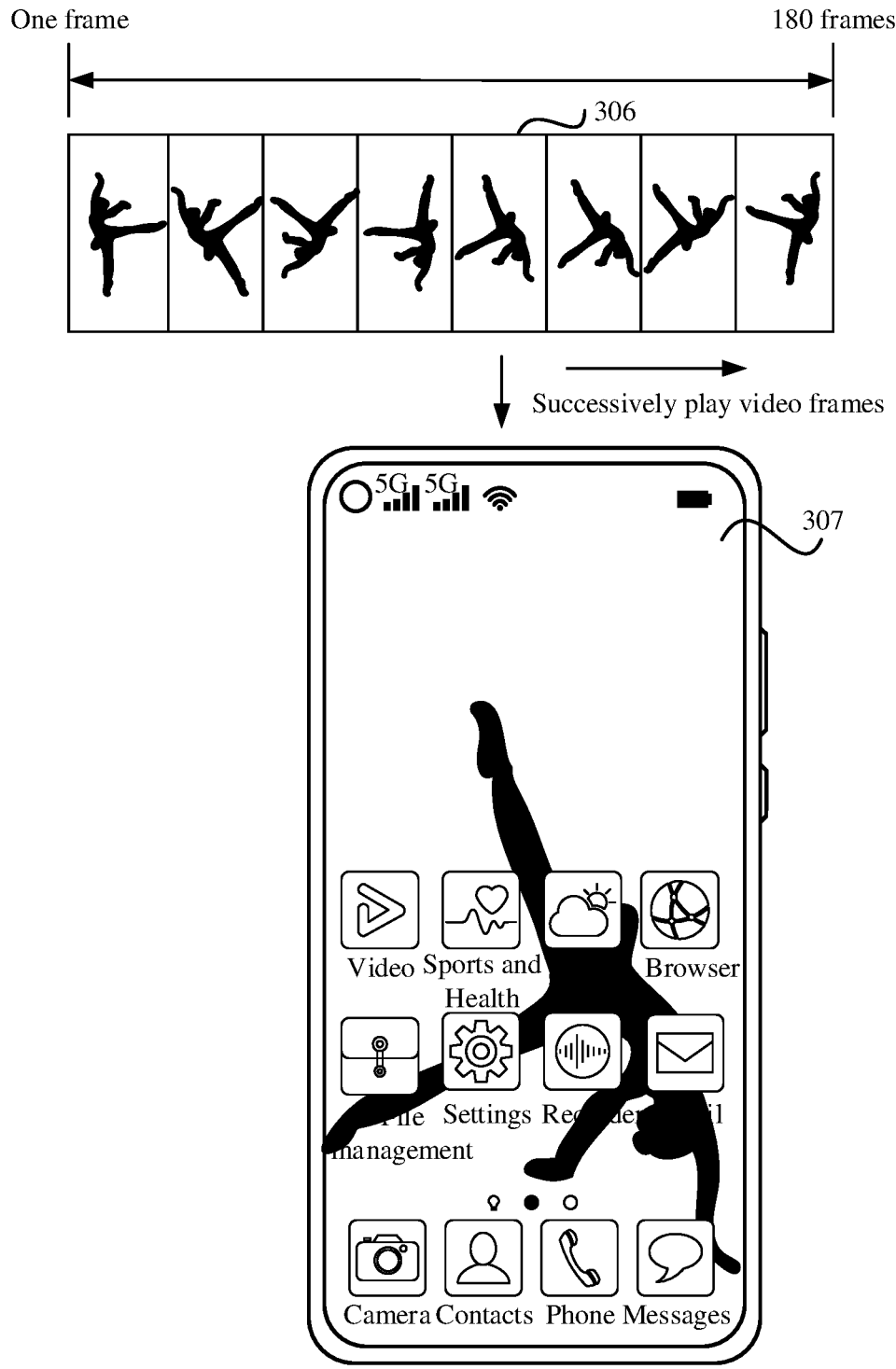

Referring to FIG. 3e, for example, the mobile phone enters the home screen mode. A home screen (also referred to as a mobile phone display interface) 307 successively plays image frames of the transition animation in the home screen mode. For example, a first image frame of the transition animation in the home screen mode is optionally the last image frame of the transition animation in the lock-screen mode, that is, the key frame (for example, the image frame 306) in the lock-screen mode.

Optionally, the image frames of the transition animation in the home screen mode may be displayed on the home screen 307 in a manner such as tiling, stretching, or the like. For example, the home screen 307 may further include one or more controls, for example, a time control, a network control, a battery level control, and an application icon control. For example, the one or more controls shown on the home screen 307 may alternatively be displayed when any frame of the transition animation in the home screen mode is played. Optionally, the one or more controls may be displayed in a manner such as flying-in, fading-in, or the like. This is not limited in this application. It should be noted that, in this embodiment of this application, an example in which the home screen is entered after the lock-screen mode is unlocked is used for description. In another embodiment, the mobile phone may alternatively enter an interface displayed before the mobile phone screen is turned off, for example, a web page.

Figure 3F:
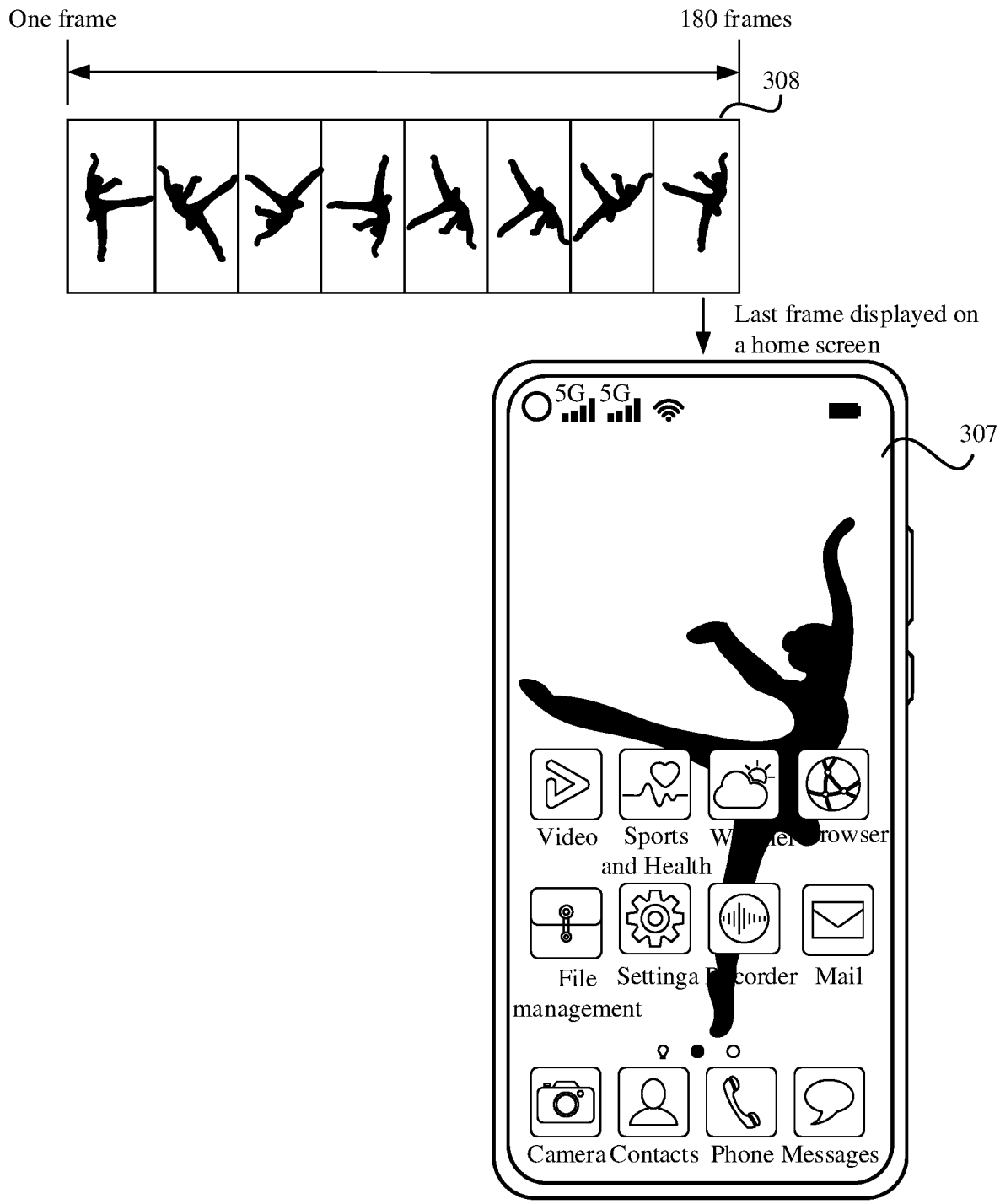

Referring to FIG. 3f, for example, the transition animation played on the home screen 307 is played until a key frame in the home screen mode, for example, an image frame 308. Correspondingly, the transition animation played on the home screen 307 is played until the image frame 308, and then is still.

Embodiments of this application provide a display manner of a transition animation from the screen-off mode to the lock-screen mode, so that the transition animation from the screen-off mode to the lock-screen mode can be smoother and more coherent. FIG. 5a to FIG. 5d show an example of a display manner of a transition animation from the screen-off mode to the lock-screen mode. Referring to (1) in FIG. 5a, for example, after the mobile phone enters the screen-off mode, the transition animation in the screen-off mode is played in a transition animation display box 502 in the screen-off mode, and is frozen at the last frame in the screen-off mode (that is, the key frame in the screen-off mode), for example, the image frame 304 in FIG. 3b. For other descriptions, refer to FIG. 3a and FIG. 3b. Details are not described herein again.

For example, when the mobile phone receives an operation such as triggering the power button by a user, the mobile phone enters the lock-screen mode. Referring to (2) in FIG. 5a, for example, the mobile phone displays a lock-screen interface 503. Optionally, a time control and the like in a screen-off interface 502 disappear. The mobile phone starts to play the transition animation in the lock-screen interface 503. Optionally, before the lock-screen mode is entered from the screen-off mode, the screen may be black, and the lock-screen interface 503 is displayed after the screen is black.

Figure 5A:
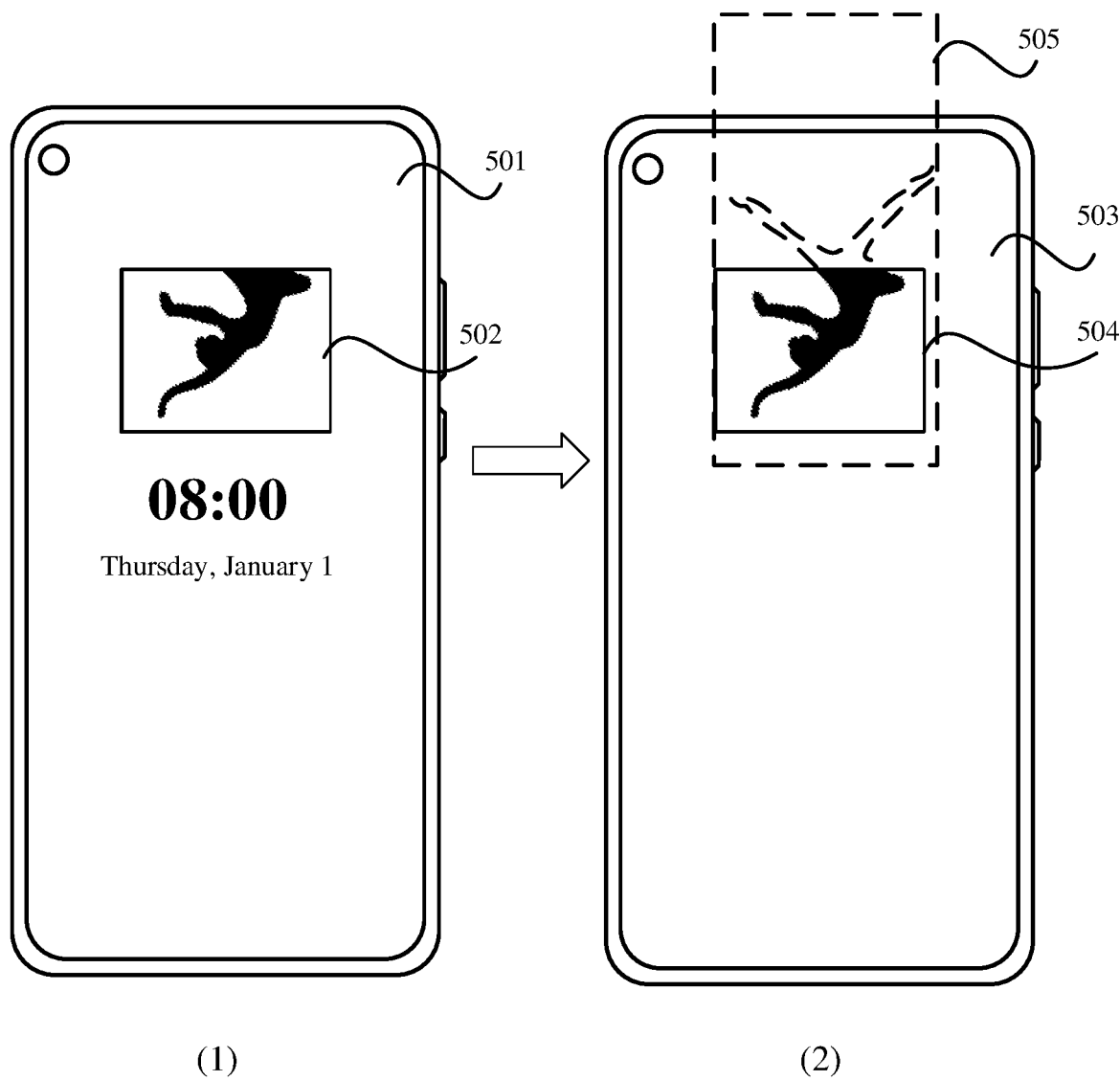
FIG. 5a to FIG. 5d show an example of a display manner of a transition animation from a screen-off mode to a lock-screen mode.

Still referring to (2) in FIG. 5a, for example, the lock-screen interface 503 includes a field-of-view box 504 and an image indication box 505. For example, a position of a center point of the field-of-view box 504 in the lock-screen interface 503 is the same as a position of a center point of the transition animation display box 502 in (1) in FIG. 5a in the screen-off interface 501. The center point refers to a geometric center of the field-of-view box or the transition animation display box (which keeps the same below, and is not described repeatedly).

Optionally, in this embodiment of this application, an example in which the field-of-view box 504 is a rectangular box is used for description. In another embodiment, the field-of-view box 504 may alternatively be in another shape, such as a circle or a triangle. This is not limited in this application.

For example, in this embodiment of this application, a size and a position of the field-of-view box 504 in the lock-screen interface 503 are the same as a size and a position of the transition animation display box 502 in the screen-off interface 501. For example, in this embodiment of this application, an example in which a center point of the field-of-view box 504 and a center point of the lock-screen interface 503 are on a same vertical line and a center point of the transition animation display box 502 and a center point of the screen-off interface 501 are on a same vertical line is used for description.

In this embodiment of this application, the field-of-view box 504 is used to display a part of the image indication box 505 on which the field-of-view box is superimposed. It should be noted that a part outside the field-of-view box 504 is optionally black. In other words, from a user's perspective, the lock-screen interface 503 displays an image in only the field-of-view box 504 currently, and other parts other than the field-of-view box 504 in the lock-screen interface 503 are all black.

For example, the image indication box 505 includes the first image frame of the transition animation in the lock-screen mode, that is, the last frame in the screen-off mode (that is, the key frame in the screen-off mode). In other words, in this embodiment of this application, in a process of switching from the screen-off mode to the lock-screen mode, the first image frame displayed in the lock-screen mode and the last frame in the screen-off mode are the same image frame, so that a transition between the lock-screen mode and the screen-off mode is more coherent, and user experience is improved.

For example, as described above, an image displayed in the transition animation display box 502 is obtained after cropping and size adjustment. Correspondingly, an image size displayed in the image indication box 505 is corresponding to a size of the image obtained after size adjustment. For example, as described in FIG. 4, the mobile phone reduces the body part by 50% according to the preset proportion. In this case, in (2) in FIG. 5a, the size of the image in the image indication box 505 is obtained after an original image (for example, the image frame 304 in FIG. 3d) is reduced by 50%. The foregoing size is merely an example, and is not limited in this application.

For example, as described above, the field-of-view box 504 is used to display an image, to improve coherence of display from the screen-off mode to the lock-screen mode. In this embodiment of this application, the image displayed in the field-of-view box 504 is consistent with the image displayed in the transition animation display box 502. For example, to make the image displayed in the field-of-view box 504 consistent with the image displayed in the transition animation display box 502, a part that is of the field-of-view box 504 and that is superimposed on the image indication box 505 needs to be consistent with the image displayed in the transition animation display box 502. To be specific, an overlapping part is a part obtained after size adjustment is performed on the body part in FIG. 4. Correspondingly, according to the foregoing rule, the mobile phone may superimpose the image indication box 505 under the field-of-view box 504 based on a current position of the field-of-view box 504, so that an overlapping part between the field-of-view box 504 and the image indication box 505 is the body part obtained after cropping in FIG. 4.

For example, in this embodiment of this application, the field-of-view box 504 and the image indication box 505 are gradually enlarged, and moved toward a center of the lock-screen interface 503 in an enlargement process. It should be noted that in this embodiment of this application, descriptions are provided by using an example in which the field-of-view box 504 and the image indication box 505 are enlarged by a same proportion and moved at a same speed toward the center of the lock-screen interface 503, but have different moving tracks. In another embodiment, the field-of-view box 504 and the image indication box 505 may be enlarged by different proportions, and/or a moving speed of the field-of-view box 504 toward the center of the lock-screen interface 503 may be different from a moving speed of the image indication box 505 toward the center of the lock-screen interface 503, and/or a moving track of the field-of-view box 504 toward the center of the lock-screen interface 503 may be different from a moving track of the image indication box 505. This is not limited in this application.

It should be noted that, in this embodiment of this application, a size of an image in the image indication box 505 is consistent with that of the image indication box 505. In other words, in a process of changing a size and a position of the image indication box 505, the size of the image in the image indication box 505 is always consistent with the size of the image indication box.

Further, it should be noted that the image indication box 505 in this embodiment of this application is merely used to describe a superimposition manner and a display manner of the image and the field-of-view box, and the image indication box 505 is not displayed in the lock-screen interface 503. Certainly, a part that is of the image indication box 505 and that falls outside the lock-screen interface 503 is merely used to better describe the size and the position of the image indication box 505. No repeated description is provided below. In other words, from a user's perspective, the user sees an image displayed in only the field-of-view box 504 in the lock-screen interface 503, and other parts of the lock-screen interface 503 are all black.

For example, as described above, in (1) in FIG. 5*a*, the center of the field-of-view box 504 and the center of the lock-screen interface 503 are on the same vertical line, but the center of the image indication box 505 and the center of the lock-screen interface 503 are not on a same vertical line. For example, when the field-of-view box 504 moves toward the center of the lock-screen interface 503, only vertical downward movement is required. When the image indication box 505 moves toward the center of the lock-screen interface 503, the image indication box 505 needs to move toward the lower left to approach the center of the lock-screen interface 503. In addition, as described above, the field-of-view box 504 and the image indication box 505 are enlarged by the same proportion. According to the foregoing enlargement and movement manner, positions of the image indication box 505 and the field-of-view box 504 after enlargement and movement are shown in (1) in FIG. 5*b*. Referring to (1) in FIG. 5*b*, for example, a part that is of the field-of-view box 504 and that is superimposed on the image indication box 505 is an image currently displayed in the field-of-view box 504. It should be noted that a part other than the field-of-view box 504 in the image indication box 505 is still black.

It should be noted that in this embodiment of this application, as shown in FIG. 3*c*, the transition animation from the screen-off mode to the lock-screen mode includes a plurality of image frames between the first frame (for example, the image frame 304) in the lock-screen mode and the last frame (for example, the image frame 306) in the lock-screen mode. For example, 60 image frames may be included. It should be noted that the image frames included in the video clip 301 shown in FIG. 3*a* to FIG. 3*e* are merely folded image frames. For example, the image frame 304 optionally includes 20 image frames after being unfolded (this is merely an example, and is not limited in this application). Correspondingly, to implement an animation effect from the screen-off mode to the lock-screen mode, in a process of gradually displaying an image in the lock-screen mode according to FIG. 5*a* to FIG. 5*d*, the lock-screen interface 503 still successively plays the image frames in the video clip 301. In other words, the image in the image indication box 505 varies with the image frame in the video clip.

For example, the image frame 304 includes an image frame 1, an image frame 2, . . . , and an image frame 20 after being unfolded. In (2) in FIG. 5*a*, an image included in the image indication box 505 is the image frame 1, and correspondingly, the field-of-view box 504 displays a part superimposed on the image frame 1. As described above, the image indication box 505 and the field-of-view box 504 are gradually enlarged and moved, and the image indication box 505 successively includes the image frames obtained after the image frame 304 is unfolded. After the image indication box 505 and the field-of-view box 504 are enlarged and moved, as shown in (1) in FIG. 5*b*, in this case, an image included in the image indication box 505 is the image frame 5, and correspondingly, the field-of-view box 504 displays a part superimposed on the image frame 5. The image indication box 505 and field-of-view box 504 continue to be enlarged and moved, and are shown in (2) in FIG. 5*b* after being enlarged and moved. Referring to (2) in FIG. 5*b*, for example, an image included in the image indication box 505 is the image frame 13, and correspondingly, the field-of-view box 504 displays a part superimposed on the image frame 13. It may be understood that, in a process in which the field-of-view box 504 is gradually enlarged and moved, the displayed image is also dynamically changed. For example, a dancer in the video clip is used as an example. In (2) in FIG. 5*a*, the field-of-view box 504 is being flipped down, and as the field-of-view box 504 is gradually enlarged and moved and successively plays the image frames, the dancer displayed in the field-of-view box 504 continues to be flipped down. The following is similar, and no repeated description is provided.

For example, in a process in which the image indication box 505 is enlarged and moved, if each border of the image indication box 505 is on or outside a border of the lock-screen interface 503, enlargement of the image indication box 505 is stopped. It should be noted that, in this embodiment of this application, that the border of the image indication box 505 is on the border of the lock-screen interface 503 is merely an example for describing a position relationship between the borders. Actually, in a process in which the image indication box 505 is enlarged and moved, the electronic device may obtain a distance between each border of the image indication box 505 and a corresponding border of the lock-screen interface 503. The corresponding border is a border that is parallel to and closest to the image indication box 505. For example, the left border of the image indication box 505 is parallel to the left border and the right border of the lock-screen interface 503, and is closest to the left border. Therefore, the left border is a border corresponding to the left border of the image indication box 505. When the distance between the border of the image indication box 505 and the corresponding border is of, that is, the image indication box 505 overlaps the corresponding border, it means that the border of the image indication box 505 is on the corresponding border in this embodiment of this application. The following is similar, and no repeated description is provided.

Figure 5B:
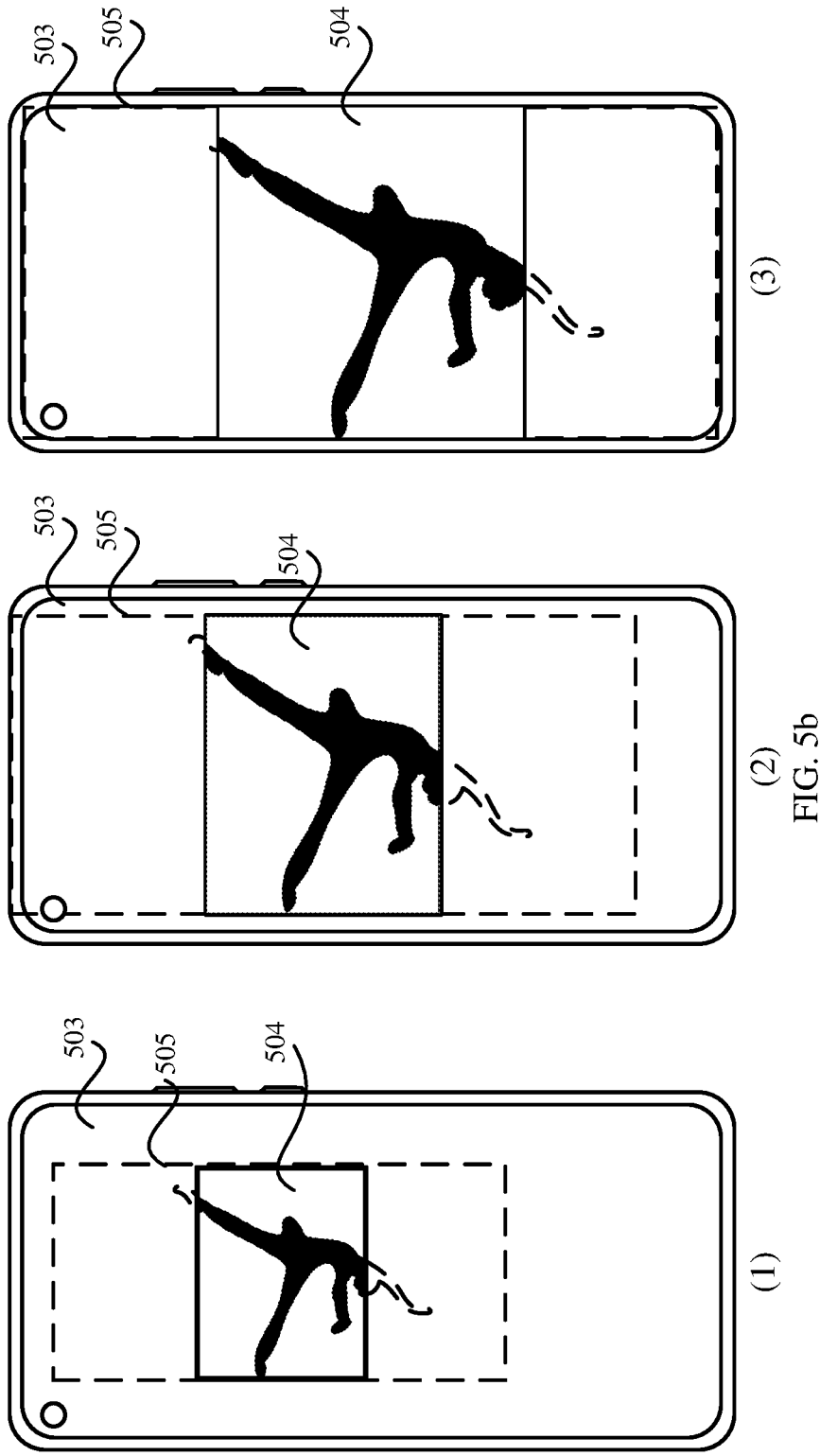

As shown in (3) in FIG. 5b, if four borders of the image indication box 505 are all on borders of the lock-screen interface 503, enlargement of the image indication box 505 is stopped. It should be noted that, in this embodiment of this application, descriptions are provided by using an example in which the center of the image indication box 505 precisely overlaps the center of the lock-screen interface 503 when enlargement of the image indication box 505 is stopped. In another embodiment, if the four borders of the image indication box 505 are all on or outside the borders of the lock-screen interface 503, but the center of the image indication box 505 still does not overlap the center of the lock-screen interface 503, the image indication box 505 continues to be enlarged and moved toward the center of the lock-screen interface 503, until the center of the image indication box 505 reaches the center of the lock-screen interface 503, and then enlargement is stopped. Optionally, after the center of the image indication box 505 overlaps the center of the lock-screen interface 503, if at least one border of the image indication box 505 falls inside a border of the lock-screen interface 503, movement of the image indication box 505 is stopped and the image indication box 505 continues to be enlarged, until each border is on or outside a border of the lock-screen interface 503.

For example, in this embodiment of this application, if four borders of the field-of-view box 504 are on or outside the borders of the lock-screen interface 503, movement and enlargement of the field-of-view box 504 are stopped. After the center of the field-of-view box 504 overlaps the center of the lock-screen interface 503, if at least one border of the field-of-view box 504 is within the lock-screen interface 503, the center of the field-of-view box 504 is kept stationary and the field-of-view box 504 continues to be enlarged. For example, still referring to (3) in FIG. 5b, movement and enlargement of the image indication box 505 are stopped, the center of the field-of-view box 504 overlaps the center of the lock-screen interface 503, the left and right borders of the field-of-view box 504 are on the left and right borders of the lock-screen interface 503, and the upper and lower borders of the field-of-view box 504 still fall inside borders of the lock-screen interface 503. To be specific, a part between the upper border of the field-of-view box 504 and the upper border of the lock-screen interface 505 and a part between the lower border of the field-of-view box 504 and the lower border of the lock-screen interface 505 are still black. Correspondingly, the field-of-view box 504 needs to be further enlarged, until the four borders are all on or outside the borders of the lock-screen interface 503. Referring to (1) in FIG. 5c, for example, the center of the field-of-view box 504 is kept stationary and the field-of-view box 504 continues to be enlarged. In addition, the image in the image indication box 505 is still changed in a sequence of the image frames, and the position and size of the image indication box 505 remain unchanged. For example, referring to (2) in FIG. 5c, the upper border of the field-of-view box 504 is on the upper border of the lock-screen interface 503, the lower border of the field-of-view box 504 is on the lower border of the lock-screen interface 503, the left and right borders of the field-of-view box 504 are outside the left and right borders of the lock-screen interface 503, and enlargement of the field-of-view box 504 is stopped. In this case, the lock-screen interface 503 displays a part that is of the field-of-view box 504 and that is superimposed on the image in the image indication box 505, that is, the entire image in the image indication box 505.

Figure 5C:
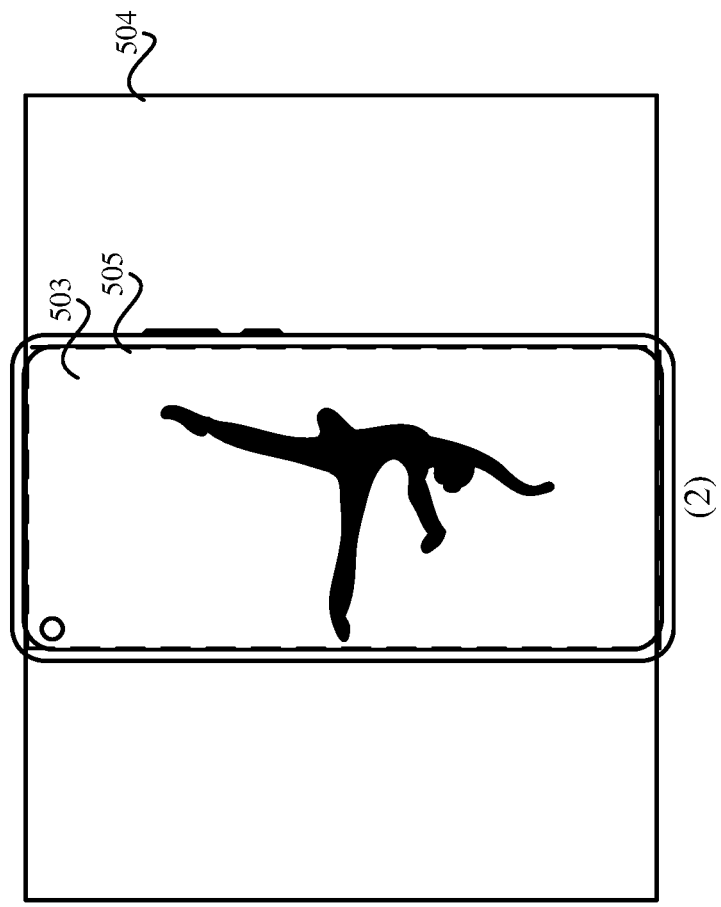
Figure 5C:
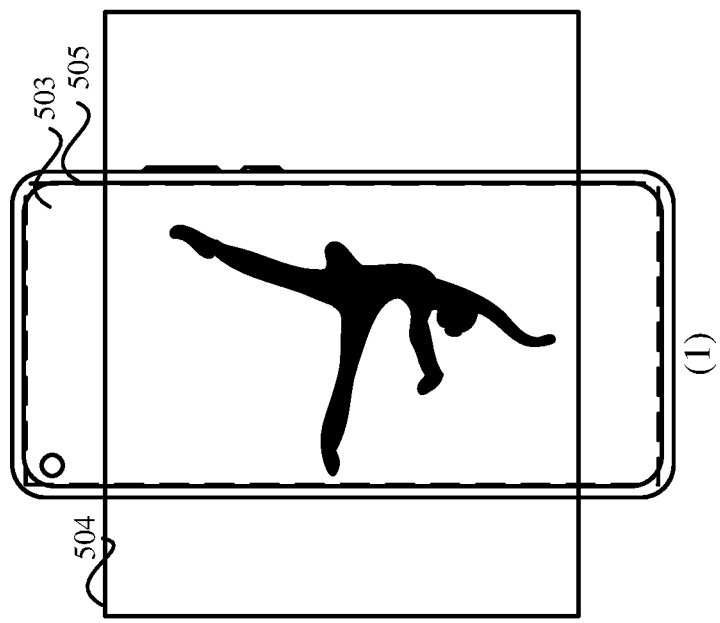
Figure 5D:
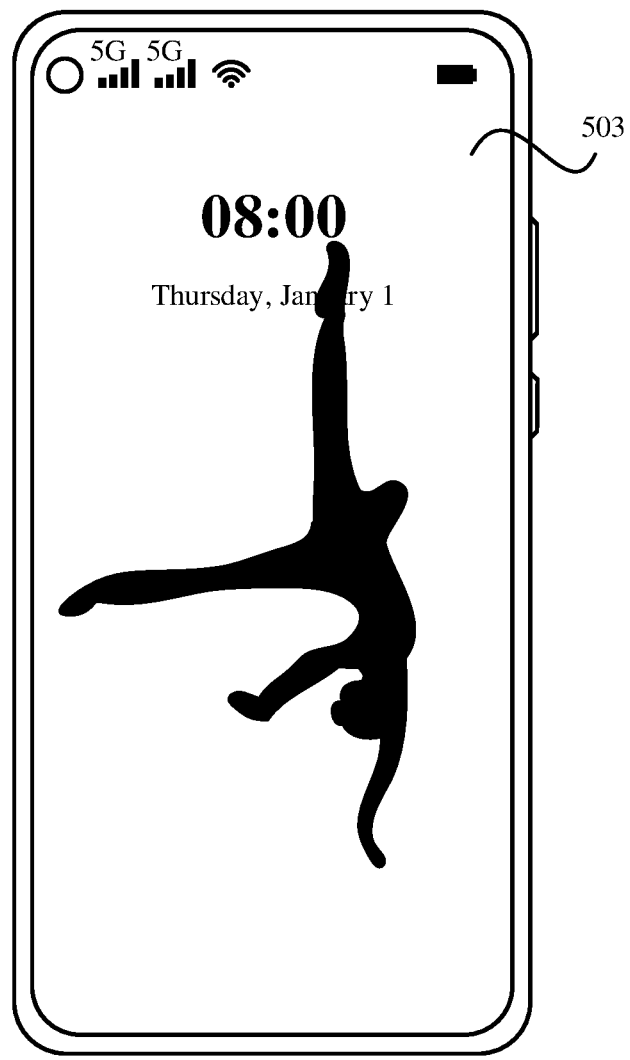

Referring to FIG. 5d, for example, after enlargement of the field-of-view box 504 is stopped, one or more other controls, such as a time control, a network control, and a battery level control, may be displayed in the lock-screen interface 503. It should be noted that if the image displayed in the lock-screen interface 503 in FIG. 5d is the key frame (for example, the image frame 306 in FIG. 3d) in the lock-screen mode, a picture displayed in the lock-screen interface 503 is frozen at the image frame. For example, if the image displayed in the lock-screen interface 503 in FIG. 5d is a frame before the key frame in the lock-screen mode, the lock-screen interface 503 continues to play a subsequent image frame, until the key frame in the lock-screen mode is played.

Figure 6A:
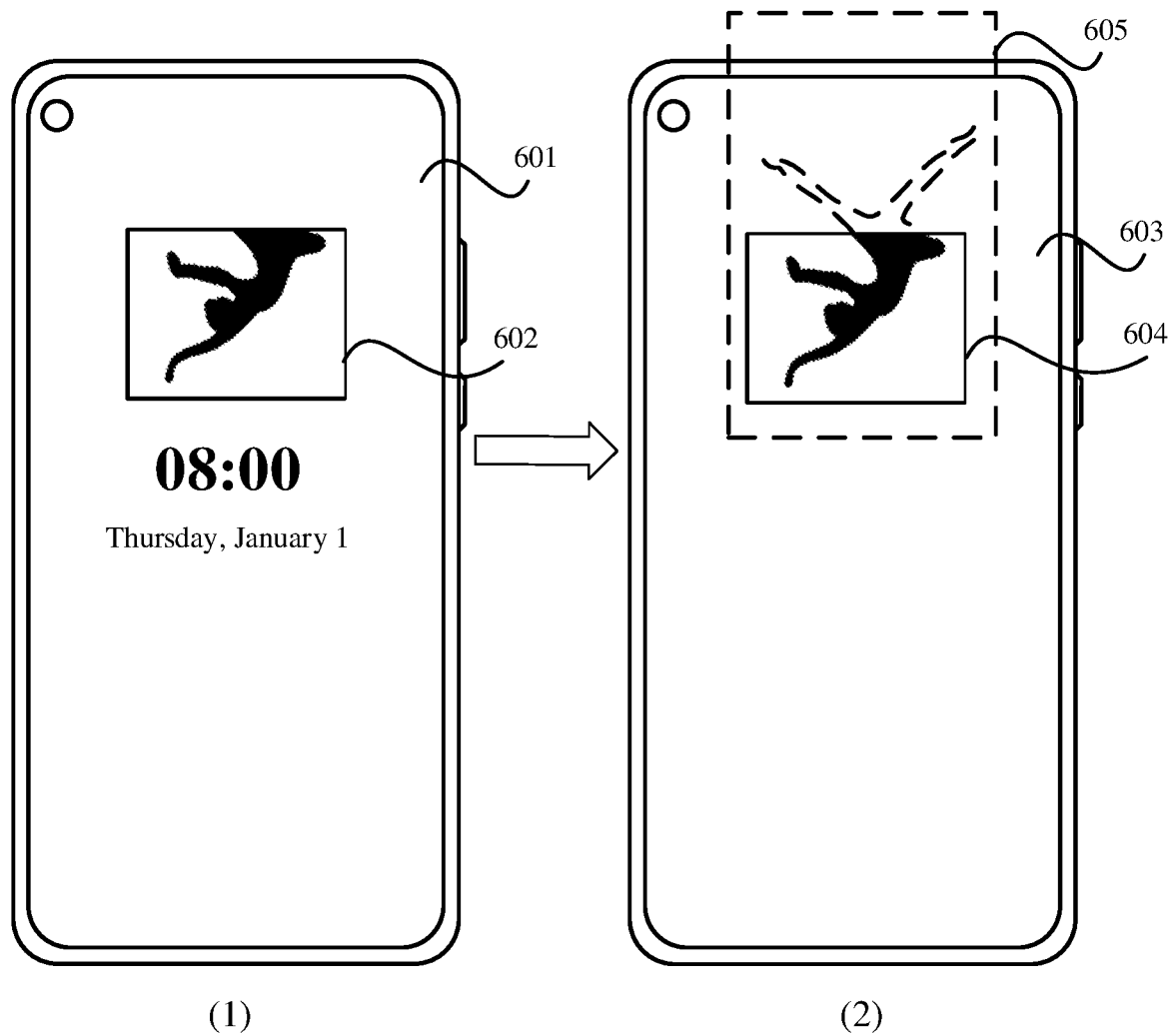
FIG. 6a to FIG. 6d show an example of a display manner of a transition animation from a screen-off mode to a lock-screen mode.

In the transition animation display manner shown in FIG. 5a to FIG. 5c, a proportion of an original image frame is the same as a proportion of the lock-screen interface. To be specific, when the center of the image indication box 505 overlaps the center of the lock-screen interface 503, the four borders of the image indication box 505 (that is, the original image frame) are located on the borders of the lock-screen interface 503. The following uses FIG. 6a to FIG. 6c to describe a display manner of a transition animation when a proportion of an original image frame is different from a proportion of a lock-screen interface. Referring to FIG. 6a, for example, for a screen-off interface 601 shown in (1) in FIG. 6a, refer to related descriptions in (1) in FIG. 5a. Details are not described herein again. For example, the mobile phone enters the lock-screen mode in response to a received user operation. A lock-screen interface is shown in (2) in FIG. 6a. The lock-screen interface 603 includes a field-of-view box 604 and an image indication box 605. For specific descriptions, refer to (2) in FIG. 5a. Details are not described herein again. It should be noted that a proportion of an image in the image indication box 605 is different from that of the image in the image indication box 505.

Figure 6B:
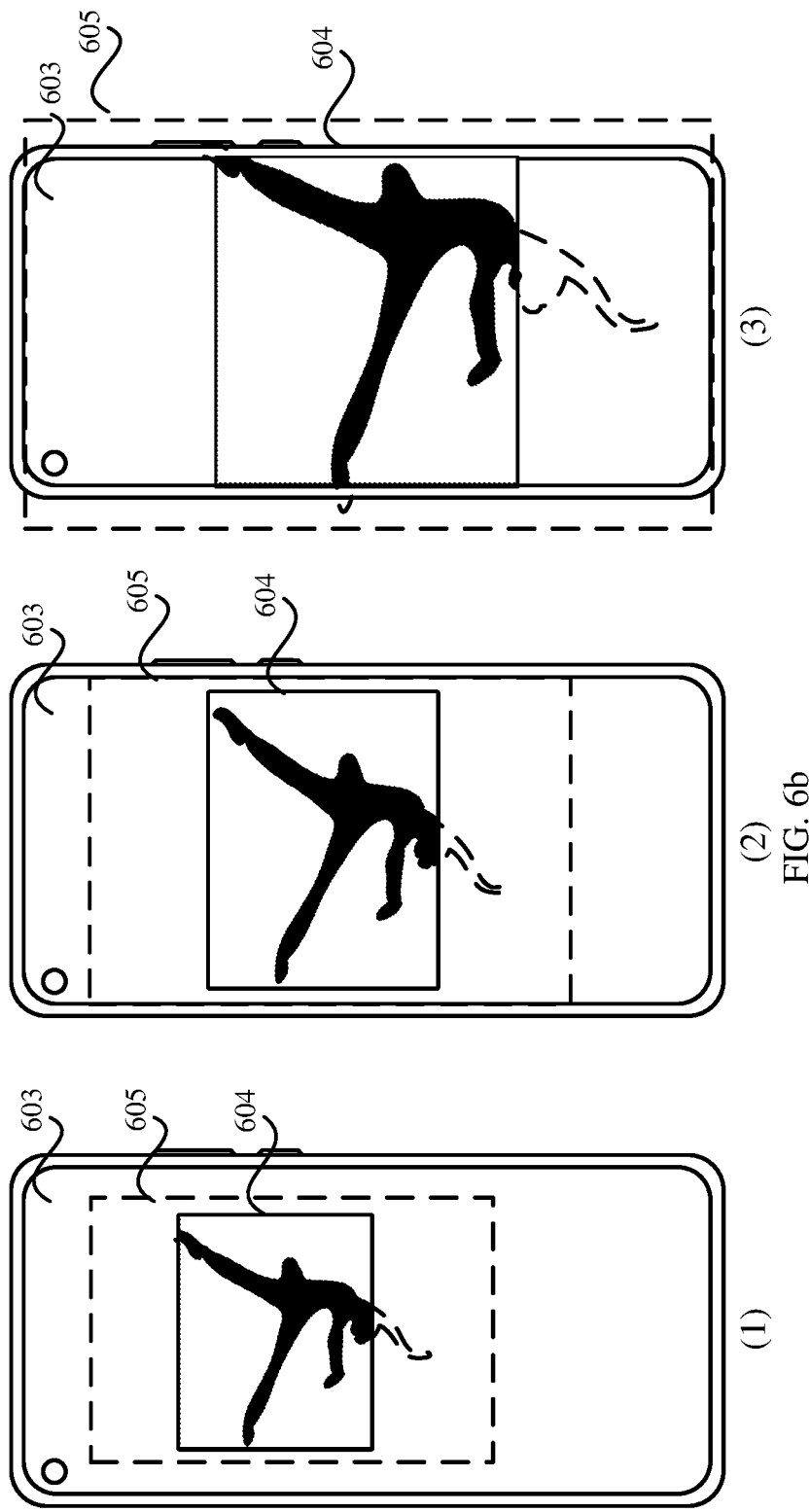

For example, (1) in FIG. 6b is similar to (1) in FIG. 5b, and is used to schematically show size enlargement and movement manners of the image indication box 605 and the field-of-view box 604. For specific descriptions, refer to (1) in FIG. 5b. Details are not described herein again.

Referring to (2) in FIG. 6b, for example, in a process in which the image indication box 605 and the field-of-view box 604 are enlarged and moved, in this embodiment, the left and right borders of the image indication box 605 are on the left and right borders of the lock-screen interface 603, and the upper and lower borders of the image indication box 605 still fall inside the upper and lower borders of the lock-screen interface 603. In this case, the image indication box 605 continues to be moved toward a center and is still enlarged according to a proportion. The field-of-view box 604 is still enlarged and moved in a manner for the field-of-view box 604, without mutual interference with enlargement and movement of the image indication box 605.

Referring to (3) in FIG. 6b, for example, when a center of the image indication box 605 overlaps a center of the lock-screen interface 603, the upper and lower borders of the image indication box 605 are on the upper and lower borders of the lock-screen interface 603, and the left and right borders of the image indication box 605 fall outside the left and right borders of the lock-screen interface 603. Correspondingly, as shown in (3) in FIG. 6b, a part of image in the image indication box 605 (for example, a part of image of the left foot of a dancer and a part of image of the right foot of the dancer) is located outside the lock-screen interface 603, and the part of image is not displayed in the lock-screen interface 603. For descriptions of the field-of-view box 604, refer to (3) in FIG. 5b. Details are not described herein again.

Figure 6C:
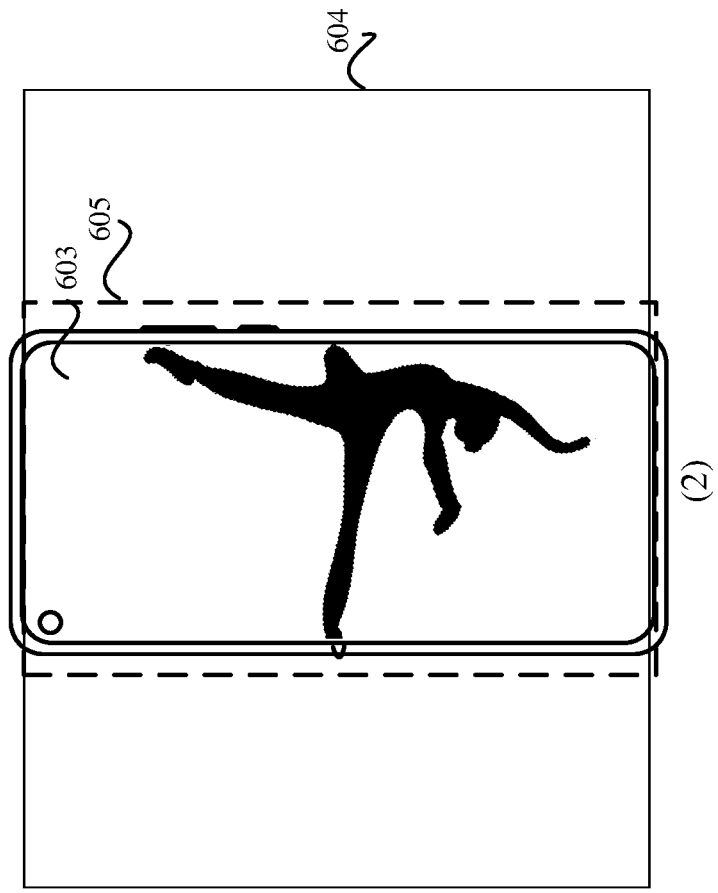
Figure 6C:
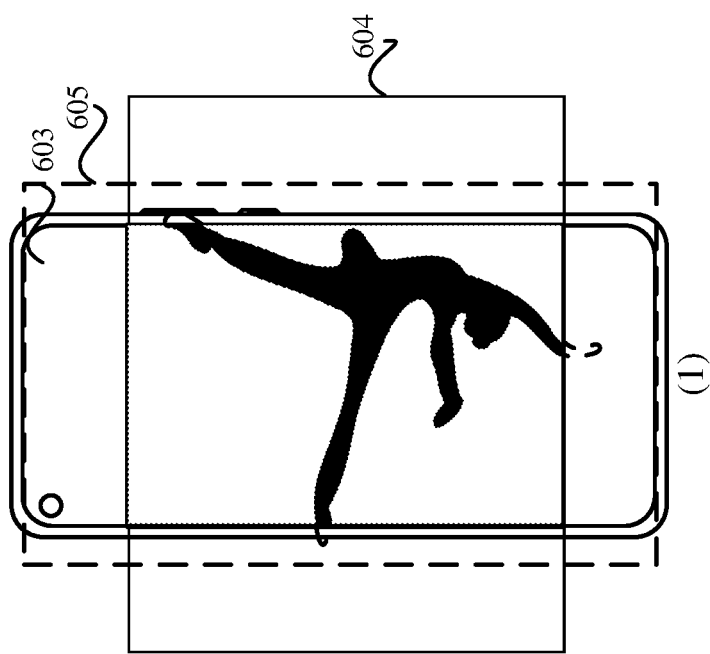

Referring to (1) in FIG. 6c, for example, when the image indication box 605 is no longer moved and is no longer changed in terms of size, a center of the field-of-view box 604 remains unchanged and the field-of-view box 604 continues to be enlarged. It should be noted that, as shown in (1) in FIG. 6c, the left and right borders of the field-of-view box 604 fall outside the left and right borders of the lock-screen interface 603. However, a picture displayed in the lock-screen interface 603 is only a part that is in an overlapping part between the field-of-view box 603 and the image in the image indication box 605 and that is within the lock-screen interface 603. In other words, even if the part of image of the right foot and the part of image of the left foot of the dancer are within the field-of-view box 604, neither of the two parts is displayed in the lock-screen interface 603.

Referring to (2) in FIG. 6c, for example, the left and right borders of the field-of-view box 604 fall outside the left and right borders of the lock-screen interface 603, the upper and lower borders of the field-of-view box 604 are on the upper and lower borders of the lock-screen interface 603, and enlargement of the field-of-view box 603 is stopped. In this case, the lock-screen interface 603 displays the part that is in the overlapping part between the field-of-view box 604 and the image in the image indication box 605 and that is within the lock-screen interface 603. It should be noted that, as described above, in a process in which the image indication box 605 is enlarged and moved, the image in the image indication box changes with an image frame of the video clip. Therefore, because the dancer is flipped down, in (2) in FIG. 6c, the part of image of the left foot of the dancer is outside the lock-screen interface 603, and the image of the right foot of the dancer is inside the lock-screen interface 603.

Figure 6D:
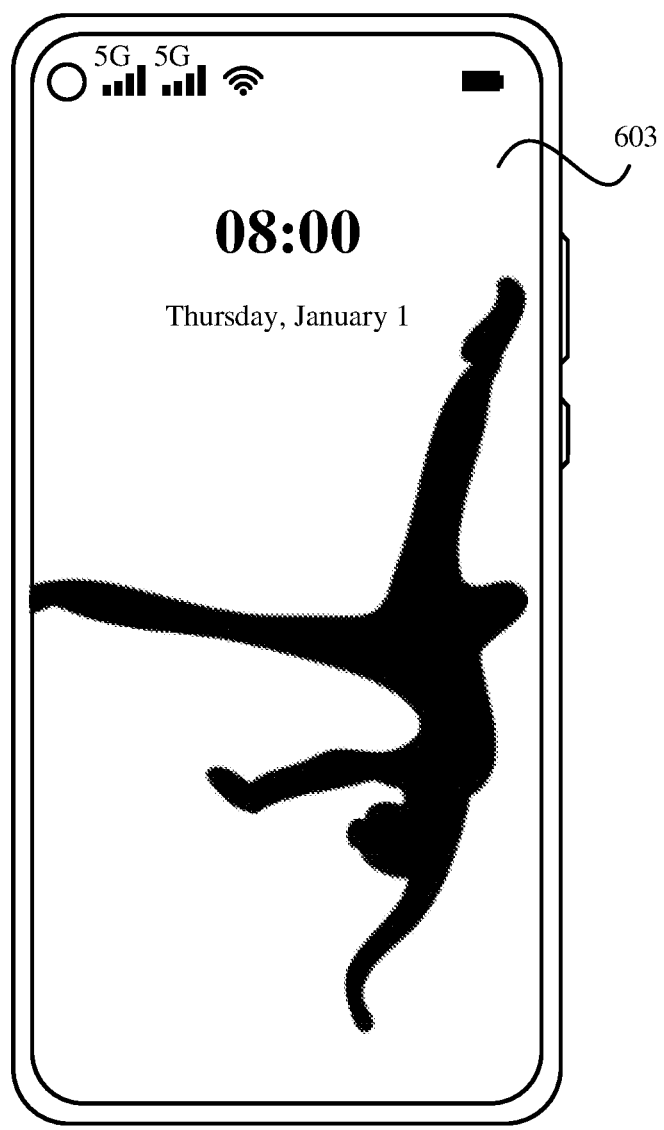

Referring to FIG. 6d, for example, the lock-screen interface 603 may continue to play the image frames in the video clip 301, until the key frame in the lock-screen mode is played. In addition, the lock-screen interface 603 displays one or more other controls. For specific descriptions, refer to FIG. 5d. Details are not described herein again. It should be noted that, because the proportion of the image frame is different from that of the lock-screen interface, a part of the image frame played in the lock-screen interface 603 may always be outside the lock-screen interface 603.

Figure 7A:
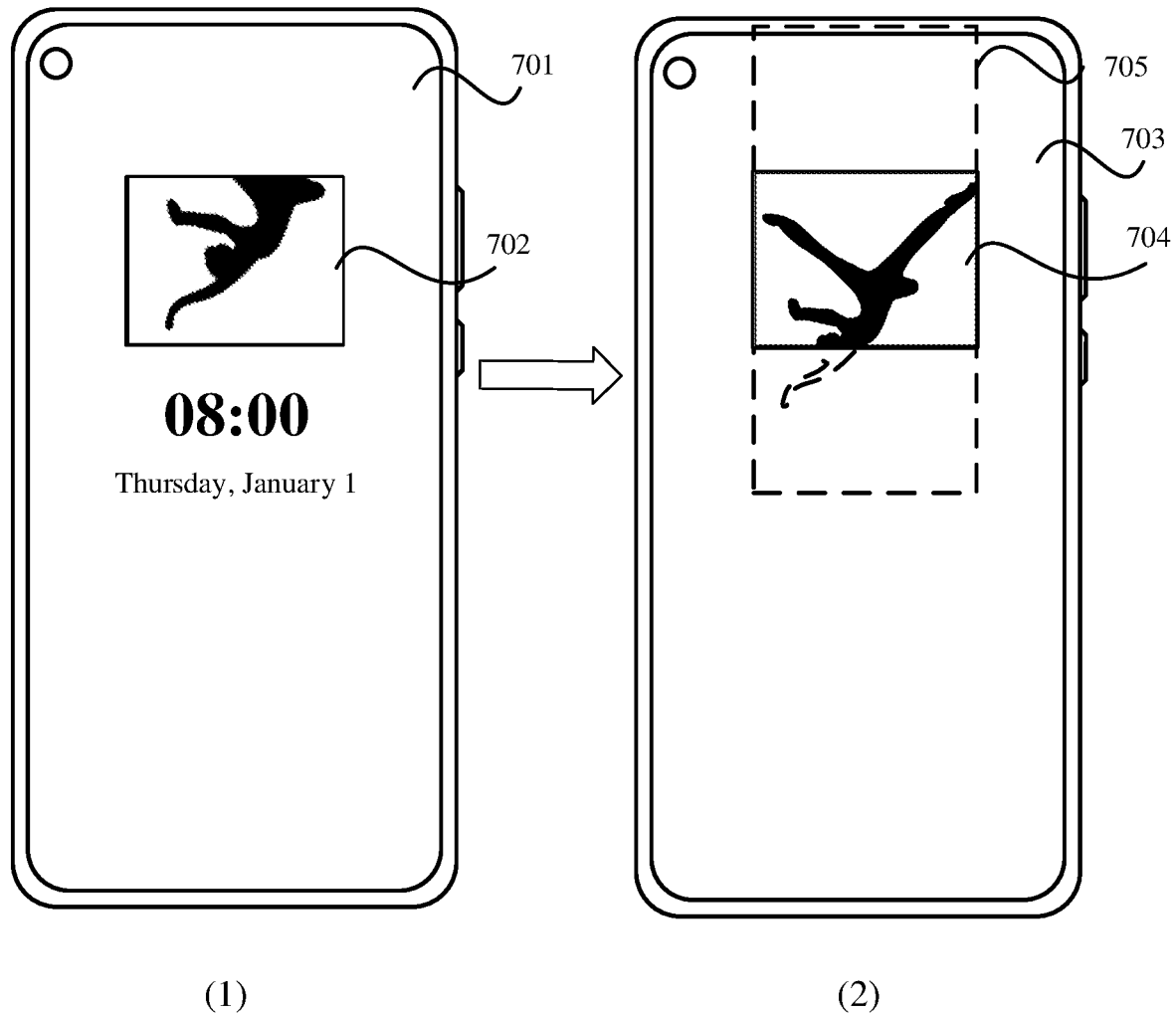
FIG. 7a and FIG. 7b show an example of a display manner of a transition animation from a screen-off mode to a lock-screen mode.

FIG. 7a to FIG. 7d show an example of another display manner of a transition animation from the screen-off mode to the lock-screen mode. Referring to (1) in FIG. 7a, a screen-off interface 701 includes a transition animation display box 702 and another control. For specific descriptions, refer to the descriptions in FIG. 5a. Details are not described herein again. Referring to (2) in FIG. 7a, for example, different from (2) in FIG. 5a, in (2) in FIG. 7a, a center of an image indication box 705, a center of a field-of-view box 704, and a center of a lock-screen interface 703 are on a same vertical line. Optionally, the center of the image indication box 705 may overlap the center of the field-of-view box 704. To be specific, in a subsequent size enlargement and movement process, the image indication box 705 and the field-of-view box 704 may be moved vertically toward the center of the lock-screen interface 703 at the same time. For example, because a position of the image indication box 705 in (2) in FIG. 7a is different from the position of the image indication box 505 in (2) in FIG. 5a, an image displayed in the field-of-view box 704 is different from the image displayed in the field-of-view box 504. As shown in (2) in FIG. 7a, the field-of-view box 704 is located in a middle part of the image indication box 705, and the image displayed in the field-of-view box 704 is an overlapping part between the field-of-view box 704 and an image in the image indication box 705, for example, a lower body part of a dancer.

Figure 7B:
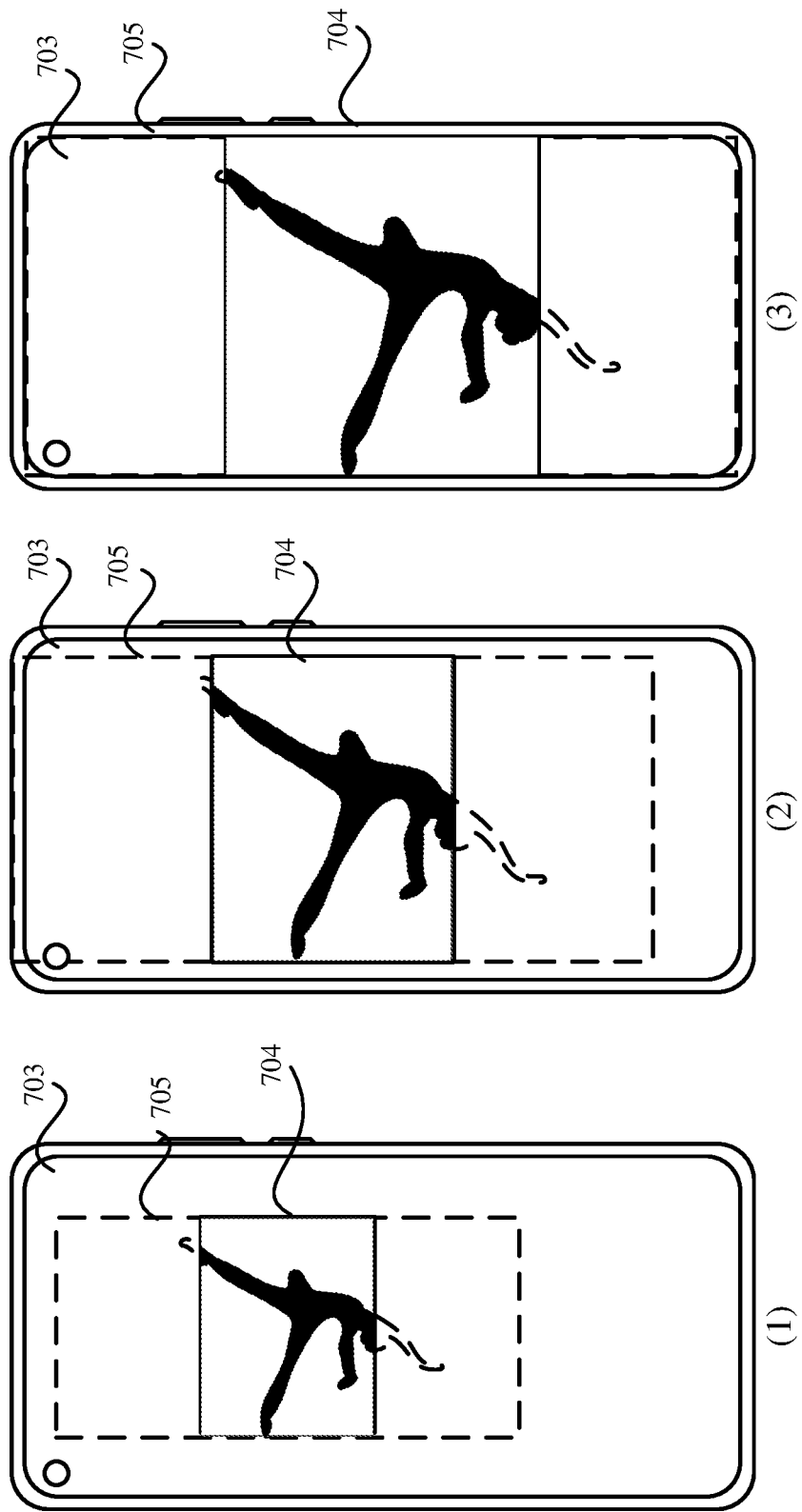

For example, the image indication box 705 and the field-of-view box 704 are moved vertically toward the center of the lock-screen interface 703 when being enlarged, as shown in (1) in FIG. 7b. Referring to (1) in FIG. 7b, for example, the image indication box 705 and the field-of-view box 704 are moved downward at the same time and enlarged by a same proportion. The field-of-view box 704 displays a part that overlaps the image in the image indication box 705. For other descriptions and specific descriptions of (2) in FIG. 7b, refer to related descriptions in FIG. 5b. Details are not described herein again. For example, referring to (3) in FIG. 7b, which is the same as (3) in FIG. 5b, four borders of the image indication box 705 are on the lock-screen interface 703, and a position and a size of the image indication box 705 are kept unchanged. For example, the left and right borders of the field-of-view box 704 are on the lock-screen interface 703, and the upper and lower borders still fall inside the lock-screen interface 703. Correspondingly, the field-of-view box 704 may continue to be enlarged. For details, refer to related content in (3) in FIG. 5b. Details are not described herein again.

FIG. 8a to FIG. 8d show an example of another display manner of a transition animation from the screen-off mode to the lock-screen mode. Referring to (1) in FIG. 8a, for example, a screen-off interface 801 includes a transition animation display box 802 and another control (for example, a time control). In this embodiment of this application, when the mobile phone is in the screen-off mode, in an example, the transition animation display box 802 and the time control may be displayed at a specified position in the screen-off interface 801, and remain unchanged. The specified position may be any position in the lock-screen interface 801, for example, may be a position shown in (1) in FIG. 5a, or may be a position shown in (1) in FIG. 8a. In another example, the transition animation display box 802 and the time control may be displayed at different positions in the screen-off interface 801 successively. For example, at a current moment, a position of the transition animation display box 802 and the time control may be shown in (1) in FIG. 5a. At a next moment, a position of the transition animation display box 802 and the time control may be shown in (1) in FIG. 8a. This is not limited in this application.

Figure 8A:
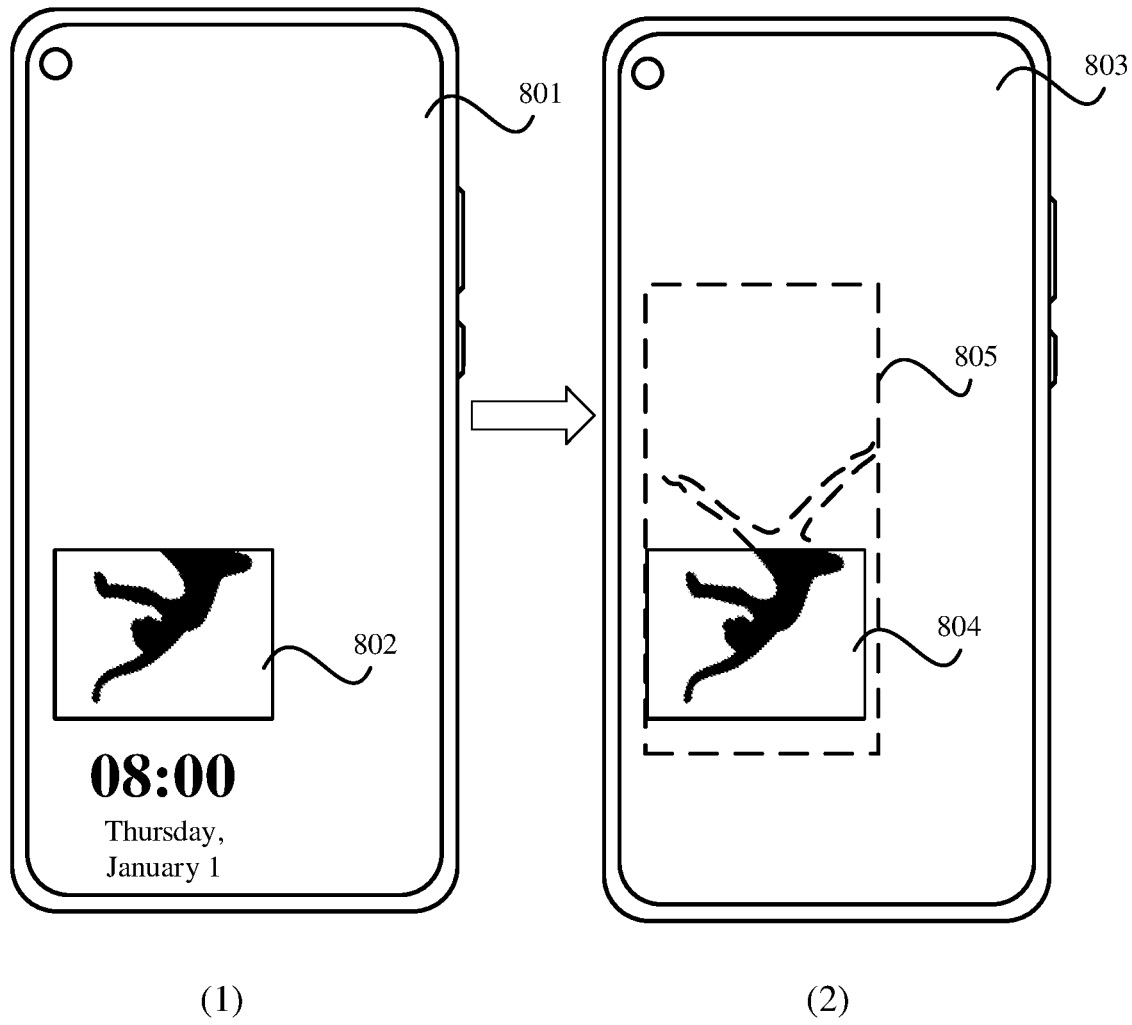
FIG. 8a and FIG. 8b show an example of a display manner of a transition animation from a screen-off mode to a lock-screen mode.
Figure 8B:
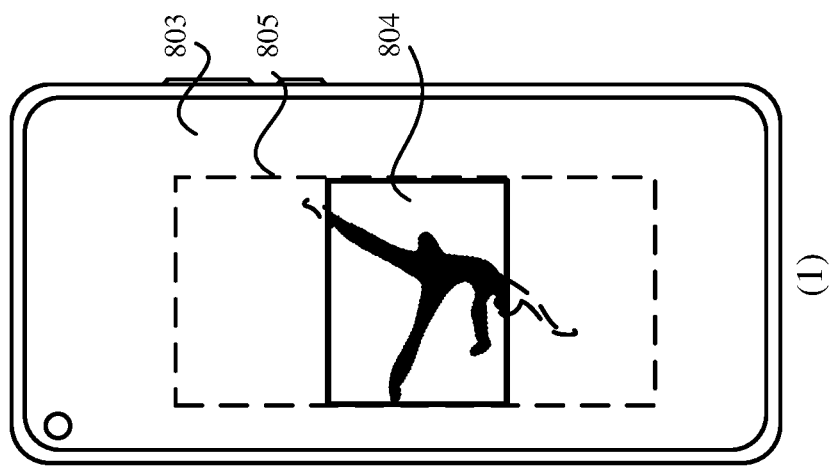
Figure 8B:
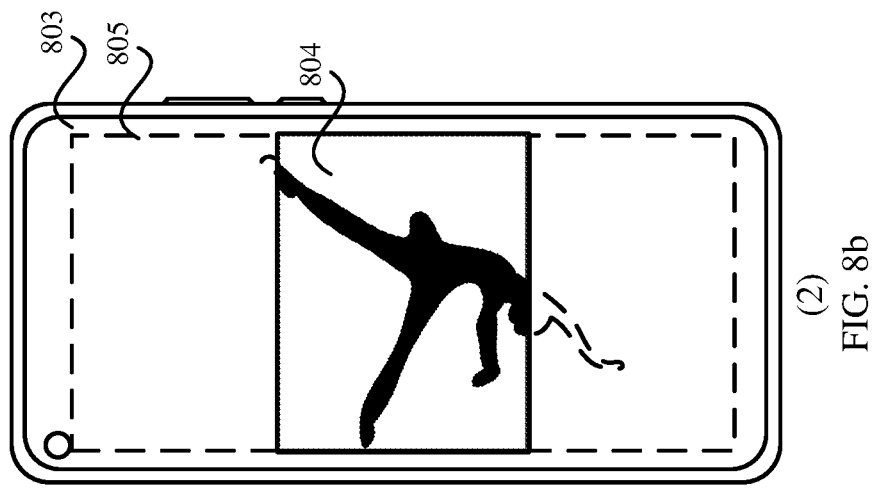
Figure 8B:
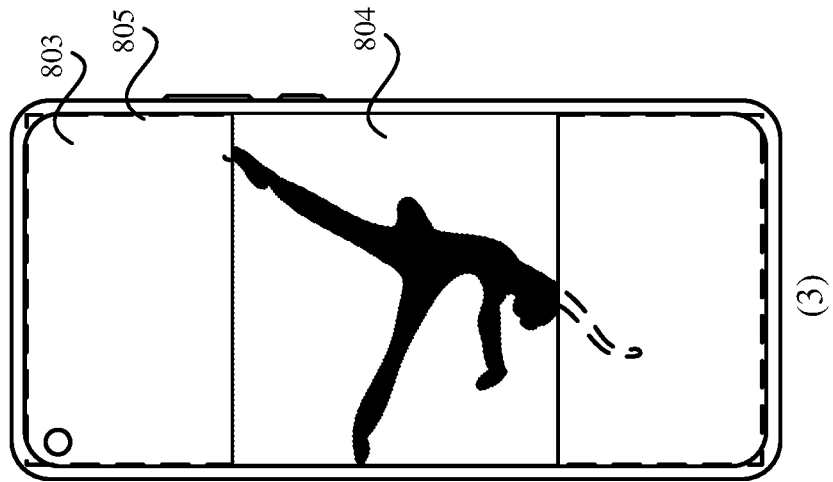

Still referring to (1) in FIG. 8a, for example, in this embodiment of this application, the position of the transition animation display box 802 and the time control is in a lower left part of the screen-off interface 801. When the transition animation display box 802 and the time control are in the screen-off interface 801, for display of the transition animation in the lock-screen mode, refer to FIG. 8a and FIG. 8b. No repeated description is provided in this application.

For example, the mobile phone enters the lock-screen mode in response to a received user operation (for example, pressing the power button). Referring to (2) in FIG. 8a, for example, a lock-screen interface 803 includes a field-of-view box 804 and an image indication box 805. For example, a size and a position of the field-of-view box 804 in the lock-screen interface 803 are the same as a size and a position of the transition animation display box 802 in the screen-off interface 801. Correspondingly, the image indication box 805 may be displayed at a corresponding position in the lock-screen interface 803 based on a position at which the field-of-view box 804 is currently displayed. In this way, an overlapping part between the field-of-view box 804 and an image in the image indication box 805 is the same as an image displayed in the transition animation display box 802. For other descriptions, refer to related content in (2) in FIG. 5a. Details are not described herein again.

For example, the image indication box 804 is gradually enlarged, and moved from a lower left corner of the lock-screen interface 803 toward a center of the lock-screen interface 803. In addition, the field-of-view box 804 is gradually enlarged, and moved from the lower left corner of the lock-screen interface 803 toward the center of the lock-screen interface 803. Referring to (1) in FIG. 8b, the image indication box 804 and the field-of-view box 804 are enlarged and moved to the position shown in (1) in FIG. 8b. The field-of-view box 804 displays a part that overlaps the image in the image indication box 805. For example, the image indication box 805 and the field-of-view box 804 continue to be enlarged, and moved toward the center of the lock-screen interface 803, as shown in (2) in FIG. 8b and (3) in FIG. 8b. For an undescribed part, refer to FIG. 5b to FIG. 5d. Details are not described herein again.

Figure 9A:
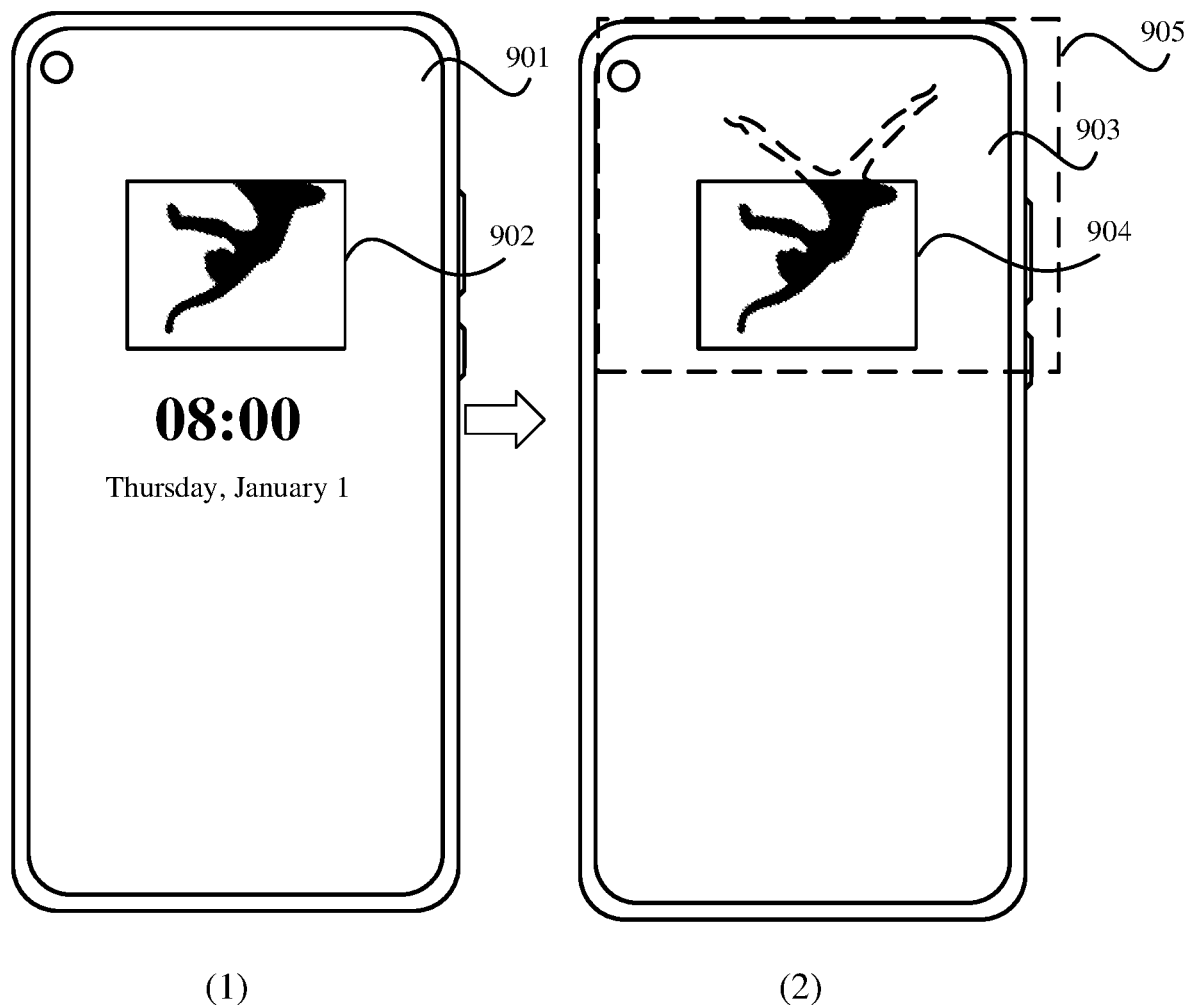
FIG. 9a to FIG. 9c show an example of a display manner of a transition animation from a screen-off mode to a lock-screen mode.
Figure 9B:
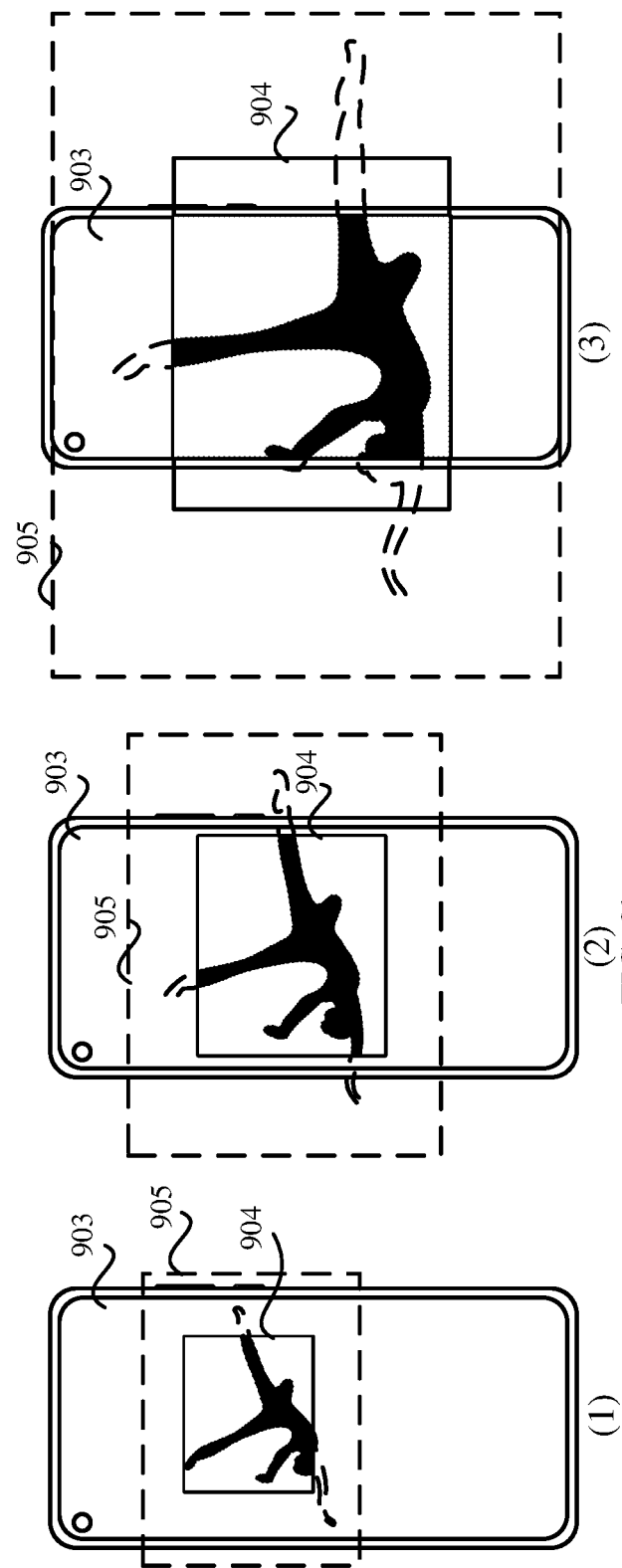
Figure 9C:
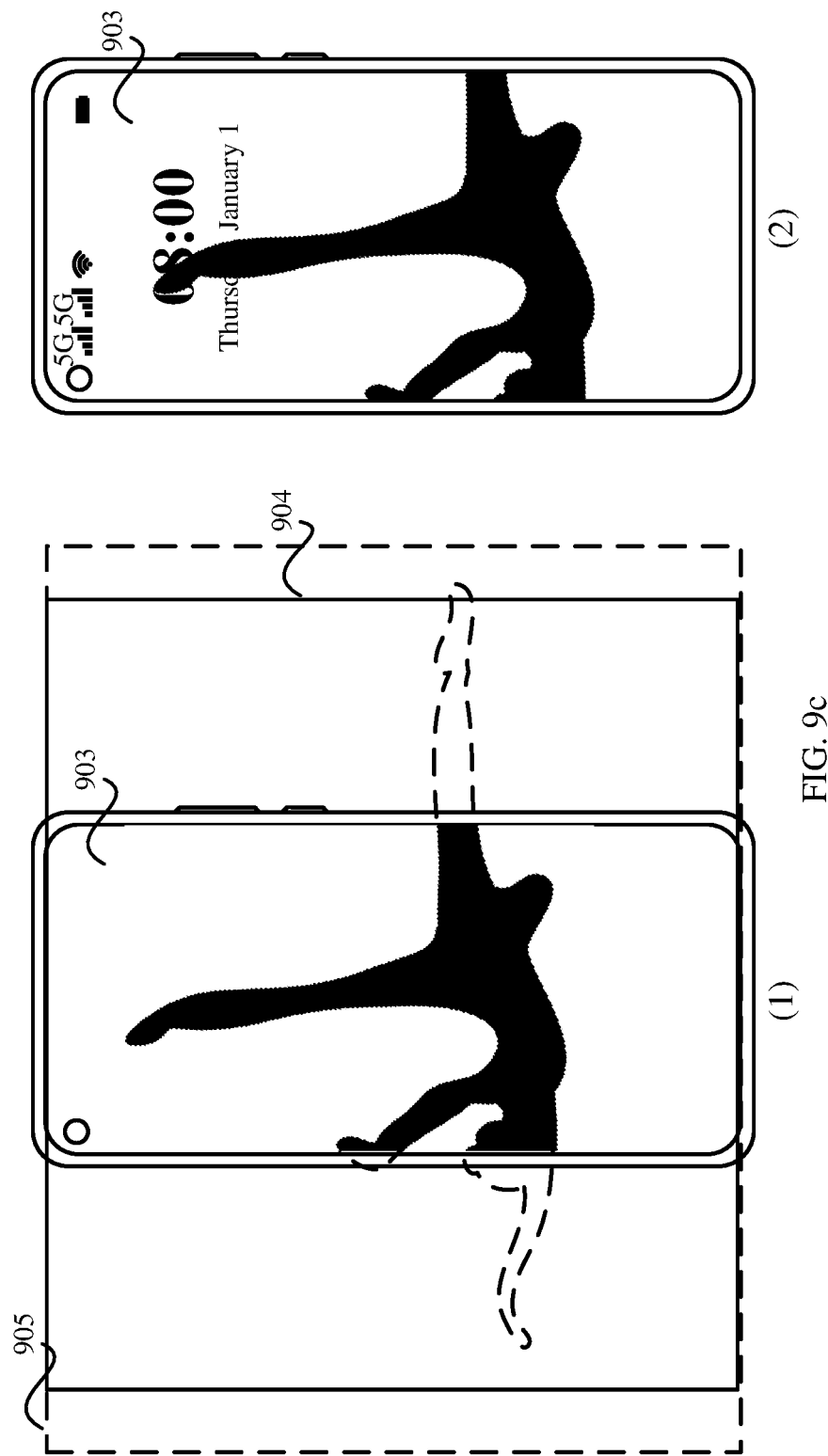

FIG. 9a to FIG. 9c show an example of still another display manner of a transition animation from the screen-off mode to the lock-screen mode. For example, referring to (1) in FIG. 9a, a screen-off interface 901 includes a transition animation display box 902, a time control, and the like. For other descriptions, refer to (1) in FIG. 5a. Details are not described herein again.

For example, the mobile phone enters the lock-screen mode in response to a received user operation. Referring to (2) in FIG. 9a, a lock-screen interface 903 includes but is not limited to a field-of-view box 904 and an image indication box 905. For descriptions of the field-of-view box 904, refer to the foregoing related descriptions in FIG. 5a. Details are not described herein again. For example, in this embodiment, an example in which all image frames of a video clip are landscape images is used. For example, a ratio of a width to a height of the landscape image may be 16:9, and the ratio is merely an example. This is not limited in this application.

For example, similar to that in (2) in FIG. 5a, an image in the image indication box 905 is obtained after an original landscape image frame is reduced by a preset proportion (for example, 50%). For specific implementation, refer to the foregoing descriptions. Details are not described herein again. For example, the image indication box 905 is displayed at a corresponding position in the lock-screen interface 903 based on a position of the field-of-view box 904, so that an image displayed in the field-of-view box 904 is the same as an image in the transition animation display box 902.

For example, the image indication box 904 is gradually enlarged, and the image indication box 904 is gradually moved toward a center of the lock-screen interface 903. In addition, the field-of-view box 904 is gradually enlarged, and the field-of-view box 904 is gradually moved toward the center of the lock-screen interface 903.

Referring to (1) in FIG. 9b, the image indication box 904 and the field-of-view box 904 are enlarged and moved to the position shown in (1) in FIG. 9b. The field-of-view box 904 displays a part that overlaps the image in the image indication box 905. For example, the image indication box 905 and the field-of-view box 904 continue to be enlarged, and moved toward the center of the lock-screen interface 903, as shown in (2) in FIG. 8b. For an undescribed part, refer to the related descriptions in (2) in FIG. 5b. Details are not described herein again.

Referring to (3) in FIG. 9b, for example, in a process in which the image indication box 904 is enlarged and moved, because a ratio of a width to a height of the image indication box is 16:9, when the upper and lower borders of the image indication box 904 are on the upper and lower borders of the lock-screen interface 903, the left and right borders of the image indication box 904 fall outside the lock-screen interface 903. Correspondingly, a part of an image in the image indication box 904 falls outside the lock-screen interface 903. Therefore, in this case, even if the left and right borders of the field-of-view box 904 exceed the borders of the lock-screen interface 903, an image displayed in the lock-screen interface 903 is still a part that is of the field-of-view box 904 and that is within the lock-screen interface 903. For another undescribed part, refer to (3) in FIG. 5b. Details are not described herein again.

Referring to (1) in FIG. 9c, for example, a size and a position of the image indication box 905 remain unchanged, a center point of the field-of-view box 904 remains unchanged, and the field-of-view box 904 continues to be enlarged, until the upper and lower borders of the field-of-view box 904 touch the borders of the lock-screen interface 903. Referring to (2) in FIG. 9c, for example, the lock-screen interface 903 may continue to play an image frame in the transition animation of the lock-screen mode, and the lock-screen interface 903 displays one or more other controls, such as a time control, a network control, and a battery level control. For example, because a proportion of the image frame is different from a proportion of the lock-screen interface 903, an image displayed in the lock-screen interface 903 is only a part of the image frame.

It should be noted that, for an image frame whose image proportion is different from the proportion of the lock-screen interface, to enable important parts in the image, for example, a portrait and an object, can be all displayed in the lock-screen interface, the mobile phone may obtain, in an image processing manner such as image recognition, cropping, and size adjustment, an image frame that includes the important parts in the image and has a same proportion as the lock-screen interface, and apply the image frame to a transition animation.

Figure 10A:
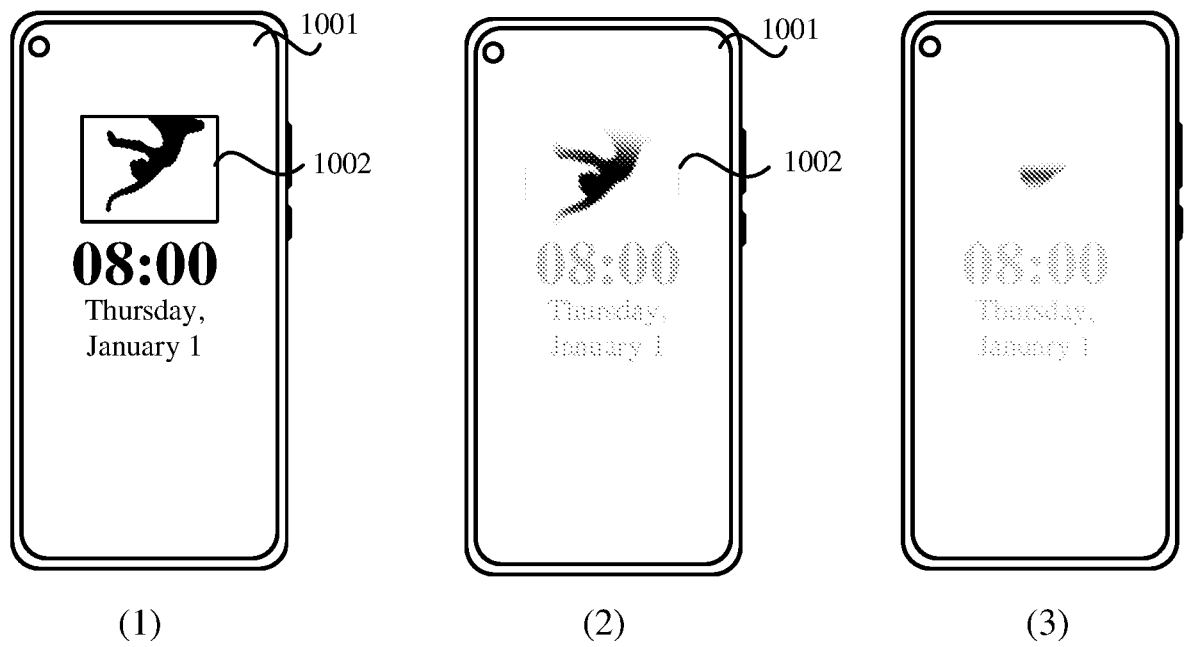
FIG. 10a and FIG. 10b show an example of a display manner of a transition animation from a screen-off mode to a lock-screen mode.
Figure 10B:
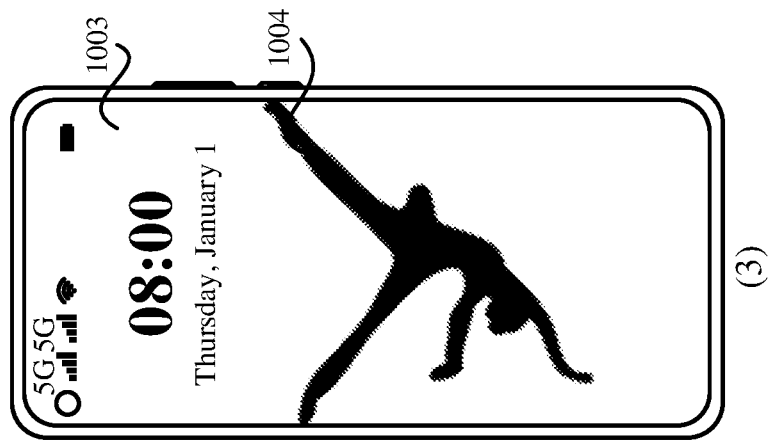
Figure 10B:
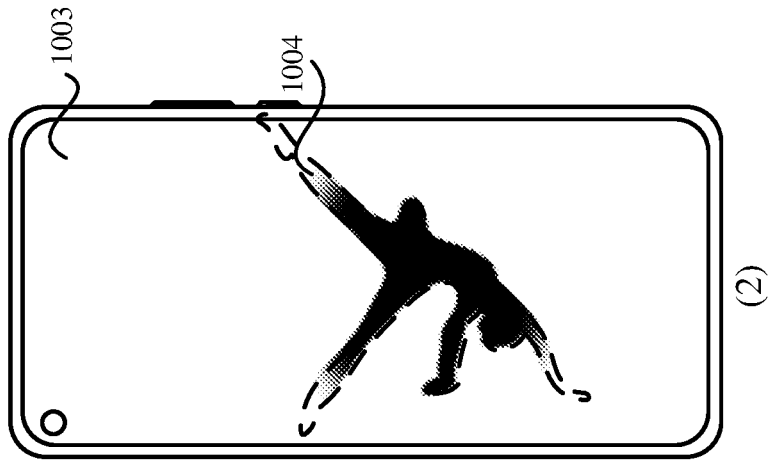
Figure 10B:
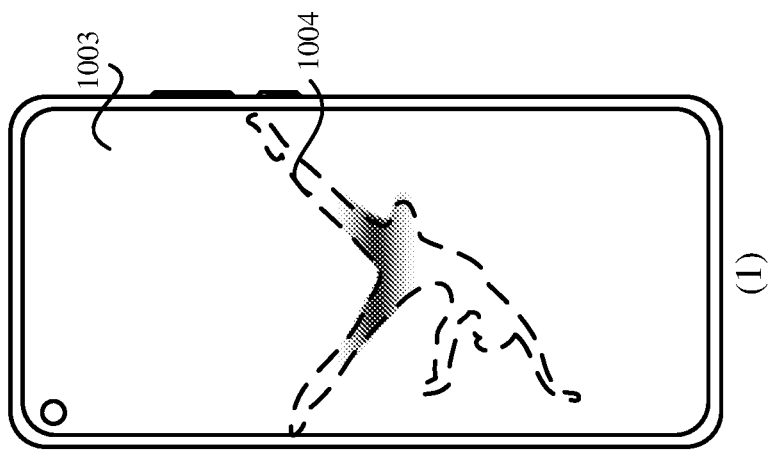

FIG. 10a and FIG. 10b show an example of still another display manner of a transition animation from the screen-off mode to the lock-screen mode. Referring to (1) in FIG. 10a, for example, a screen-off interface 1001 includes a transition animation display box 1002, a time control, and the like. The mobile phone enters the lock-screen mode in response to a received user operation. Referring to (2) in FIG. 10a, for example, a blink process is simulated in the display manner of the transition animation in this embodiment. An oval mask with blurry edges (alternatively, the mask may be in another shape, which is not limited in this application) may be added to the transition animation display box 1002 in the screen-off interface 1001. The mask is vertically compressed until it disappears, as shown in (3) in FIG. 10a. In addition, another control (such as a time control) in the screen-off interface 1001 also gradually disappear.

Referring to (1) in FIG. 10b, for example, the mobile phone displays a lock-screen interface 1003, and the lock-screen interface 1003 includes an image indication box 1004. For example, the mask described above may be opened from the middle of the image indication box 1004 to gradually display an image in the image indication box 1004. Similarly, image frames in a video clip are displayed in the image indication box 1004 in sequence. It should be noted that a dashed-line part is merely used to describe a position of a dancer in the image indication box 1004, and a part outside the mask is actually not displayed. Referring to (2) in FIG. 10b, for example, the mask continues to be opened to display another part of the image in the image indication box 1004, until the mask is opened to a size of the lock-screen interface 1003, that is, a part that is of the image indication box 1004 and that is in the lock-screen interface 1003 is fully displayed. Referring to (3) in FIG. 10b, for example, the lock-screen interface 1003 optionally continues to play another image frame in the transition animation, and displays other controls, such as a time control, a network control, and a battery level control.

Figure 11:
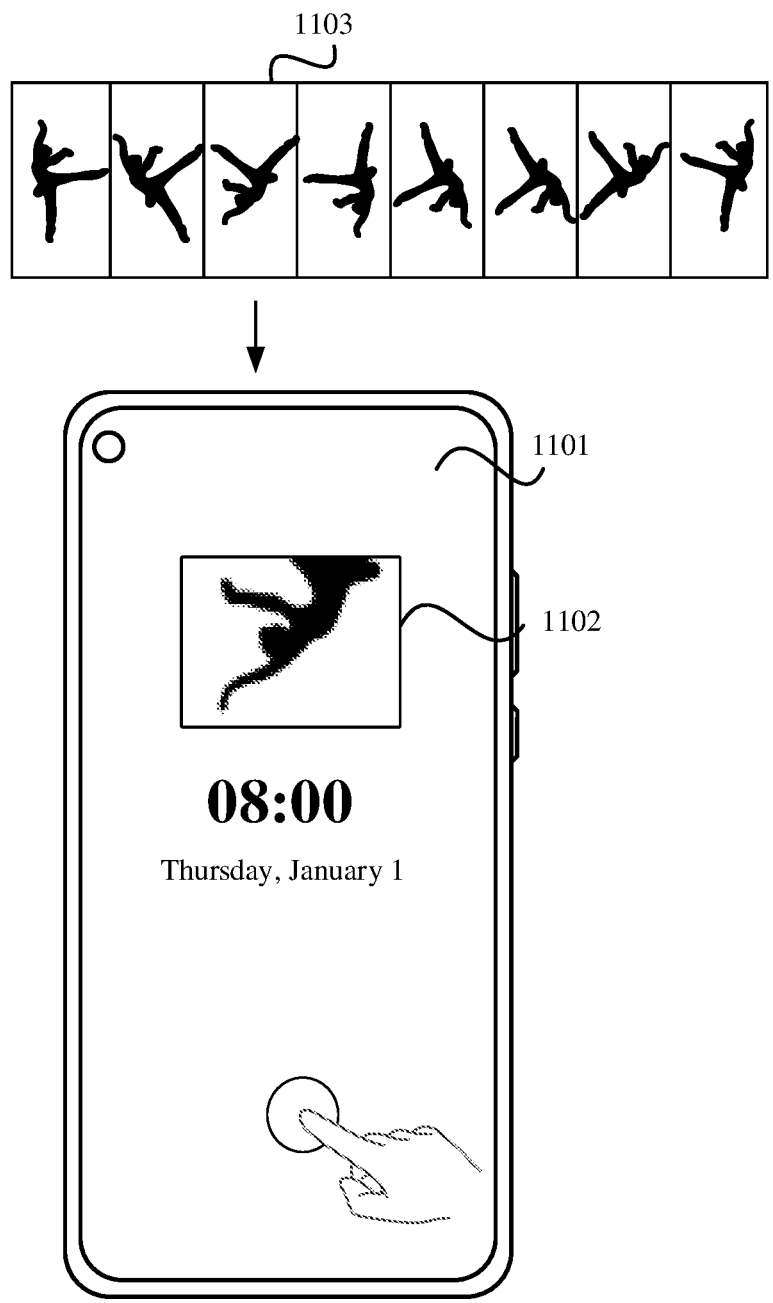
FIG. 11(1) to FIG. 11(3) show an example of display manners of a transition animation in different application scenarios.
Figure 11:
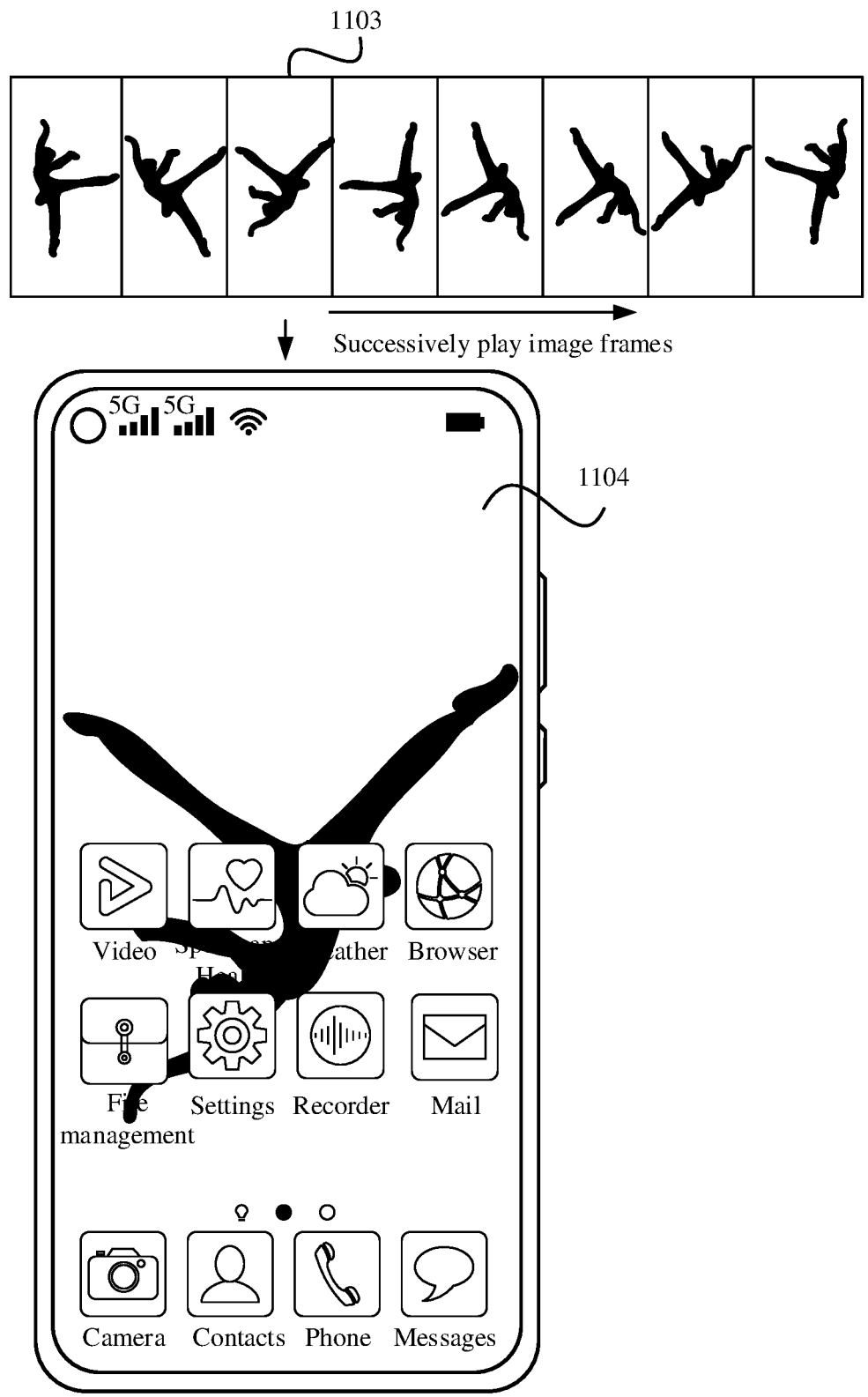
Figure 11:
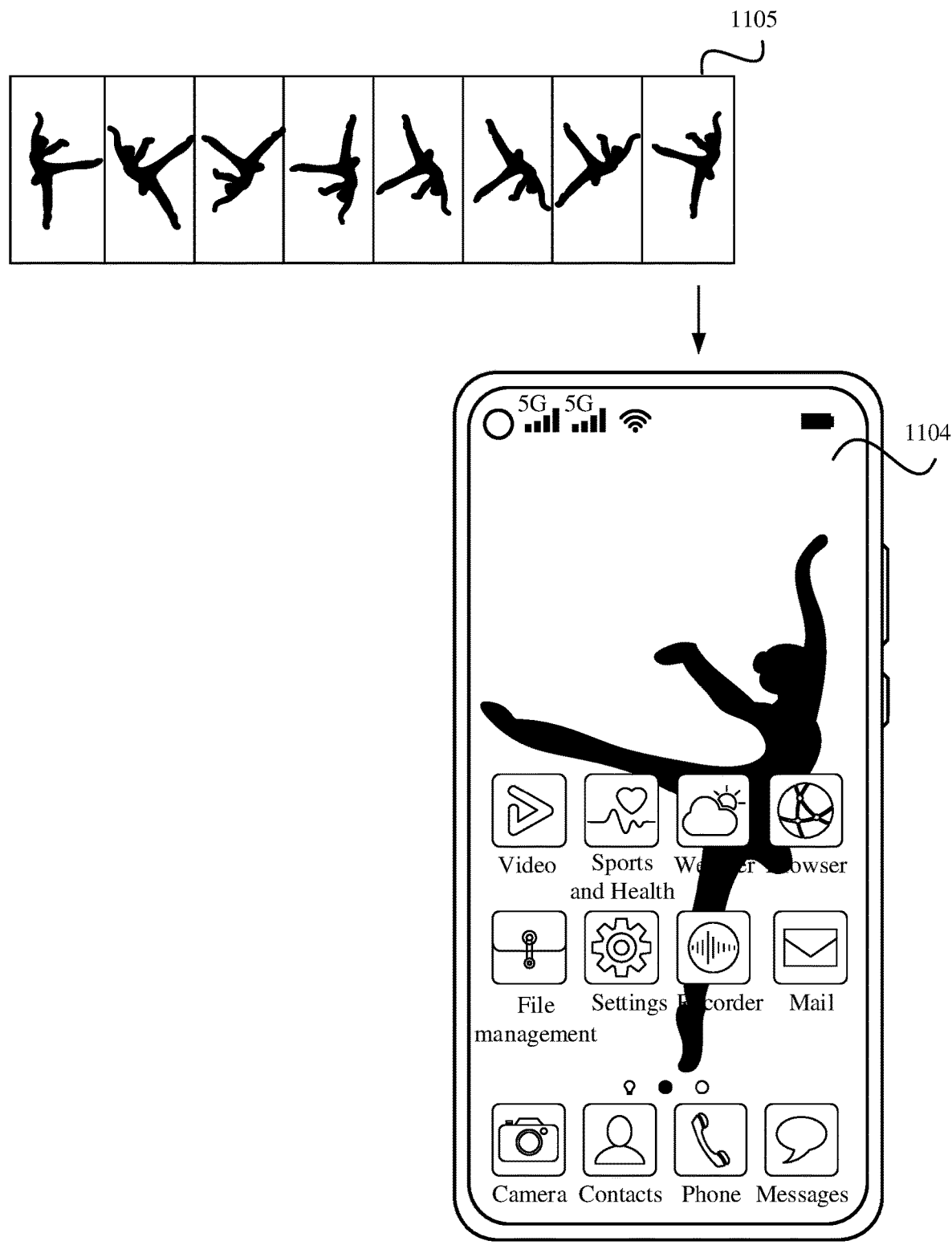
Figure 13A:
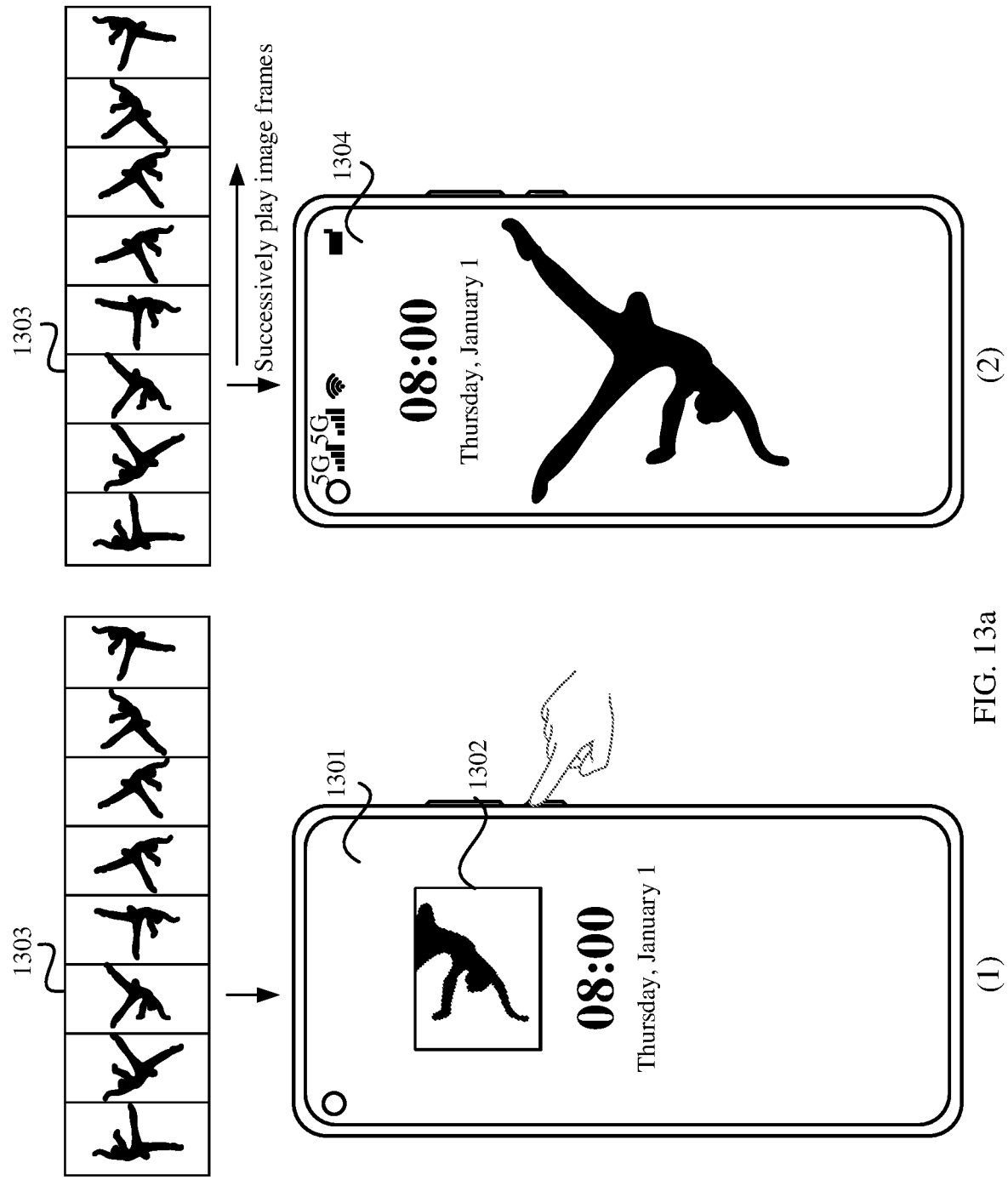

FIG. 11(1) to FIG. 11(3) to FIG. 13b(1) and FIG. 13b(2) show examples of display manners of a transition animation in different application scenarios. Referring to FIG. 11(1), for example, in this scenario, the mobile phone is in the screen-off mode, a screen-off interface 1101 includes a transition animation display box 1102 and another control (for example, a time control), and the transition animation display box 1102 successively plays image frames in a video clip, until the key frame, such as an image frame 1103, in the screen-off mode is played. For example, the user may touch the screen-off interface 1101 to trigger fingerprint-based unlocking. In response to a received user operation, the mobile phone unlocks the mobile phone and directly enters the home screen mode from the screen-off mode.

Referring to FIG. 11(2), for example, the mobile phone skips the lock-screen mode and directly enters the home screen mode from the screen-off mode. Optionally, before entering the home screen mode, the mobile phone may first display a black screen and then enter the home screen mode. This keeps the same below, and is not described repeatedly. For example, a home screen 1104 displays a transition animation. Because the mobile phone skips the lock-screen mode, a first image frame of the transition animation displayed on the home screen 1104 is the last frame in the screen-off mode, that is, the key frame in the screen-off mode (for example, the image frame 1103). For example, for a manner of displaying the image frame 1103 on the home screen 1104, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, the home screen 1104 successively plays the image frames in the video clip until the last frame, such as an image frame 1105. Optionally, another control on the home screen 1104, such as an application icon control, a network control, or a battery level control, may be gradually displayed in a process of playing the transition animation on the home screen 1104, or may be displayed when the transition animation on the home screen 1104 is frozen at the last frame (for example, the image frame 1105). This is not limited in this application.

Figure 12A:
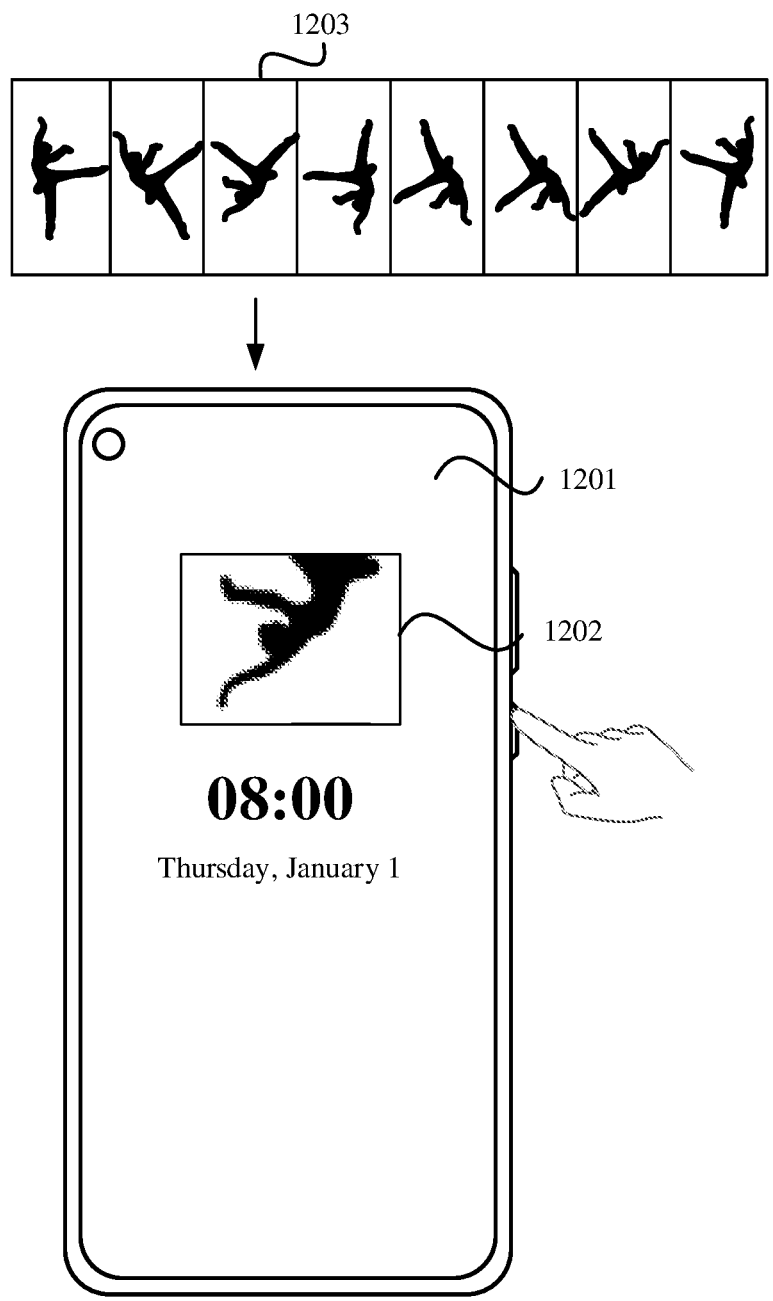
FIG. 12a to FIG. 12e show an example of a display manner of a transition animation from a screen-off mode to a lock-screen mode and from the lock-screen mode to a home screen mode.

FIG. 12a to FIG. 12e show an example of a display manner of a transition animation from the screen-off mode to the lock-screen mode and from the lock-screen mode to the home screen mode. Referring to FIG. 12a, for example, a screen-off interface 1201 includes a transition animation display box 1202 and another control. For example, the transition animation display box 1202 is frozen at an image frame 1203. For details, refer to the foregoing descriptions. Details are not described herein again. For example, the user may press the power button. The mobile phone enters the lock-screen mode in response to a received user operation.

Figure 12B:
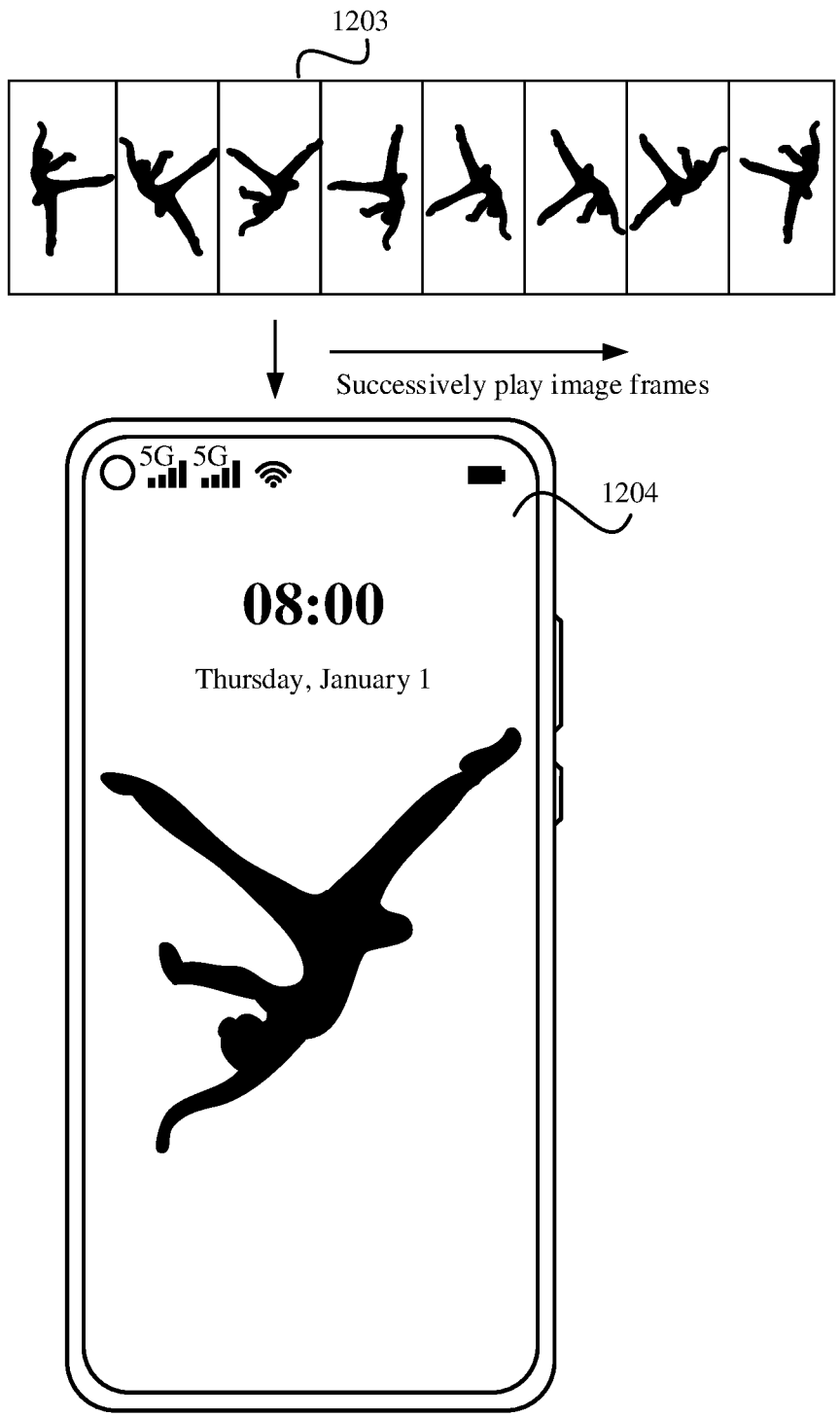
Figure 12C:
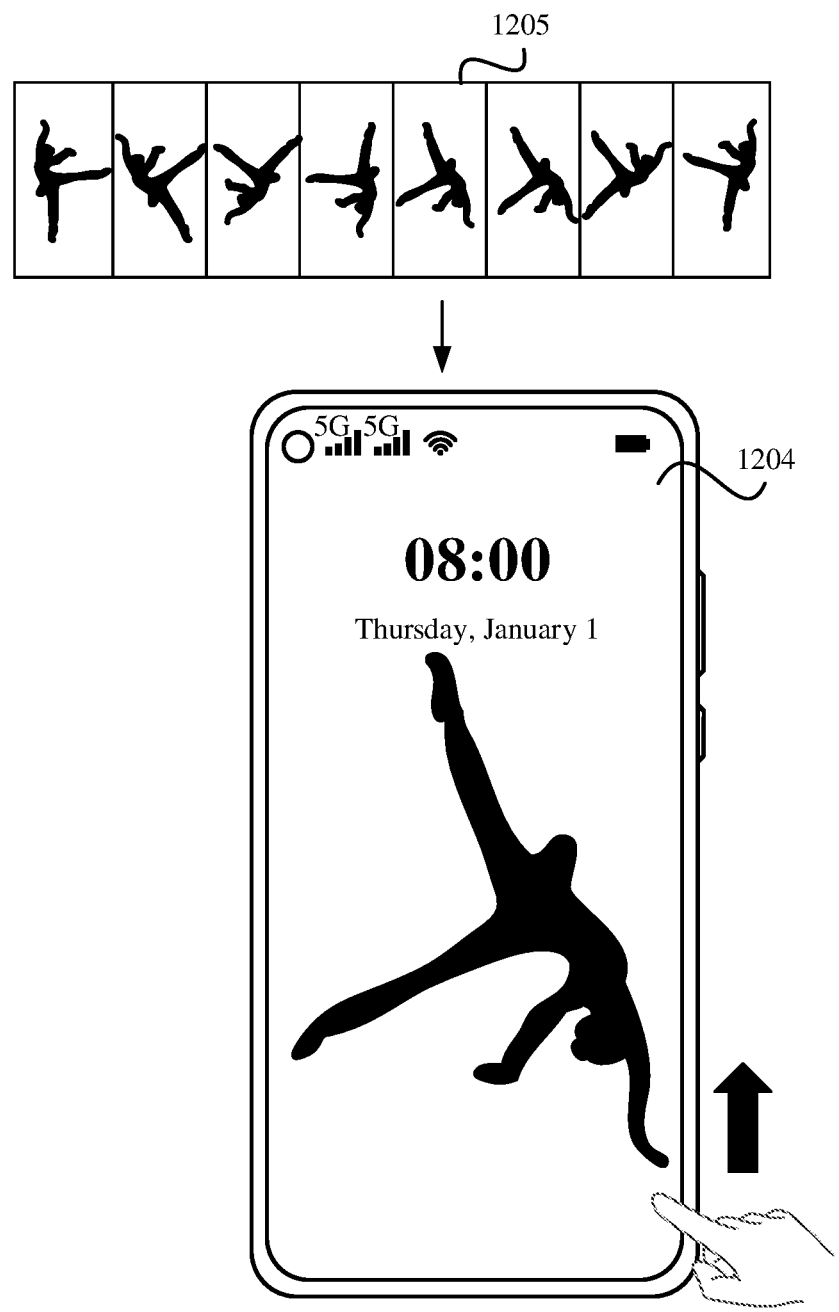
Figure 12D:
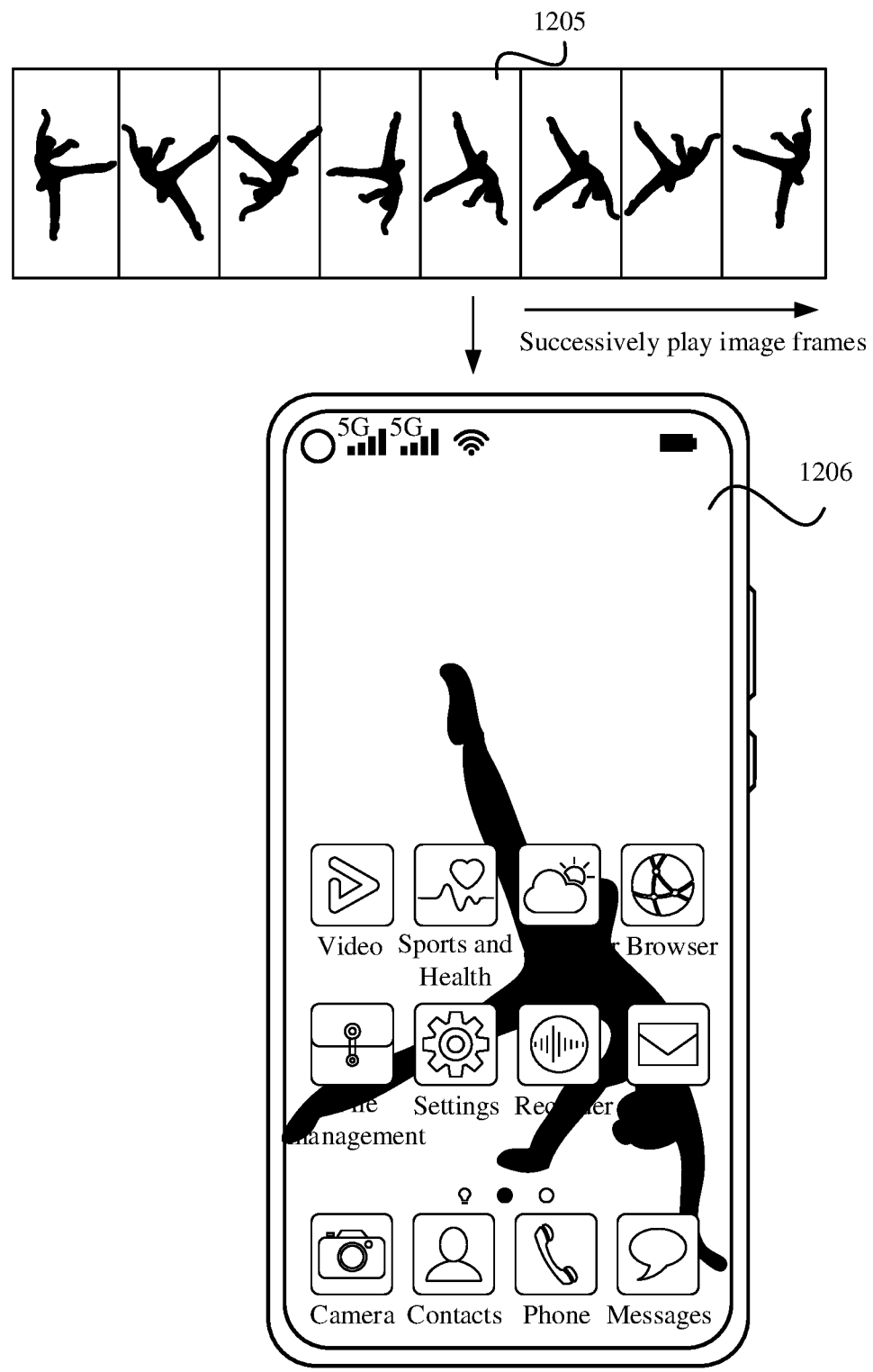
Figure 12E:
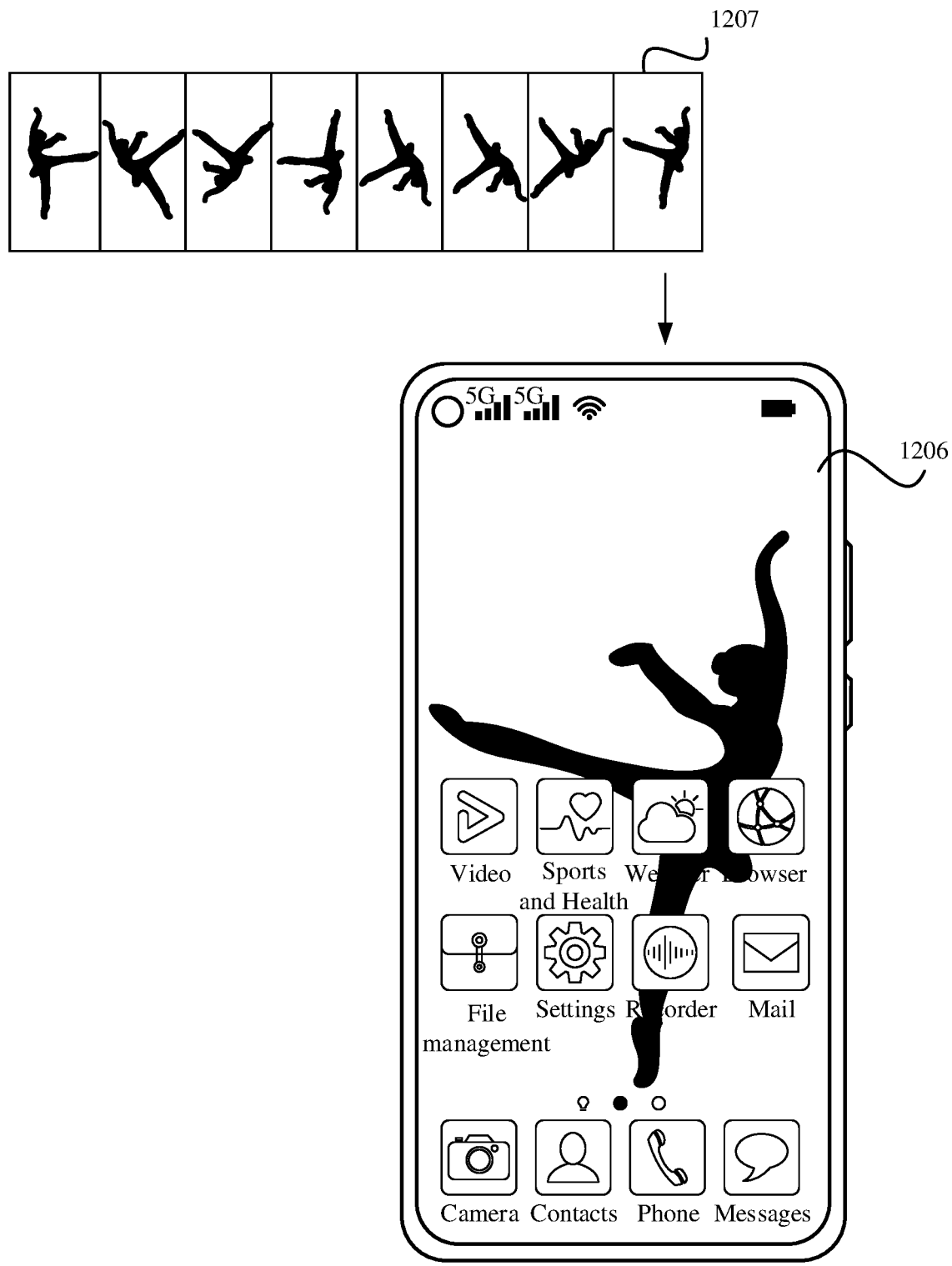

Referring to FIG. 12b, for example, a last frame (for example, an image frame 1203) in the screen-off mode is displayed in a lock-screen interface 1204. For example, for a manner of displaying the image frame in the lock-screen interface 1204, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, the lock-screen interface 1204 successively plays image frames of a video clip. Referring to FIG. 12c, for example, the lock-screen interface 1204 plays the key frame (for example, an image frame 1205) in the lock-screen mode, and is frozen at the key frame. The user may unlock the mobile phone in a manner such as slide to unlock, fingerprint-based unlocking, facial unlocking, or the like. For example, the mobile phone enters the home screen mode in response to a received user operation. Referring to FIG. 12d, a home screen 1206 successively plays the image frames in the video clip from the key frame (for example, the image frame 1105) in the lock-screen mode, until the key frame in the home screen mode, for example, an image frame 1107 in FIG. 12e.

FIG. 13a to FIG. 13d show an example of a display manner of a transition animation from the screen-off mode to the lock-screen mode and from the lock-screen mode to the home screen mode. Referring to (1) in FIG. 13a, a screen-off interface 1301 includes a transition animation display box 1302 and another control. The transition animation display box 1302 displays the key frame in the screen-off mode, such as an image frame 1303. For an undescribed part, refer to the foregoing description. Details are not described herein again.

For example, the user presses the power button. The mobile phone enters the lock-screen mode in response to a received user operation. Referring to (2) in FIG. 13a, a last frame (for example, the image frame 1303) in the screen-off mode is displayed in a lock-screen interface 1304. For example, for a manner of displaying the image frame in the lock-screen interface 1304, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, the lock-screen interface 1304 successively plays image frames of a video clip.

Referring to FIG. 13b(1), for example, when a transition animation in the lock-screen interface 1304 is played to any frame before the key frame (for example, an image frame 1306) in the lock-screen mode, for example, played to the image frame 1305, the user unlocks the mobile phone in a manner such as slide to unlock, fingerprint-based unlocking, facial unlocking, or password-based unlocking. The mobile phone enters the home screen mode in response to a received user operation. To be specific, before playing of the transition animation in the lock-screen mode is completed, the transition animation in the lock-screen mode is interrupted to enter the home screen mode. Referring to FIG. 13b(2), for example, a home screen 1307 continues to successively play the image frames of the video clip from the image frame 1305, until the key frame in the home screen mode is played. For another part that is not described, refer to the foregoing descriptions. Details are not described herein again.

It should be noted that, as described above, the transition animation played in the lock-screen interface is actually played in a gradual expansion manner, as shown in FIG. 5a to FIG. 10b. In this embodiment of this application, there are two gradual expansion manners. A first manner is as follows: In a process in which the transition animation in the lock-screen mode is gradually expanded, image frames in the transition animation are successively played. Before interruption, when the transition animation in the lock-screen mode is expanded to a full screen, that is, when a field-of-view box is expanded to a size that is the same as a size of the lock-screen interface, an image frame played in the field-of-view box is exactly a last image frame of the transition animation in the lock-screen mode. A second gradual expansion manner is as follows: Some image frames in the transition animation in the lock-screen mode may be applied to a gradual expansion process, and the other image frames are played in a full-screen manner when the field-of-view box is expanded to the full screen. For example, the transition animation in the lock-screen mode includes 180 frames. When the field-of-view box is expanded to the full screen, an image frame displayed in the field-of-view box is the $90^{th}$ image frame in the 180 image frames. In this case, starting from the $91^{st}$ image frame, image frames between the $91^{st}$ frame and the $180^{th}$ frame are displayed in a full-screen manner in the lock-screen mode.

Based on the foregoing two expansion manners, in an example, an interruption and continuing manner shown in FIG. 13b(1) and FIG. 13b(2) may be understood as follows: If interruption occurs when the transition animation is played in a full-screen manner in the lock-screen mode, after the mobile phone enters the home screen mode, the mobile phone may continue to play remaining image frames of the transition animation and image frames of the transition animation in the home screen mode in a full-screen manner. In another example, an interruption and continuing manner shown in FIG. 13b(1) and FIG. 13b(2) may be understood as follows: Interruption occurs in a process in which the transition animation in the lock-screen mode is gradually expanded. To better describe the interruption and continuing scenario, the following uses a specific example for description. Referring to FIG. 13c(1) and FIG. 13c(2), for example, the key frame of the transition animation in the lock-screen mode is the image frame 1306. When the field-of-view box in the lock-screen interface 1304 is gradually expanded to a status shown in FIG. 13c(1), a part of the image frame 1305 is displayed in the field-of-view box. The user may unlock the mobile phone in a manner such as slide to unlock or facial unlocking. For example, the mobile phone enters the home screen mode in response to a received user operation. Referring to FIG. 13c(2), for example, the mobile phone displays a home screen 1307. The home screen 1307 continues to play the image frame 1305 and subsequent image frames. For example, because the field-of-view box is interrupted when being gradually expanded, the field-of-view box continues to be gradually expanded on the home screen 1307 and moved toward a screen center, and remaining image frames continue to be displayed from the image frame 1305 in the field-of-view box. For example, when the field-of-view box is expanded to the full screen on the home screen 1307, the image frame 1306, that is, the key frame in the original lock-screen mode, is displayed in the field-of-view box. The home screen 1307 may continue to play the transition animation in the home screen mode, that is, the image frame 1306 to the last image frame, in a full-screen manner.

Figure 13D:
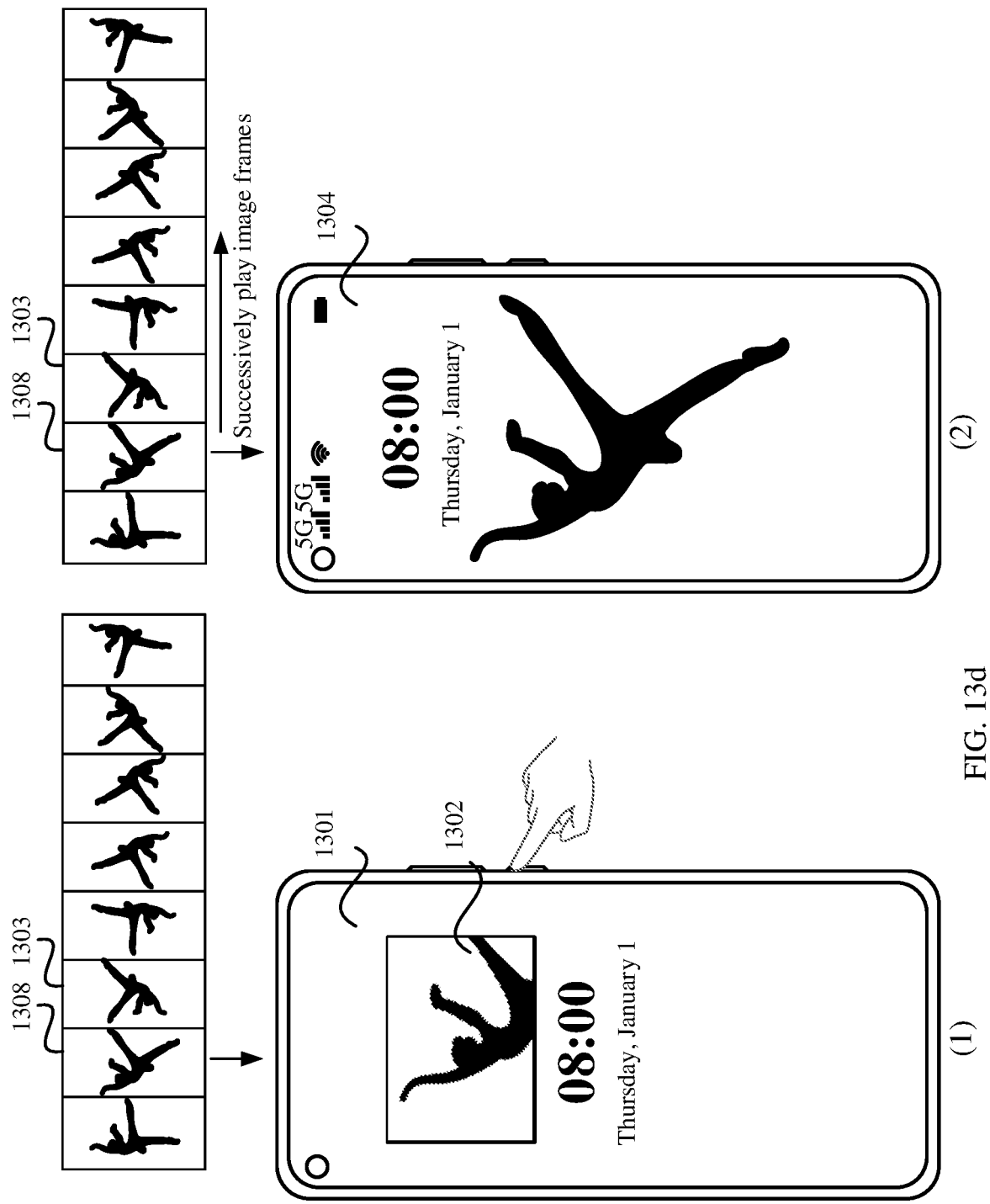

Referring to FIG. 13d, for example, in a process in which the transition animation in the screen-off mode is played in the transition animation display box 1302 in the screen-off interface 1301, the user may press the power button. To be specific, the scenario shown in FIG. 13d is a scenario of interruption and continuing of the transition animation in the screen-off mode. The mobile phone enters the home screen mode in response to a received user operation. Referring to (2) in FIG. 13d, for example, in the lock-screen interface 1304, starting from an image frame at which the transition animation in the screen-off mode is interrupted, such as an image frame 1308, remaining image frames of the transition animation in the screen-off mode and image frames of the transition animation in the lock-screen mode continue to be played. For a manner of displaying the image frame in the lock-screen interface 1304, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b.

Figure 14A:
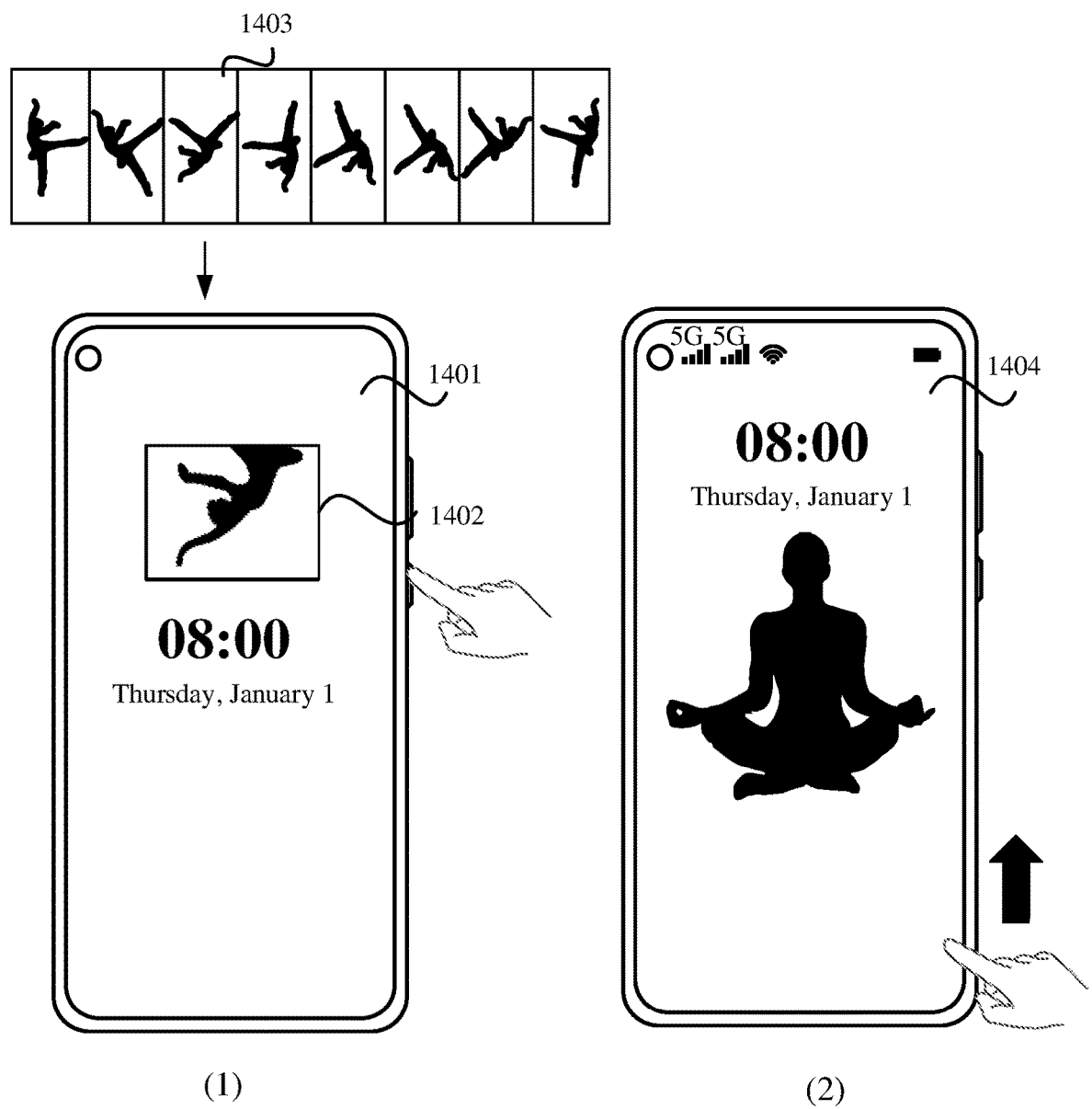
FIG. 14a and FIG. 14b show an example of a display manner of a transition animation from a screen-off mode to a lock-screen mode and from the lock-screen mode to a home screen mode.
Figure 14B:
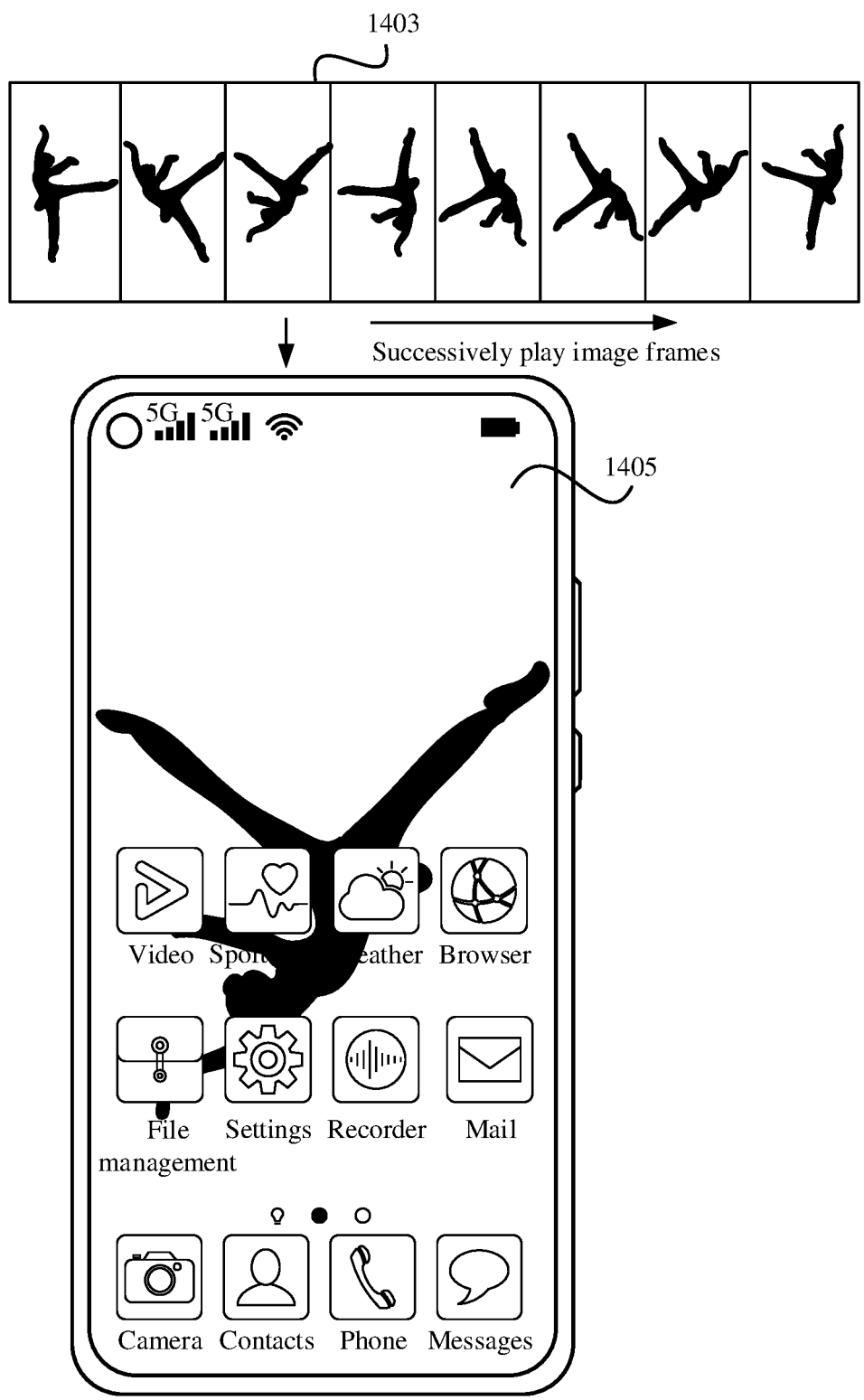

FIG. 14a and FIG. 14b show an example of a display manner of a transition animation from the screen-off mode to the lock-screen mode and from the lock-screen mode to the home screen mode. Referring to (1) in FIG. 14a, for example, a transition animation display box 1402 in a screen-off interface 1402 displays the key frame in the screen-off mode, for example, an image frame 1403. For an undescribed part, refer to the foregoing description. Details are not described herein again. For example, the user presses the power button. The mobile phone enters the lock-screen mode in response to a received user operation. Referring to (2) in FIG. 14a, for example, in this scenario, the user may preset the transition animation in the lock-screen mode to a static wallpaper. A lock-screen interface 1404 displays the static wallpaper preset by the user. Optionally, for a manner of displaying the static wallpaper in the lock-screen interface 1404, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, the user unlocks the mobile phone in a manner such as slide to unlock, fingerprint-based unlocking, or facial unlocking. The mobile phone enters the home screen mode in response to a received user operation. Referring to FIG. 14b, for example, a home screen 1405 successively plays image frames from the key frame in the screen-off mode (for example, the image frame 1403), until the key frame in the home screen mode. Optionally, for a manner of displaying the image frame 1403 on the home screen 1405, refer to any display manner in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For another undescribed part, refer to the foregoing description. Details are not described herein again. It should be noted that, in another embodiment, the mobile phone may set the transition animation in the screen-off mode to a static wallpaper in response to a received user operation, or may set the transition animation in the home screen mode to a static wallpaper. This is not limited in this application.

Figure 15:
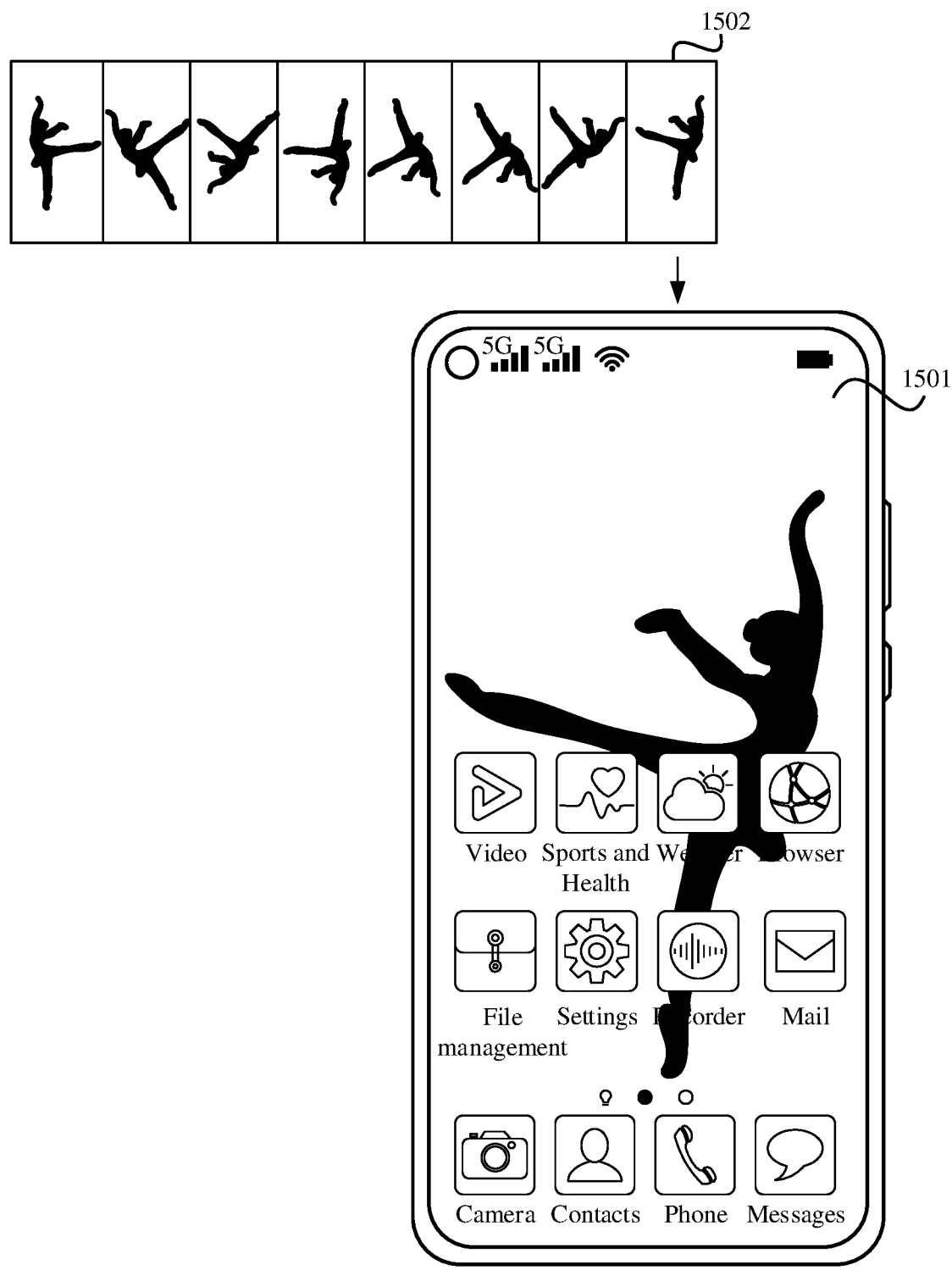
FIG. 15(1) to FIG. 15(3) show an example of a display manner of a transition animation from a home screen mode to a screen-off mode.
Figure 15:
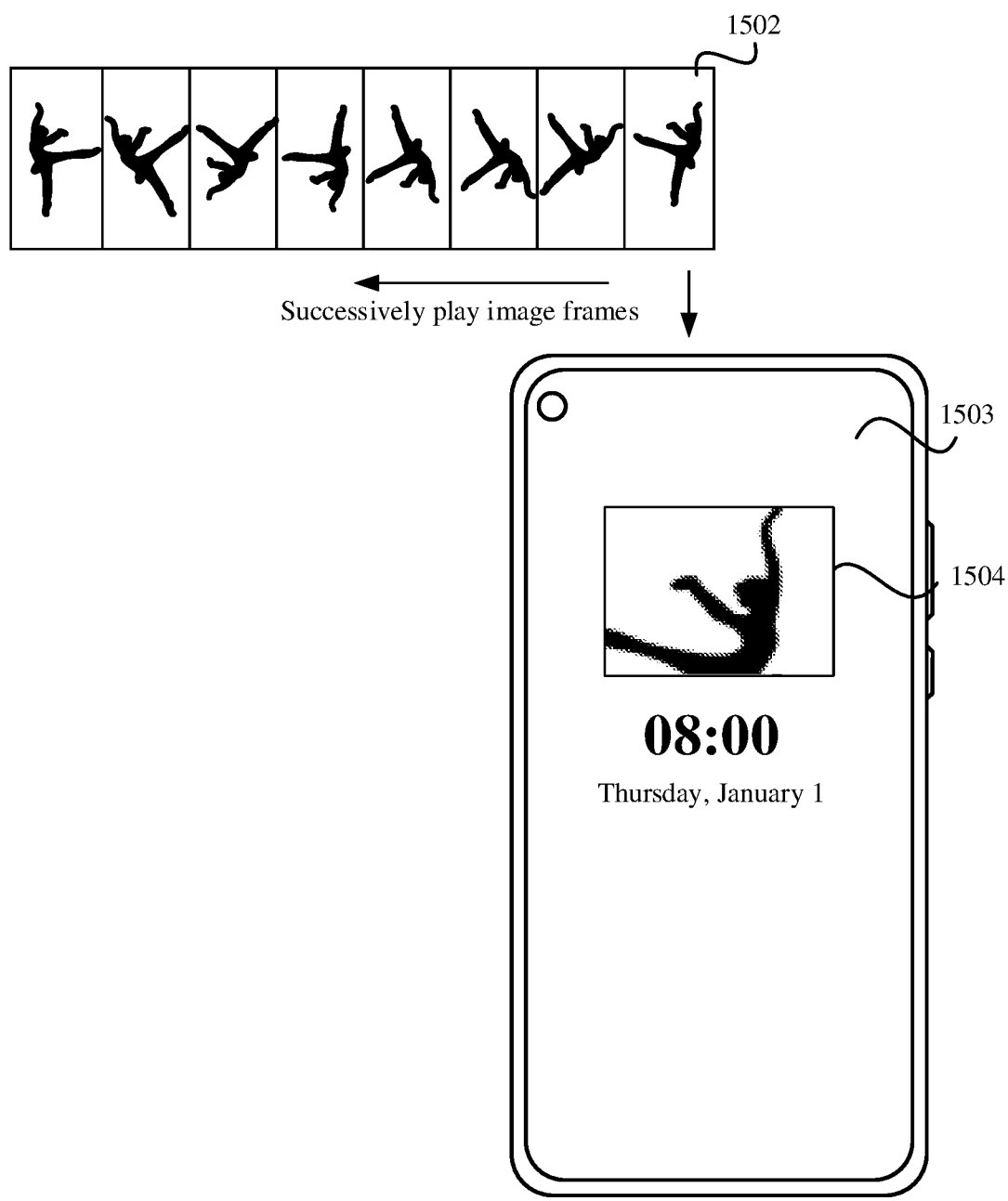
Figure 15:
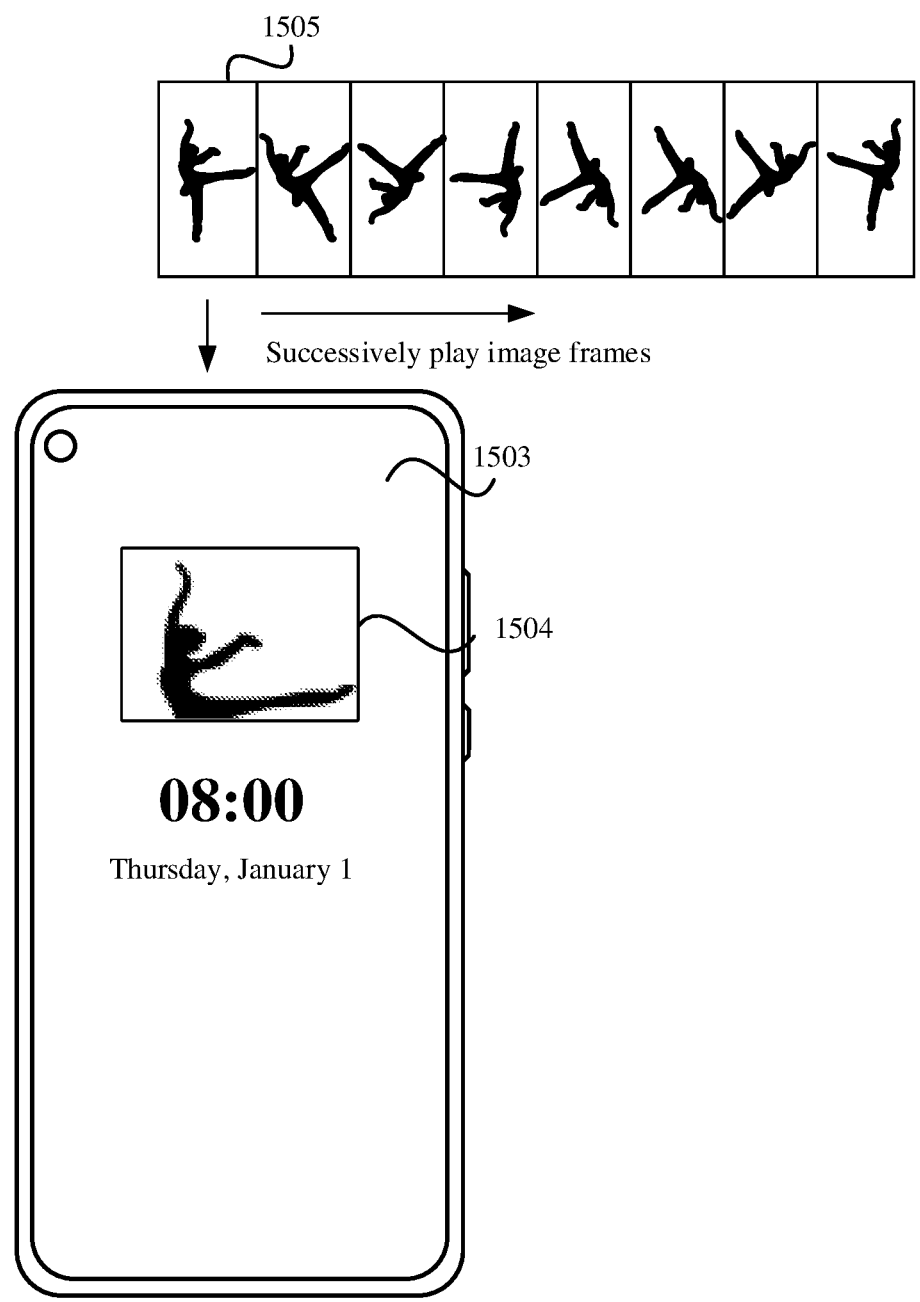

FIG. 15(1) to FIG. 15(3) show an example of a display manner of a transition animation from the home screen mode to the screen-off mode. Referring to FIG. 15(1), for example, a home screen 1501 displays a last frame (that is, the key frame in the home screen mode) of the transition animation in the home screen mode, for example, an image frame 1502. The user may press the power button. The mobile phone enters the screen-off mode in response to a received user operation. Referring to FIG. 15(2), for example, a screen-off interface 1503 includes a transition animation display box 1504. For details, refer to the foregoing descriptions. Details are not described herein again. For example, a transition animation display box 1504 successively plays image frames in a reverse manner from the image frame 1502, until the first image frame of the video clip is played. Referring to FIG. 15(3), for example, a transition animation played in the transition animation display box 1504 is played from the key frame in the home screen mode to an image frame 1505 in a reverse manner. Then, the transition animation display box 1504 successively plays image frames from the image frame 1505, until the key frame in the screen-off mode is played. For other descriptions, refer to the foregoing descriptions. Details are not described herein again. Optionally, after the transition animation display box 1504 plays the image frame 1505, a black screen may be displayed, and then the transition animation in the screen-off mode continues to be played.

Figure 16:
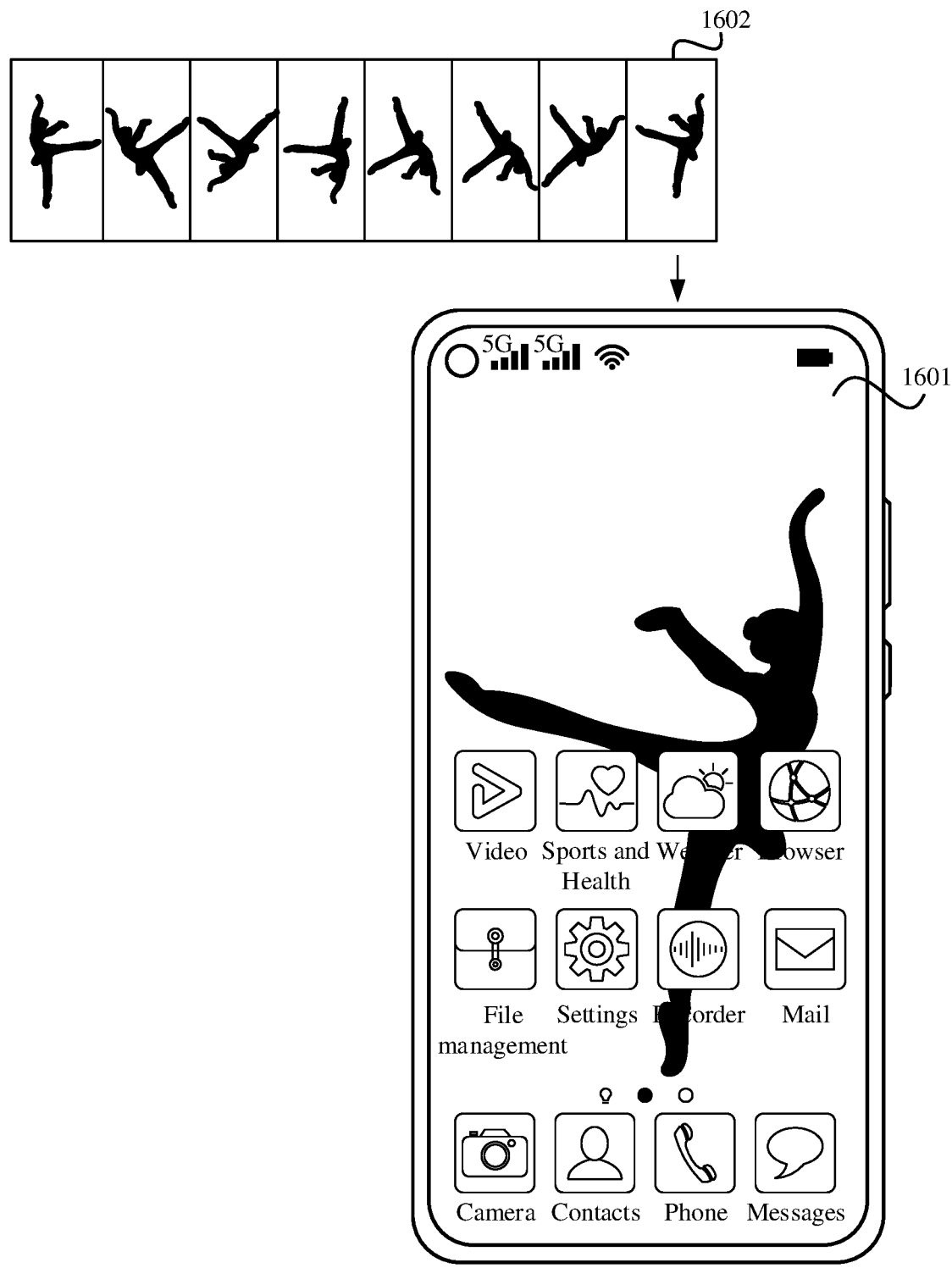
FIG. 16(1) and FIG. 16(2) show an example of a display manner of a transition animation from a home screen mode to a screen-off mode.
Figure 16:
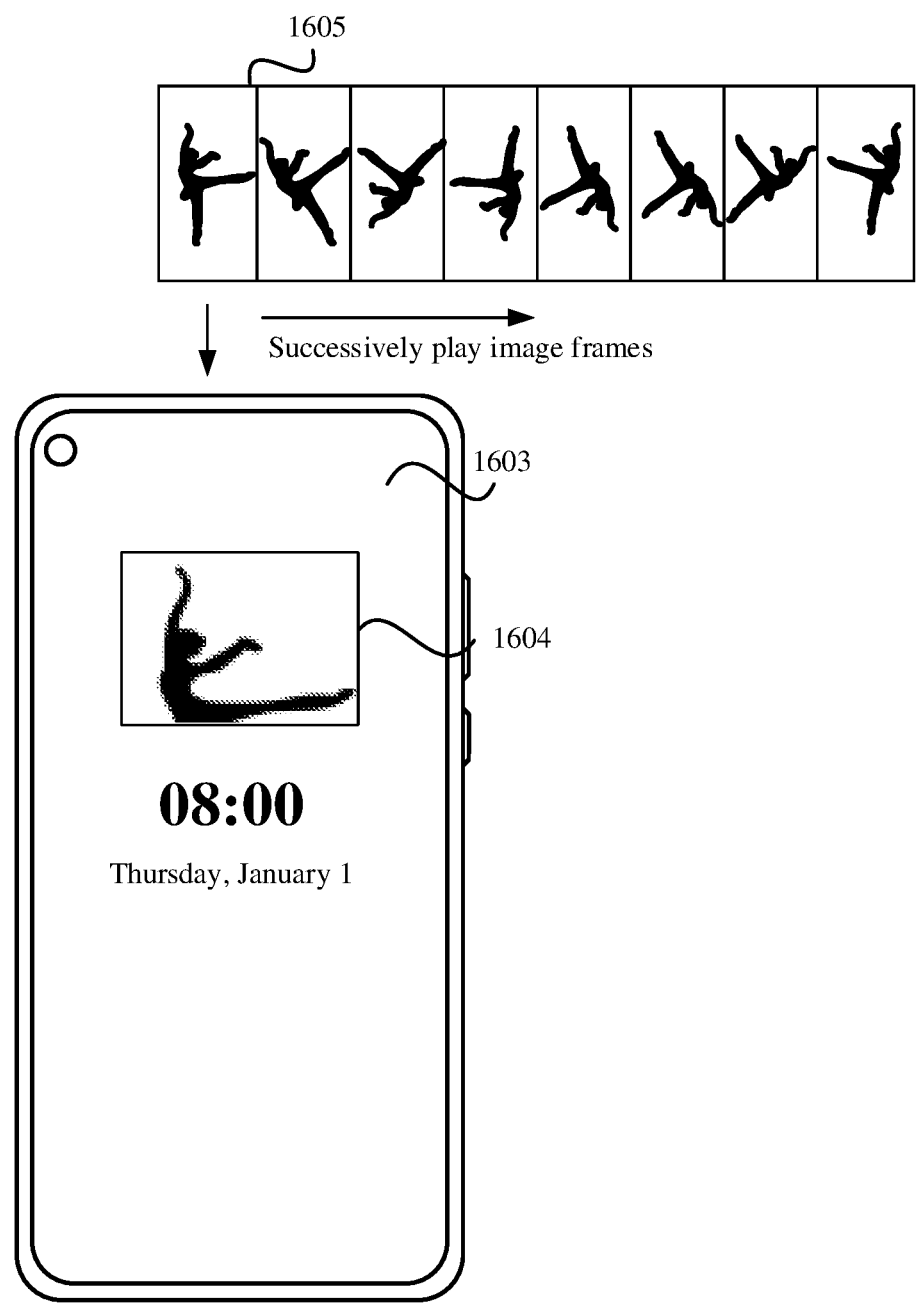

FIG. 16(1) and FIG. 16(2) show an example of a display manner of a transition animation from the home screen mode to the screen-off mode. Referring to FIG. 16(1), for example, a home screen 1601 displays a last frame (that is, the key frame in the home screen mode) of the transition animation in the home screen mode, for example, an image frame 1602. If a user operation is not received within specified duration (for example, 10s, which may be set according to a user requirement, and is not limited in this application), the mobile phone enters the screen-off mode. Optionally, a picture displayed on the home screen 1601 may be gradually extinguished until the screen is black. Referring to FIG. 16(2), for example, a transition animation display box 1604 in a screen-off interface 1603 successively plays image frames of the transition animation in the screen-off mode from a first image frame (for example, an image frame 1605) of the transition animation in the screen-off mode, until the key frame in the screen-off mode.

Figure 17:
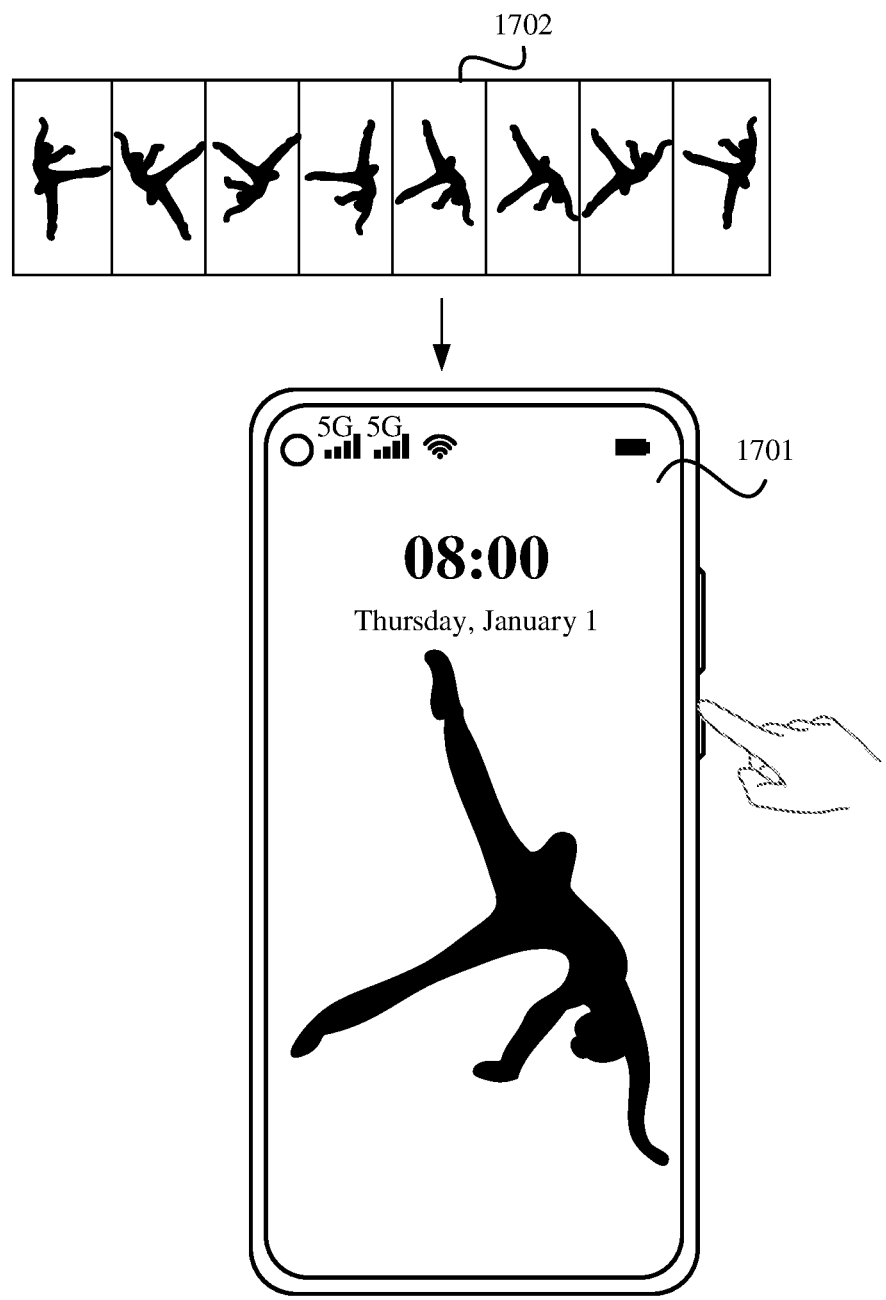
FIG. 17(1) to FIG. 17(3) show an example of a display manner of a transition animation from a lock-screen mode to a screen-off mode.
Figure 17:
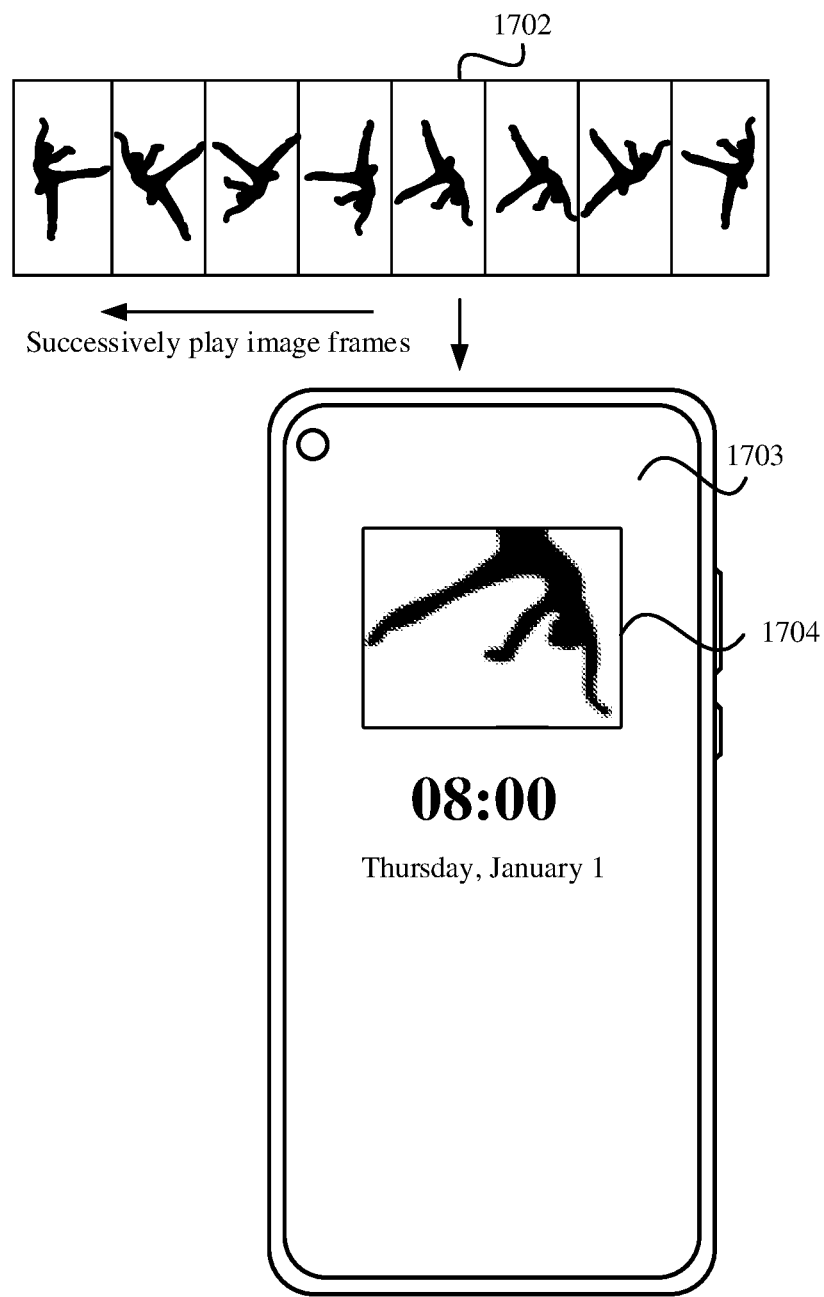
Figure 17:
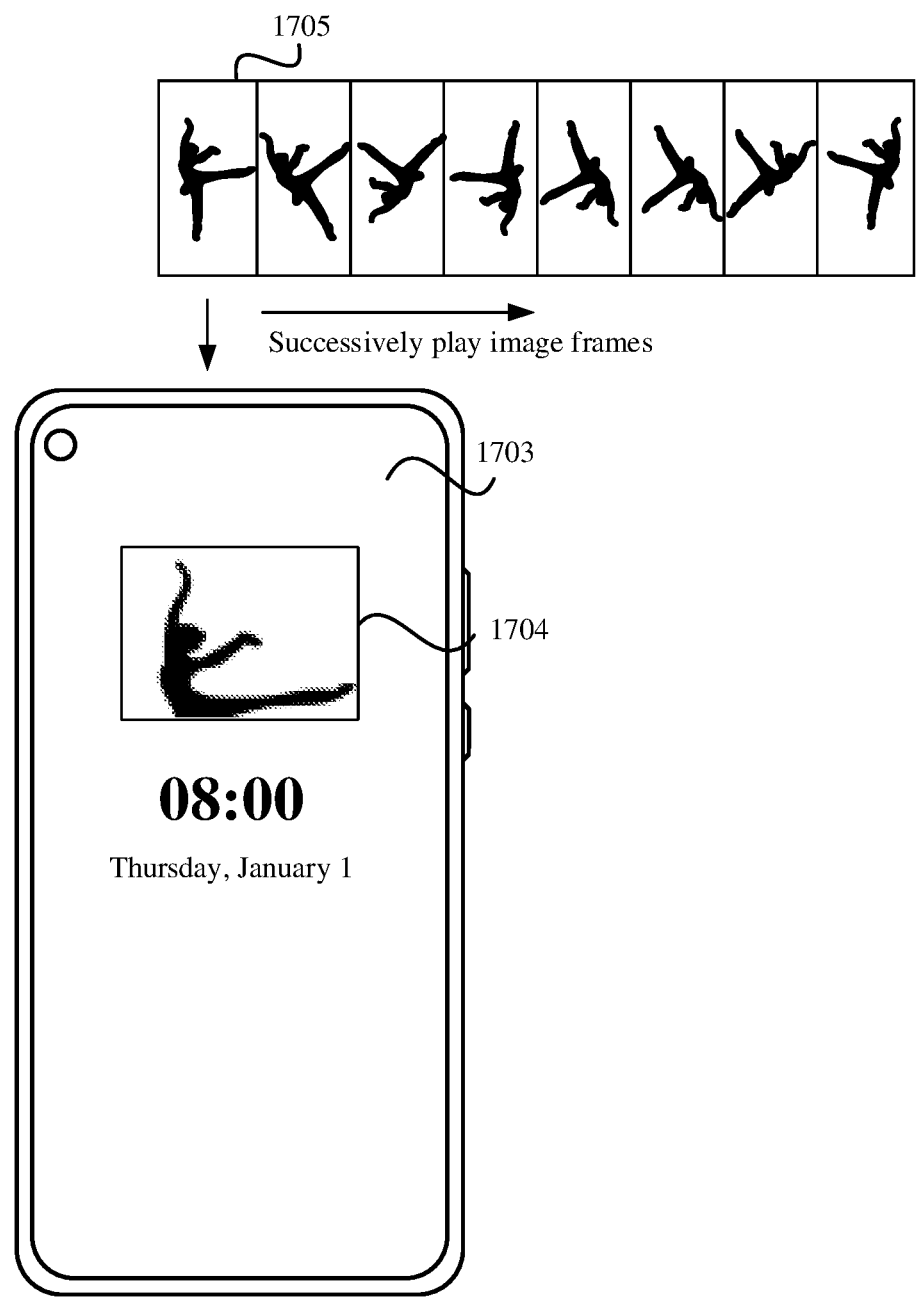

FIG. 17(1) to FIG. 17(3) show an example of a display manner of a transition animation from the lock-screen mode to the screen-off mode. Referring to FIG. 17(1), for example, a lock-screen interface 1701 displays a last frame (that is, the key frame in the lock-screen mode) of the transition animation in the lock-screen mode, for example, an image frame 1702. The user may press the power button. The mobile phone enters the screen-off mode in response to a received user operation. Referring to FIG. 17(2), for example, a screen-off interface 1703 includes a transition animation display box 1704. For details, refer to the foregoing descriptions. Details are not described herein again. For example, a transition animation display box 1704 successively plays image frames in a reverse manner from the image frame 1702, until the first image frame of the video clip is played. Referring to FIG. 17(3), for example, a transition animation played in the transition animation display box 1704 is played from the key frame in the lock-screen mode to an image frame 1705 in a reverse manner. Then, the transition animation display box 1704 successively plays image frames from the image frame 1705, until the key frame in the screen-off mode is played. For other descriptions, refer to the foregoing descriptions. Details are not described herein again. Optionally, after the transition animation display box 1704 plays the image frame 1705, a black screen may be displayed, and then the transition animation in the screen-off mode continues to be played.

Figure 18:
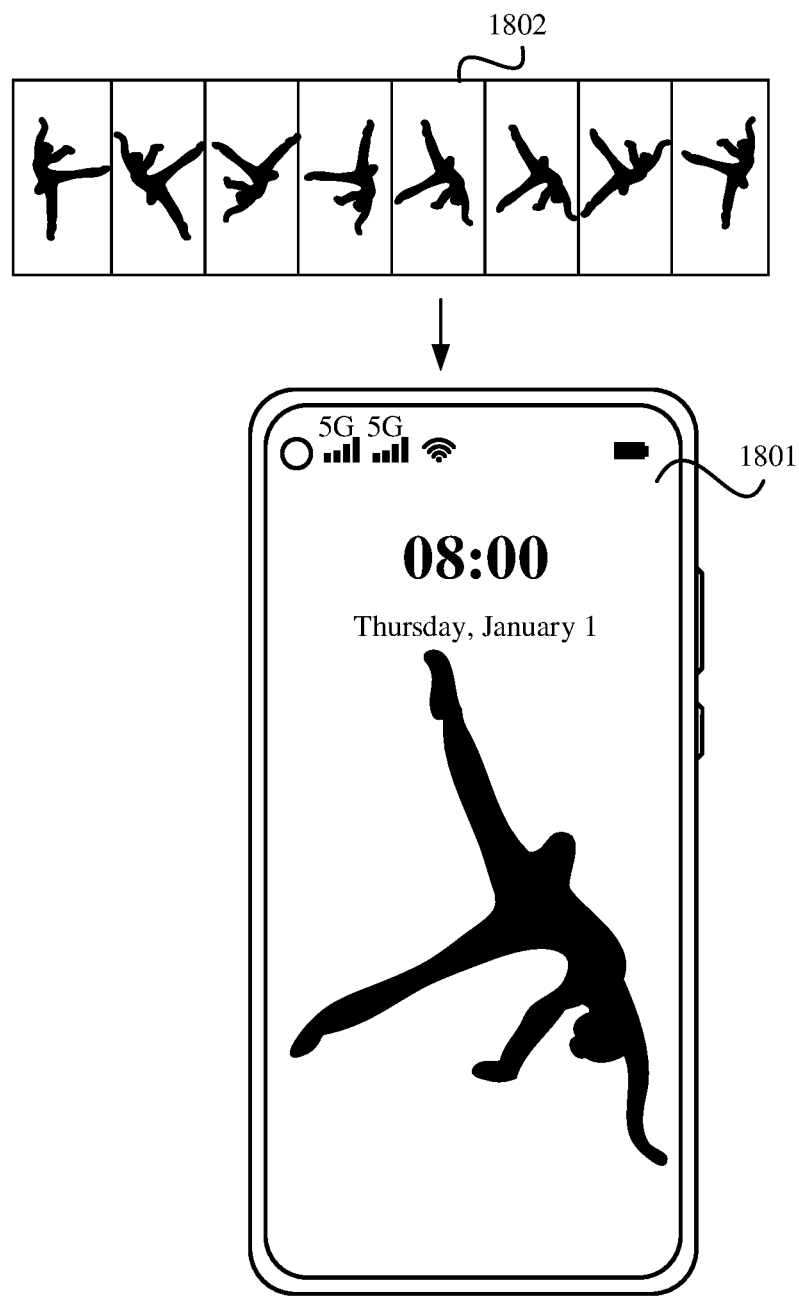
FIG. 18(1) and FIG. 18(2) show an example of a display manner of a transition animation from a lock-screen mode to a screen-off mode.
Figure 18:
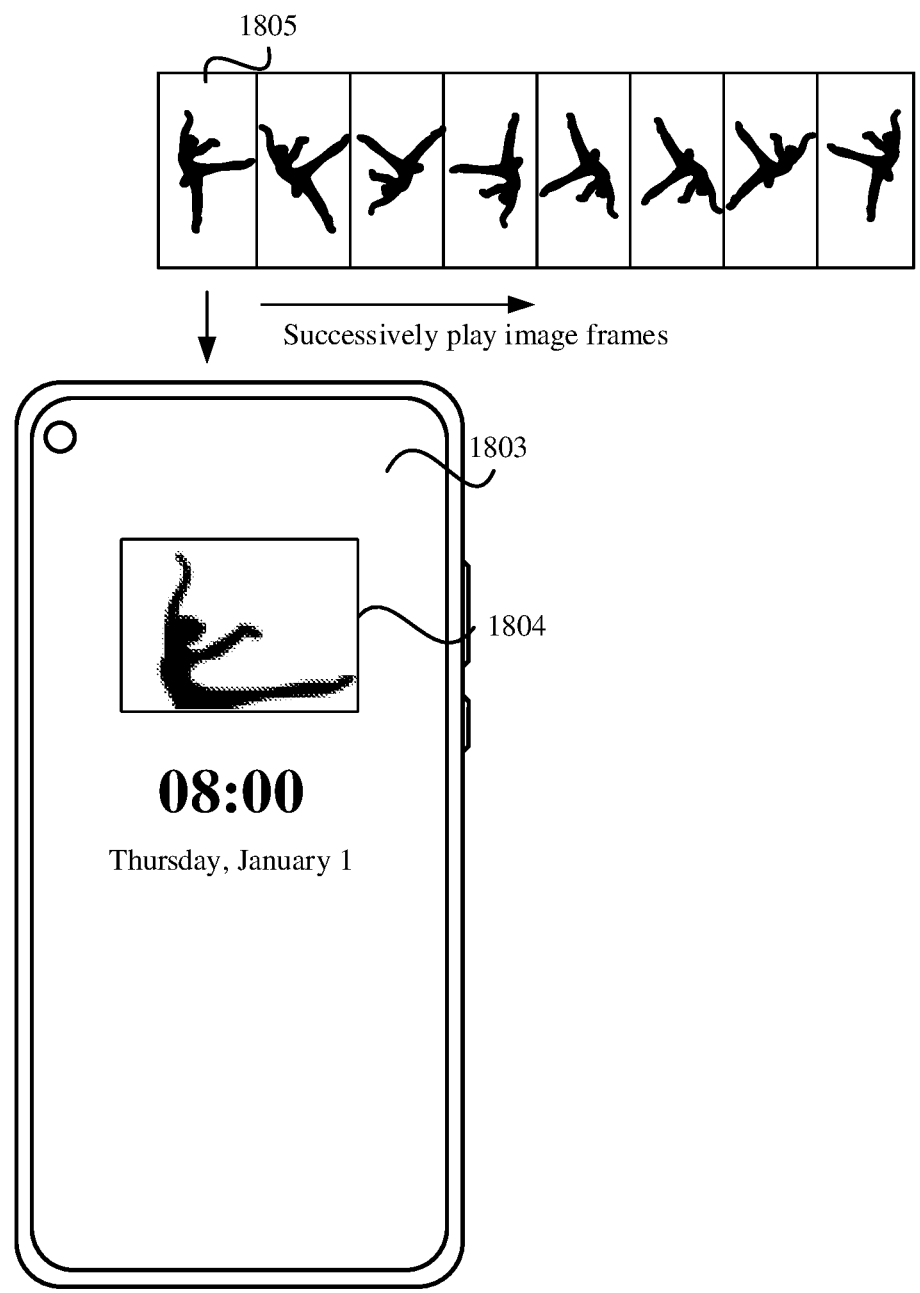

FIG. 18(1) and FIG. 18(2) show an example of a display manner of a transition animation from the lock-screen mode to the screen-off mode. Referring to FIG. 18(1), for example, a lock-screen interface 1801 displays a last frame (that is, the key frame in the lock-screen mode) of the transition animation in the lock-screen mode, for example, an image frame 1802. If a user operation is not received within specified duration (for example, 10s, which may be set according to a user requirement, and is not limited in this application), the mobile phone enters the screen-off mode. Optionally, a picture displayed in the lock-screen interface 1801 may be gradually extinguished until the screen is black. Referring to FIG. 18(2), for example, a transition animation display box 1804 in a screen-off interface 1803 successively plays image frames of the transition animation in the screen-off mode from a first image frame (for example, an image frame 1805) of the transition animation in the screen-off mode, until the key frame in the screen-off mode.

In a possible implementation, if the user presses the power button in a process in which the transition animation in the lock-screen mode is played, the transition animation in the lock-screen mode is interrupted. The mobile phone enters the screen-off mode in response to a received user operation. For example, the transition animation display box in the screen-off interface performs playing in a reverse manner from an image frame displayed when the lock-screen mode is interrupted to the first image frame of the video clip, and then plays the transition animation in the screen-off mode from the first image frame. It should be noted that, as described above, when the transition animation in the lock-screen mode is interrupted, the transition animation played in the lock-screen interface may be displayed in a full-screen manner, or may be displayed in a gradual expansion manner. For example, FIG. 19 shows an example of a scenario in which the transition animation played in the lock-screen interface is interrupted in a gradual expansion process. Referring to FIG. 19, for example, in a process of gradually expanding a field-of-view box in a lock-screen interface 1901, the mobile phone receives an operation of pressing the power button by the user. For example, the lock-screen interface 1901 currently plays a part of an image frame 1902, and the key frame in the lock-screen mode is an image frame 1903. For example, the mobile phone enters the screen-off mode in response to a received user operation. For example, a transition animation display box 1905 in a screen-off interface 1904 performs playing in a reverse manner from the image frame 1902 to the first image frame of the video clip, and then successively plays image frames of the transition animation in the screen-off mode from the first image frame. For an undescribed part, refer to the foregoing description. Details are not described herein again.

In another possible implementation, if the user presses the power button in a process in which the transition animation in the home screen mode is played, the transition animation in the home screen mode is interrupted. The mobile phone enters the screen-off mode in response to a received user operation. For example, the transition animation display box in the screen-off interface performs playing in a reverse manner from an image frame displayed when the home screen mode is interrupted to the first image frame of the video clip, and then plays the transition animation in the screen-off mode from the first image frame.

It may be understood that, to implement the foregoing functions, the electronic device includes corresponding hardware and/or software modules for performing the functions. With reference to the example algorithm steps described in the embodiments disclosed in this specification, this application can be implemented in a form of hardware or a combination of hardware and computer software. Whether a function is implemented by hardware or hardware driven by computer software depends on specific applications and design constraints of the technical solutions. A person skilled in the art may use different methods for each specific application with reference to the embodiments to implement the described functions, but it should not be considered that this implementation goes beyond the scope of this application.

Figure 20:
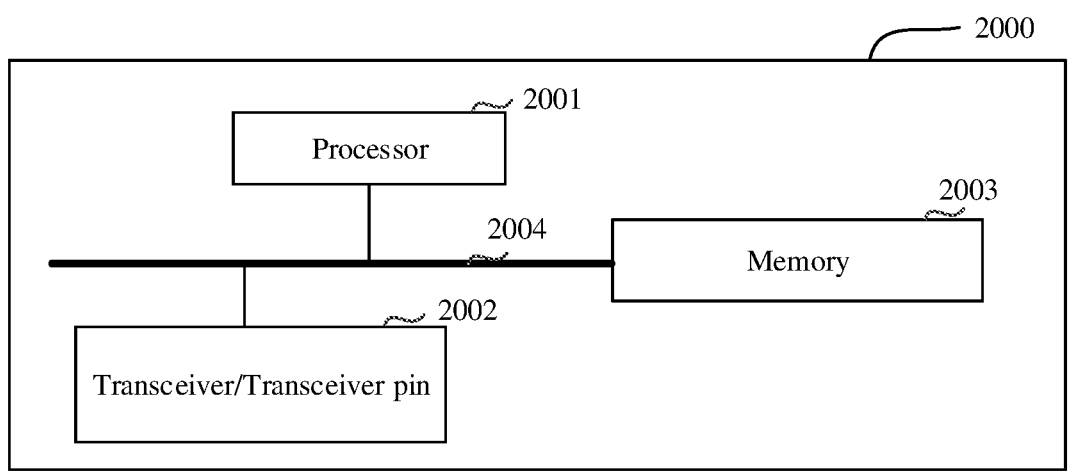
FIG. 20 is a schematic diagram of an example of a structure of an apparatus.

In an example, FIG. 20 is a schematic block diagram of an apparatus 2000 according to an embodiment of this application. The apparatus 2000 may include a processor 2001 and a transceiver/transceiver pin 2002. Optionally, the apparatus 2000 further includes a memory 2003.

The components of the apparatus 2000 are coupled together by using a bus 2004. In addition to a data bus, the bus 2004 further includes a power bus, a control bus, and a status signal bus. However, for clear description, various buses are referred to as the bus 2004 in the figure.

Optionally, the memory 2003 may be configured to store instructions in the foregoing method embodiment. The processor 2001 may be configured to execute the instructions in the memory 2003, control a receiving pin to receive a signal, and control a sending pin to send a signal.

The apparatus 2000 may be the electronic device or a chip in the electronic device in the foregoing method embodiments.

All related content of each step in the foregoing method embodiment may be cited to a function description of a corresponding function module, and details are not described herein again.

An embodiment further provides a computer storage medium. The computer storage medium stores computer instructions. When the computer instructions are run on an electronic device, the electronic device is enabled to perform the foregoing related method steps to implement the display method in the foregoing embodiment.

An embodiment further provides a computer program product. When the computer program product runs on a computer, the computer is enabled to perform the foregoing related steps to implement the display method in the foregoing embodiment.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, so that the chip performs the display method in the foregoing method embodiments.

The electronic device, the computer storage medium, the computer program product, or the chip provided in the embodiment is configured to perform the corresponding method provided above. Therefore, for beneficial effects that can be achieved by the electronic device, the computer storage medium, the computer program product, or the chip, refer to beneficial effects in the corresponding method provided above. Details are not described herein again.

It may be learned by a person skilled in the art from the foregoing description of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may be one or more physical units, may be located in one place, or may be distributed in a plurality of different places. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit. The integrated unit may be implemented in a form of hardware, or may be implemented in a form of a software function unit.

Any content in embodiments of this application and any content in a same embodiment may be freely combined. Any combination of the foregoing content falls within the scope of this application.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Embodiments of this application are described above with reference to the accompanying drawings. However, this application is not limited to the foregoing specific implementations. The foregoing specific implementations are merely an example but not a limitation. Many forms that can be made by a person of ordinary skill in the art without departing from the principle of this application and the protection scope of the claims fall within the protection scope of this application.

The method or algorithm steps described with reference to the content disclosed in embodiments of this application may be implemented in a hardware manner, or may be implemented in a manner in which a processor executes software instructions. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well known in the art. An example storage medium is coupled to a processor, so that the processor can read information from the storage medium and can write information into the storage medium. Certainly, the storage medium may alternatively be a part of the processor. The processor and the storage medium may be located in an ASIC.

A person skilled in the art should be aware that in the foregoing one or more examples, functions described in embodiments of this application may be implemented by hardware, software, firmware, or any combination thereof. When implemented by software, these functions may be stored in a computer-readable medium or transmitted as one or more instructions or code on the computer-readable medium. The computer-readable medium includes a computer storage medium and a communication medium. The communication medium includes any medium that facilitates transfer of a computer program from one place to another. The storage medium may be any usable medium accessible to a general-purpose or dedicated computer.

Embodiments of this application are described above with reference to the accompanying drawings. However, this application is not limited to the foregoing specific implementations. The foregoing specific implementations are merely an example but not a limitation. Many forms that can be made by a person of ordinary skill in the art without departing from the principle of this application and the protection scope of the claims fall within the protection scope of this application.

What is claimed is:

1. An electronic device, comprising:
a memory and at least one processor, wherein
the at least one processor is coupled to the memory; and
the memory stores program instructions, and when the program instructions are executed by the at least one processor, the electronic device is enabled to perform the following steps:
when a first interface is displayed on a display of the electronic device, playing each image frame of a first transition animation in a first display box of the first interface, and freezing at a last image frame of the first transition animation, wherein a center of the first display box deviates from a screen center of the display of the electronic device;
switching from the first interface on the display of the electronic device to a second interface in response to a received first user operation, wherein the second interface comprises a second display box, a size of the second display box is the same as a size of the first display box, and a position of the second display box on the display is the same as a position of the first display box on the display; and
enlarging the second display box gradually, and moving the second display box toward the screen center of the display of the electronic device, wherein each image frame of a second transition animation is played in the second display box in a process in which the second display box is gradually enlarged and moved toward the screen center of the display of the electronic device, and a first image frame of the second transition animation is the same as the last image frame of the first transition animation.

2. The electronic device according to claim 1, wherein the first transition animation comprises N image frames, N is an integer greater than 1, and when the program instructions are executed by the at least one processor, the electronic device is enabled to perform the following steps:
cropping each of the N image frames based on a specified first size;
adjusting a size of each cropped image frame based on a specified second size; and
successively playing, in the first display box, each image frame obtained after the cropping and size adjustment, and freezing at a last image frame that is in the first transition animation and that is obtained after the cropping and size adjustment, wherein the size of the first display box is the same as the second size.

3. The electronic device according to claim 2, wherein the second transition animation comprises M image frames, M is an integer greater than 1, and when the program instructions are executed by the at least one processor, the electronic device is enabled to perform the following steps:
adjusting a first image frame in the M image frames based on the second size; and
superimposing an adjusted first image frame under the second display box, wherein an image in an overlapping part between the second display box and the adjusted first image frame is the same as an image of the last image frame obtained after the cropping and size adjustment.

4. The electronic device according to claim 3, wherein when the program instructions are executed by the at least one processor, the electronic device is enabled to perform the following steps:
enlarging the adjusted first image frame gradually and moving the adjusted first image frame toward the center of the display in a process in which the second display box is gradually enlarged and moved toward the screen center of the display of the electronic device, wherein an image displayed in the second display box changes with the overlapping part between the second display box and the adjusted first image frame.

5. The electronic device according to claim 4, wherein when the program instructions are executed by the at least one processor, the electronic device is enabled to perform the following steps:
when playing of the adjusted first image frame is completed, enlarging the adjusted first image frame to a third size, and moving the adjusted first image frame to a first position on the display;
switching from the adjusted first image frame superimposed with the second display box to a next image frame based on a sequence of the M image frames, wherein a size of the next image frame is the third size, and the next image frame is in the first position on the display; and enlarging the next image frame gradually, and moving the next image frame toward the screen center of the display, wherein the image displayed in the second display box changes with an overlapping part between the second display box and the next image frame.

6. The electronic device according to claim 1, wherein when the program instructions are executed by the processor, the electronic device is enabled to perform the following steps:
when a center of the second display box overlaps the center of the display, and at least one border of the second display box falls inside a border of the display, stopping moving the second display box, and continuing to enlarge the second display box, until all borders of the second display box overlap or fall outside borders of the display.

7. The electronic device according to claim 1, wherein a shape of the first display box is a rectangle, a circle, a triangle, an oval, or an irregular shape.

8. The electronic device according to claim 1, wherein a shape of the second display box is a rectangle, a circle, a triangle, an oval, or an irregular shape.

9. The electronic device according to claim 1, wherein the first interface is a screen-off interface, and the second interface is a lock-screen interface.

10. The electronic device according to claim 1, wherein the first interface is a screen-off interface, and the second interface is a home screen.

11. A display method, comprising:
when a first interface is displayed on a display of an electronic device, playing each image frame of a first transition animation in a first display box of the first interface, and freezing at a last image frame of the first transition animation, wherein a center of the first display box deviates from a screen center of the display of the electronic device;
switching, by the electronic device, from the first interface on the display of the electronic device to a second interface in response to a received first user operation, wherein the second interface comprises a second display box, a size of the second display box is the same as a size of the first display box, and a position of the second display box on the display is the same as a position of the first display box on the display; and
enlarging, by the electronic device, the second display box gradually, and moving the second display box toward the screen center of the display of the electronic device, wherein each image frame of a second transition animation is played in the second display box in a process in which the second display box is gradually enlarged and moved toward the screen center of the display of the electronic device, and a first image frame of the second transition animation is the same as the last image frame of the first transition animation.

12. The method according to claim 11, wherein the first transition animation comprises N image frames, N is an integer greater than 1, and the playing each image frame of a first transition animation in a first display box of the first interface comprises:
cropping each of the N image frames based on a specified first size;
adjusting a size of each cropped image frame based on a specified second size; and
successively playing, in the first display box, each image frame obtained after the cropping and size adjustment, and freezing at a last image frame that is in the first transition animation and that is obtained after the cropping and size adjustment, wherein the size of the first display box is the same as the second size.

13. The method according to claim 12, wherein the second transition animation comprises M image frames, M is an integer greater than 1, and the playing each image frame of a first transition animation in a first display box of the first interface comprises:
adjusting a first image frame in the M image frames based on the second size; and
superimposing an adjusted first image frame under the second display box, wherein an image in an overlapping part between the second display box and the adjusted first image frame is the same as an image of the last image frame obtained after the cropping and size adjustment.

14. The method according to claim 13, wherein the enlarging, by the electronic device, the second display box gradually, and moving the second display box toward the screen center of the display of the electronic device comprises:
enlarging the adjusted first image frame gradually and moving the adjusted first image frame toward the center of the display in a process in which the second display box is gradually enlarged and moved toward the screen center of the display of the electronic device, wherein an image displayed in the second display box changes with the overlapping part between the second display box and the adjusted first image frame.

15. The method according to claim 14, wherein the enlarging, by the electronic device, the second display box gradually, and moving the second display box toward the screen center of the display of the electronic device comprises:
when playing of the adjusted first image frame is completed, enlarging the adjusted first image frame to a third size, and moving the adjusted first image frame to a first position on the display;
switching from the adjusted first image frame superimposed with the second display box to a next image frame based on a sequence of the M image frames, wherein a size of the next image frame is the third size, and the next image frame is in the first position on the display; and
enlarging the next image frame gradually, and moving the next image frame toward the screen center of the display, wherein the image displayed in the second display box changes with an overlapping part between the second display box and the next image frame.

16. The method according to claim 11, wherein the enlarging, by the electronic device, the second display box gradually, and moving the second display box toward the screen center of the display of the electronic device comprises:
when a center of the second display box overlaps the center of the display, and at least one border of the second display box falls inside a border of the display, stopping moving the second display box, and continuing to enlarge the second display box, until all borders of the second display box overlap or fall outside borders of the display.

17. The method according to claim 11, wherein a shape of the first display box is a rectangle, a circle, a triangle, an oval, or an irregular shape; and a shape of the second display box is a rectangle, a circle, a triangle, an oval, or an irregular shape.

18. The method according to claim 11, wherein the first interface is a screen-off interface, and the second interface is a lock-screen interface.

19. The method according to claim 11, wherein the first interface is a screen-off interface, and the second interface is a home screen.

20. A non-transitory computer-readable storage medium, comprising a computer program, wherein when the computer program is run on an electronic device, the electronic device is enabled to perform operations comprising:

when a first interface is displayed on a display of the electronic device, playing each image frame of a first transition animation in a first display box of the first interface, and freezing at a last image frame of the first transition animation, wherein a center of the first display box deviates from a screen center of the display of the electronic device;

switching from the first interface on the display of the electronic device to a second interface in response to a received first user operation, wherein the second interface comprises a second display box, a size of the second display box is the same as a size of the first display box, and a position of the second display box on the display is the same as a position of the first display box on the display; and enlarging the second display box gradually, and moving the second display box toward the screen center of the display of the electronic device, wherein each image frame of a second transition animation is played in the second display box in a process in which the second display box is gradually enlarged and moved toward the screen center of the display of the electronic device, and a first image frame of the second transition animation is the same as the last image frame of the first transition animation.

* * * * *